(12) United States Patent
Boufounos et al.

(10) Patent No.: US 11,397,260 B2
(45) Date of Patent: Jul. 26, 2022

(54) SYSTEM AND METHOD FOR RADAR IMAGING FOR ANTENNAS WITH POSITION AMBIGUITIES

(71) Applicant: Mitsubishi Electric Research Laboratories, Inc., Cambridge, MA (US)

(72) Inventors: Petros Boufounos, Winchester, MA (US); Hassan Mansour, Boston, MA (US); Muhammad Lodhi, Edison, NJ (US)

(73) Assignee: Mistubishi Electric Research Laboratories, Inc., Cambridge, MA (US)

( * ) Notice: Subject to any disclaimer, the term of this patent is extended or adjusted under 35 U.S.C. 154(b) by 249 days.

(21) Appl. No.: 16/735,467

(22) Filed: Jan. 6, 2020

(65) Prior Publication Data

US 2021/0208271 A1    Jul. 8, 2021

(51) Int. Cl.
G01S 13/90    (2006.01)
(52) U.S. Cl.
CPC ...... *G01S 13/9019* (2019.05); *G01S 13/9017* (2013.01)

(58) Field of Classification Search
None
See application file for complete search history.

(56) References Cited

U.S. PATENT DOCUMENTS

2018/0059237 A1*  3/2018  Liu ................. G01S 13/878
2019/0242991 A1*  8/2019  Mansour ........... G01S 13/9019

* cited by examiner

*Primary Examiner* — Vladimir Magloire
*Assistant Examiner* — Artem Melkunov
(74) *Attorney, Agent, or Firm* — Gennadiy Vinokur; Hironori Tsukamoto

(57) ABSTRACT

A radar system for generating a radar image of a scene. Receive radar measurements of reflectivity of each point in the scene measured by receivers. Solve a radar image recovery (RIR) problem using stored data to produce the radar image. By connecting the radar measurements to a shift of a reflection field with a receiver shift. The receiver shift defines an error between stored receiver positions and actual receivers positions, the reflection field is generated by reflecting the transmitted field from the scene in accordance with the reflectivity of each point in the scene. Connecting the reflection field to a shift of an incident field with a transmitter shift. The transmitter shift defines an error between stored transmitter positions and actual transmitters positions. Solve as a multilinear problem of joint estimation of the reflectivity of each point in the scene, the receiver shift, and the transmitter shift.

21 Claims, 32 Drawing Sheets

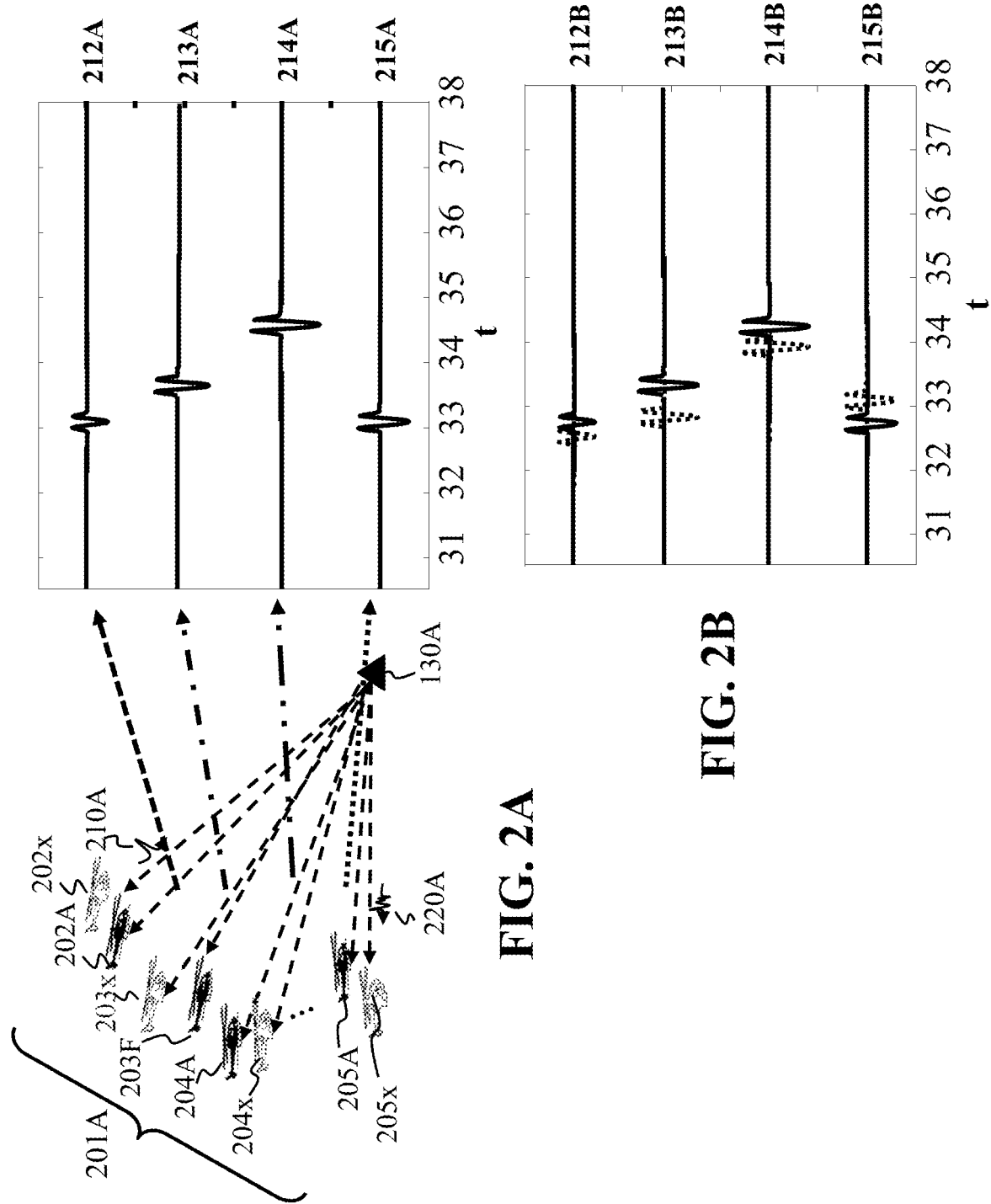

SYSTEM AND METHOD FOR RADAR IMAGING FOR ANTENNAS WITH POSITION AMBIGUITIES

FIELD

The present disclosure relates generally to radar systems, and more particularly radar imaging by fusing measurements of various antennas whose positions are not accurately known.

BACKGROUND

High-resolution radar imaging is a requirement in a variety of remote sensing applications, including synthetic aperture radar (SAR) and through-the-wall radar imaging (TWI). Whereas the down-range resolution is mostly controlled by the bandwidth of the transmitted pulse, the cross-range (azimuth) resolution depends on the aperture of the radar array. Generating a large physical aperture can be practically achieved by deploying a number of distributed antennas or arrays, each having a relatively small aperture. A distributed setup allows for flexibility of platform placement, reduces the operational and maintenance costs, and adds robustness to sensor failures. Leveraging prior knowledge of the scene, such as the precise knowledge of the antenna positions and a full synchronization of received signals has been shown to significantly improve the radar imaging resolution. However, geographical distribution of an array introduces data coherence problems due to ambiguities in the position of the antennas and/or difficulties in precisely synchronizing the antenna clocks.

For example, the state-of-the-art models antenna position errors as phase and magnitude errors in the received data. Wherein, the data distortion introduced due to position errors may be equivalent to a phase and magnitude distortion in the data. To that end, the conventional methods attempts to estimate and correct the phase errors in the data, in order to apply coherent imaging techniques on the corrected data. However, at least one common issue with those solutions, among many problems, is that the estimation of the phase and magnitude distortion is not straightforward due to the non-linearity of the resulting formulation, and the lack of models to directly compute the effect of position ambiguities to the phase and magnitude of the system. For example, typical phase models in the literature, such as subspace restrictions, under-perform because they fail to capture the true nature of the error. In addition, there is an additional complication that phase is a wrapped quantity, making its estimation more difficult. As a result, those solutions are not practical.

Therefore, there is a need for radar imaging systems and methods for fusing measurements of various antennas with position errors.

SUMMARY

Embodiments of the present disclosure relate to radar systems and methods for radar imaging by fusing measurements of various antennas with position errors. Some embodiments, further relate to radar systems and methods for radar imaging by fusing measurements of various antennas with synchronized or unsynchronized clocks.

The embodiments described below are described as two-dimensional examples. However there is nothing that is specific to two dimensions. Other embodiments rely on the same realizations and algorithms, replacing two-dimensional quantities, such as the image or the unknown shifts and shift kernels, with one or three-dimensional ones, as necessary for the particular application.

Some systems and methods of the present disclosure provide for an optimization-based solution to the problem of distributed radar imaging using antennas with position ambiguities. In distributed settings, it is challenging to know the positions of different antennas to the desired precision required for radar imaging. At least one aspect of the present disclosure assumes that these positions are not known precisely, and attempts to determine the position of each antenna, in addition to recovering the image of the scene the radars are illuminating. This solution further allows, by non-limiting example, modeling and recovering of timing ambiguities in a case the antennas are not perfectly synchronized.

Some of the systems and methods of the present disclosure explicitly and separately model the position uncertainty of the transmitter antenna as an unknown position shift of the transmitted field, and the position uncertainty of the receiver antenna as an unknown position shift of the reflected field. Thus, this approach, by non-limiting example, accurately models each of the shifts as a convolution with a spatial shift operator. This formulation results in an optimization problem which simultaneously recovers all the position errors and the radar image acquired by the radar. In addition, the solution provides the resolution benefits of coherent imaging, even if the measurements are not coherent.

Further, other beneficial aspects of this solution include exploiting the realization that the effect of position errors is different for the transmitting antennas than for the receiving antennas. This solution further relies on a realization that separating the typical radar operator to two separate operators, one describing the incident field and another describing the reflected field, enables the description of the transmitter and receiver errors as simple translation of the two incident and the reflected fields, respectively. Furthermore, this approach exploits the realization that translation in space is equivalent to convolution with a shift kernel operating in space on the fields, and that shift kernels are sparse. Thus, sparse optimization methods can be very effective in recovering the kernel.

In particular, position errors in the transmitting antenna result to a shifting of the field induced onto the scene by the same amount. Similarly, position errors of receiving antenna result to data received as if the reflected field was shifted by the same amount in the opposite direction. Thus, it is possible to formulate a multilinear optimization problem that simultaneously recovers all the antenna position errors, as well as the sparse scene being imaged.

In order to implement some of the above realizations, some embodiments provide for radar imaging from measurements provided by antennas having position ambiguities, where the phrase position ambiguities indicate a true position of the antennas, which may or may not be accurately known, and may differ from an assumed position of the antennas. In order to address when some antennas have position ambiguities, some embodiments, for example, act under an additional assumption that the antennas have clocks that are not perfectly synchronized.

Some embodiments are based on the recognition that a radar-imaging problem for distributed antennas with position ambiguities can be an ill-posed problem with a vast number of unknowns. Specifically, when the radar-imaging problem is formulated as determining a radar image from the measurements related to the radar image through a radar operator having uncertainties encoding the antenna position ambiguities, each measurement of an unknown scene includes an error caused by the position errors of the antennas. Moreover, due to non-linearity of relationships between the measurements and the errors in the position of the antennas, each sample of the measurements from the same antenna can have a different error, thereby increasing a number of unknowns in a model of the radar-imaging problem formed by multiple measurements from multiple antennas. To that end, the formulation of the radar-imaging problem that aims to recover the correct radar image from incorrect measurements caused by the incorrect radar operator is a difficult to accurately model, as an ill-posed problem.

Some embodiments are based on another recognition that the effect of position errors is different for transmitting antennas for receiving antennas. In particular, an effect of a transmitting antenna position error is a shift in the incident field that this transmitting antenna induces to the scene by the same amount as the position error. The scene interacts with the incident field, creating a reflected field. Each receiving antenna measures the reflected field at the position of the receiving antenna. The effect of a position error in the receiving antenna is equivalent to the field being measured at a different point, which, in turn, is equivalent to a field, shifted by the same amount to the opposite direction, being measured by an antenna without position error, i.e., at the assumed position.

Some embodiments are based on another recognition that a problem of radar image recovery under position ambiguity is to determine and unknown scene, a shift of the reflected field generated by the unknown scene and measured by a receiving antenna, and a shift of the incident field induced by a transmitting antenna and interacting with the scene to generate the reflected field, such that the scene and the shifts explain the radar measurements by the receiving antennas. Such a problem transformation allows decoupling the effect of the unknown shift of the transmitting antenna from the effect of the unknown shift of the receiving antenna and from the unknown scene that generates the unknown ideal signal.

In addition, some embodiments are based on a realization that the unknown shift of the incident field, which is an unknown translation of incident field in space, can be represented as a convolution with an unknown two-dimensional convolutional shift kernel, with the further realization that this kernel is a unit impulse in two dimensions. Such a representation is counterintuitive because representing this unknown shift as an unknown two-dimensional kernel expands the dimensionality of the problem. In particular, a two-dimensional translation can be represented using a two-dimensional vector, i.e., two parameters, whereas a two-dimensional kernel has size that depends on the maximum ambiguity of the position error in each dimension, as a function of the size of a representation grid used to represent the kernel. However, the unknown translation affects the data in a nonlinear way, while the convolution by the unknown impulse is a liner operation. In such a manner, the decoupling of the unknowns combined with linearization gained from the convolutional representation result in a multilinear radar image recovery problem. Multilinear problems, although not convex, and not as simple to solve as convex problems, are still easier to solve than more general non-convex problems, using methods such as lifting or alternating optimization.

In addition, some embodiments are based on another realization that the unknown shift of the reflected field, which is an unknown translation of reflected field in space, can also be represented as a convolution with an unknown convolutional shift kernel, with the further realization that this kernel is a unit impulse in two dimensions. In a similar manner, such a representation is counterintuitive because representing this unknown shift as an unknown two-dimensional kernel further expands the dimensionality of the problem. However, the unknown translation affects the data in a nonlinear way, while the convolution by the unknown impulse is a liner operation. In such a manner, the decoupling of the unknowns combined with linearization gained from the convolutional representation result in a multilinear radar image recovery problem.

However, even after decoupling, this multilinear radar image recovery problem is still difficult to solve, because the resulting problem has a large number of solutions, while only one of them is the desired one. For this reason, some embodiments are based on another realization that the unknown convolutional shift kernels can be represented as shifted impulses, which are unknown two-dimensional signals that are one-sparse in space. In effect, these realizations allow transforming the original nonlinear image recovery problem into a multilinear sparse recovery problem, which in turn allows using sparse reconstruction techniques to reduce the size of the solution space of the radar image recovery problem.

To that end, some embodiments solve a multilinear radar image recovery problem to produce a radar image of the scene. The radar image recovery separately recovers the shift of the incident field, the reflectivity of the scene observed by the radar and the equivalent shift of the reflected field that, when combined, describe the measured data. The shifted incident and reflected fields are represented as convolutions in space of upshifted fields with spatial shift kernels, which are one-sparse in space. In some embodiments, the scene is also sparse in space or when transformed by an appropriate transformation, such as wavelets, gradient, or Fourier.

During experimentation, some experimental approaches included explicitly modeling position ambiguities on the distributed antennas as a single unknown shift on the image for each transmitter-receiver antenna pair. However, by modeling these ambiguities as unknown shifts on the image, instead of a separate shift on the incident and the reflective field, these approaches allow for only one shift for each pair of transmitting-receiving antenna.

Effectively, these experimental approaches implicitly assume that the position error is the same for the transmitter and the receiver. In practice, this is a very limiting model, accurate only in a small number of distributed sensing systems. For this model to be accurate, the transmitter and the receiver should be collocated, i.e., located on the same platform, move together, and experience the same position error. Even if they are on the same platform but at different locations on the platform, and the platform rotates or changes direction, this model is not accurate.

In effect, this experimental model is only accurate in practical systems configured such that an antenna is acting as both a transmitter and a receiver, and no other antenna is used as a receiver for the same transmission. Using such a system configuration diminishes the advantages and the effectiveness of the distributed radar system, as it cannot exploit the availability of multiple receiver antennas. To acquire more data and improve system performance, other receiving antennas, at a different location than a transmitting antenna should receive reflections from the scene.

However, these experimental approaches failed to recognize the separation of the incident field with the reflective field in the radar operator. This separation is necessary in order to model the transmitter position error as distinct from the receiver position error. Otherwise, a single unknown translation error describes the position error of each transmitter-receiver antenna pair, which implies that they both exhibit the same common error. Thus, these experimental approaches tried to recover this common position error for each transmitter/receiver pair, modeling the common shift of the position of the transmitter and the receiver in the pair, compared to their assumed position, as a corresponding shift of the scene being imaged by the radar by the same amount in the opposite direction. As described above, under this formulation, the model is accurate only if the transmitter and receiver pairs are collocated for each transmission and reception, which is not a practical assumption in most distributed systems.

In addition, modeling the position error for each antenna pair results in a multiplicative growth of the unknown position errors, as the number of transmitter or receiver antennas grows. In contrast, by recognizing the separation of the incident and the reflected field in the radar operator, and separately modeling the error in the positions of the transmitting antennas and the receiving antennas, the number of unknown position errors only grows linearly with the number of antennas. For example, in a system with 3 transmitting and 5 receiving antennas, in which all receiving antennas receive the reflections from all the transmitting antennas, there are 3×5=15 transmitter-receiver antenna pairs, and therefore, 15 unknown position errors, one for each pair. Increasing the transmitting antennas to 4 would create 5 more pairs, one for each receiving antenna, and therefore 5 more unknown position errors for a total of 4×5=20 unknown position errors. In contrast, there are only 3+5=8 and 4+5=9 unknown position errors, respectively, if the position errors of transmitting antennas are treated separately form the position errors of the receiving antennas. Reducing the number of unknowns significantly reduces the computational complexity of solving the problem, as well as the amount of data necessary to find the correct solution. Both of these issues are important in most practical applications. Therefore, separating the incident and the reflected fields is also preferable from a computational and data acquisition complexity standpoint.

Furthermore, separating the transmitting antenna position errors and the receiving antenna position errors enforces consistency in the solution that is not enforced when the unknown position error is on each transmitter-receiver antenna pair. In reality, at the time of transmission the transmitting antenna is at a single location and has a single unknown position error. Similarly, the receiving antennas are at a single position each, and exhibit a single unknown position error. Modeling the transmitter-receiver pair position error as a single unknown position error implies that the unknown error is a combination of the two individual position errors in the pair, e.g, an average. Given the individual position errors, it may be possible to combine them and determine the position error of the pair in this model. However, given estimates of combined position errors of each pair, there is no guarantee that these pairs are consistent, i.e., that there is a choice of separate position errors for each transmitter and receiver in the pairs, such that when appropriately combined one can obtain the given pairwise errors. Thus, directly estimating the errors for each pair might result in inconsistent estimates. Reconciling these inconsistencies is not straightforward. Instead, separating the transmitter and receiver position errors naturally results in estimates that are consistent.

At least one further realization in some embodiments of the present disclosure that include separating the operator, as noted above, is the realization that separating the typical radar operator to two separate operators, one describing the incident field and another describing the reflected field, enables the description of the transmitter and receiver errors as simple translation of the two incident and the reflected fields, respectively. In particular, a key realization is that a shift of the transmitter results to a shift of the incident field by the same amount in the same direction, whereas a shifted receiver would receive the same data as a receiver in the original position observing a reflected field shifted by the same amount in the exact opposite direction.

Furthermore, this approach exploits the realization that translation in space is equivalent to convolution with a shift kernel operating in space on the fields, and that shift kernels are sparse. While this is a significant expansion in the dimensionality of the unknown parameter, it makes the problem linear in the unknown shift and separates the effect of the shifts from the rest of the operator describing the physics of the system. Furthermore, since the shift kernel is sparse, sparse optimization methods can be very effective in recovering the kernel. Specifically, if an unknown quantity is sparse, then estimating this quantity by enforcing sparsity using sparse optimization improves the quality of the estimated value and reduces the amount of data that should be collected in order to successfully produce this estimate.

In addition, separating the operator has the beneficial aspect, among many benefits, of being able to accurately model a larger variety of systems, and significantly improve the reconstruction performance. This is because this separation in the model capture the physical manifestation of most practical systems, even if the transmitter and the receiver are not co-located. At the same time, it can also model the errors if it is known that the transmitter and receiver are co-located simply by using the same unknown kernel to model the unknown shift. Furthermore, the model is still applicable if a transmitter and receiver are on the same platform, but not the same antenna, and the platform exhibits both translation and rotation.

Other experimental approaches may attempt to correct synchronization errors between the antennas. While in practice accurate synchronization is very difficult to achieve, these experiments demonstrated that it is possible to describe a convex optimization algorithm that accurately recovers timing, i.e., synchronization, errors between the antennas. However, it is not possible to incorporate position errors in this formulation. Thus, these experimental approaches are only applicable if the position of each of the antenna is known exactly, without any errors.

Instead, some embodiments of this present disclosure further recover synchronization errors, in addition to position errors, by formulating a multilinear problem. In particular they exploit the realization that synchronization errors cause unknown notional time delays and advances in the recorded data, which can be modeled as time shifts in the data. Similarly to shifts in position, described above, these time shifts in the data can be modeled as convolutions with a shift kernel in the time domain. Thus, they interact linearly with the sensing model. Since the sensing model includes the unknowns for the position errors of the antennas and the unknown scene, the resulting problem is multilinear.

Some embodiments of the present disclosure rely on the realization that, while multilinear problems are not convex, they are relatively well-studied, well-understood, and straightforward to solve, compared to more general convex problems. In particular, while general non-convex problems can be difficult to solve, multilinear problems exhibit specific structure that makes them amenable to different algorithmic solutions, such as alternating optimization, or lifting to higher dimensions, among others. Thus, they admit algorithms that can be very efficient for practical use. Therefore, giving up convexity for the flexibility of correcting both position and synchronization errors is a favorable trade-off in many applications.

Furthermore, some embodiments of this present disclosure may exploit the realization that a multilinear formulation is better able to enforce timing consistency when recovering synchronization errors. In particular, the convex formulation in the art recovers timing errors between transmitter and receiver pairs. Embodiments of this present disclosure may recover, instead, the timing error of the clock of each transmitter and each receiver relative to an absolute clock.

As an example, consider the clock of one transmitter as the absolute clock, and all clocks are considered running fast or slow as relative this clock. Consider the clock of a second transmitter running 2 time-units slow, the clocks of two receivers running 1 and 3 time-units fast, respectively, while the clock of a third receiver running 1 time-unit slow. Embodiments of this present disclosure only need to recover four absolute clock errors: one for the second transmitter and three for the three receivers. A convex formulation, experimented with during experimentation would need to recover the relative delay for each pair, i.e., 2×3=6 unknown relative delays. In the same example, these delays should be consistent. For example, the relative delays between the clock of the first transmitter and the clocks of the three receivers should be equal to the relative delay of the clock of the second transmitter added to the relative delays between the clock of the second transmitter and the three receivers.

Since the convex formulation in the above experiment recovers six separate unknown relative delays, the resulting estimates of the relative clock errors might not be consistent, especially in the presence of noise. The correct solution would be to recover a time advance of 1 and 3 units and a time delay of 1 unit for the clocks of the three receivers respectively, relative to the clock of the first transmitter, and a time advance of 3, 5, and 1 time-units, respectively relative to the clock of the second transmitter. A recovered time advance of 3, 5, and 2 time units, for the second set of advances provides an inconsistent solution, which is still possible in the above experiment. Using embodiments of the present disclosure that recover the clock errors for each transmitter and receiver separately, such inconsistency is not possible.

At least some benefits of the systems and methods of the present disclosure including overcoming problems with conventional distributed radar imaging methods, that use geographical distribution of an array, which introduces data coherence problems due to ambiguities in the position of the antennas and/or difficulties in precisely synchronizing the antenna clocks. Some embodiments of the present disclosure overcome these problems by separately modeling the position uncertainty of the transmitter antenna as an unknown position shift of the transmitted field, and the position uncertainty of the receiver antenna as an unknown position shift of the reflected field, and further modeling the shifts as a convolution with a spatial shift operator. This, more accurate formulation, also results in an optimization problem, which simultaneously recovers all the position errors and the radar image acquired by the radar.

Another benefit of the present disclosure is overcoming the conventional methods attempts to estimate and correct the phase errors in the data, in order to apply coherent imaging techniques on the corrected data. Some embodiments of the present disclosure overcome these problems by separating the typical radar operator to two separate operators, one describing the incident field and another describing the reflected field, enabling the description of the transmitter and receiver errors as simple translation of the two incident and the reflected fields, respectively. Furthermore, this approach exploits the realization that translation in space is equivalent to convolution with a shift kernel operating in space on the fields, and that shift kernels are sparse. Thus, sparse optimization methods can be very effective in recovering the kernel.

According to an embodiment of the present disclosure, a radar system for generating a radar image of a scene. Wherein, during an operation, the radar system is connected to a set of transmitters configured to transmit radar pulses to the scene and a set of receivers configured to receive reflections of the radar pulses from the scene. The radar system including a memory configured to store predetermined configuration data indicative of propagation of the radar pulses to and from the scene. The configuration data includes positions of the transmitters and positions of the receivers, such that a position of at least one receiver is different from the transmitter positions of all transmitters. Wherein the configuration data defines an incident field generated by the radar pulses transmitted by the transmitters from the transmitter positions. Wherein the configuration data defines a structure of a reflection field generated by reflections of the incident field from the scene and measured by the receivers at the receiver positions. An input interface configured to receive radar measurements of reflectivity of each point in the scene measured by the set of receivers. A hardware processor configured to solve a radar image recovery problem using the configuration data to produce the radar image of the reflectivity of each point in the scene. Based on connecting the received radar measurements to a shift of the reflection field with a receiver unknown position shift. Wherein the receiver unknown position shift defines an error between the receiver positions stored in the memory and actual positions of the receivers. The reflection field is generated by reflecting the transmitted field from the scene in accordance with the reflectivity of each point in the scene. Connect the reflection field to a shift of the incident field with a transmitter unknown position shift. Wherein the transmitter unknown position shift defines an error between the transmitter positions stored in the memory and actual positions of the transmitters. Solve the radar image recovery problem as a multilinear problem of joint estimation of the reflectivity of each point in the scene, the receiver shift, and the transmitter shift. An output interface configured to render one or combination of the radar image of the reflectivity of each point in the scene, the receiver shift, or the transmitter shift.

According to another embodiment of the present disclosure, a method for a radar system to produce a radar image of a region of interest (ROI). The method including measuring, using transmitting antennas at different positions to transmit radar pulses to the ROI. Receiving antennas configured to receive reflections of the radar pulses from the ROI corresponding to the transmitted radar pulses. Such that the receivers measure the reflections of the radar pulses to obtain radar measurements of reflectivity of each point in the scene. Using a hardware processor in communication with the transmitters, receivers and a memory, that is configured to access the memory having stored data including predetermined configuration data indicative of propagation of the radar pulses to and from the ROI. The configuration data includes positions of the transmitters and positions of the receivers, such that a position of at least one receiver is different from the transmitter positions of all transmitters. Wherein the configuration data defines an incident field generated by the radar pulses transmitted by the transmitters from the transmitter positions. Wherein the configuration data defines a structure of a reflection field generated by reflections of the incident field from the scene and measured by the receivers at the receiver positions. Solving a radar image recovery problem using the configuration data to produce the radar image of the reflectivity of each point in the scene. Based on connecting the received radar measurements to a shift of the reflection field with a receiver unknown position shift. Wherein the receiver unknown position shift defines an error between the receiver positions stored in the memory and actual positions of the receivers. The reflection field is generated by reflecting the transmitted field from the scene in accordance with the reflectivity of each point in the scene. Connecting the reflection field to a shift of the incident field with a transmitter unknown position shift. Wherein the transmitter unknown position shift defines an error between the transmitter positions stored in the memory and actual positions of the transmitters. Solving the radar image recovery problem as a multilinear problem of joint estimation of the reflectivity of each point in the scene, the receiver shift, and the transmitter shift. Outputting via an output interface one or combination of the radar image of the reflectivity of each point in the scene, the receiver shift, or the transmitter shift.

According to another embodiment of the present disclosure, a non-transitory computer readable storage medium embodied thereon a program executable by a processor for performing a method, the method for a radar system to produce a radar image of a region of interest (ROI). The method including measuring, using transmitting antennas at different positions to transmit radar pulses to the ROI. Receiving antennas configured to receive reflections of the radar pulses from the ROI corresponding to the transmitted radar pulses. Such that the receivers measure the reflections of the radar pulses to obtain radar measurements of reflectivity of each point in the scene. Using a hardware processor in communication with the transmitters, receivers and a memory, that is configured to access the memory having stored data including predetermined configuration data indicative of propagation of the radar pulses to and from the ROI. The configuration data includes positions of the transmitters and positions of the receivers. Such that a position of at least one receiver is different from the transmitter positions of all transmitters. Wherein the configuration data defines an incident field generated by the radar pulses transmitted by the transmitters from the transmitter positions. Wherein the configuration data defines a structure of a reflection field generated by reflections of the incident field from the scene and measured by the receivers at the receiver positions. Solving a radar image recovery problem using the configuration data to produce the radar image of the reflectivity of each point in the scene. Based on connecting the received radar measurements to a shift of the reflection field with a receiver unknown position shift. Wherein the receiver unknown position shift defines an error between the receiver positions stored in the memory and actual positions of the receivers. The reflection field is generated by reflecting the transmitted field from the scene in accordance with the reflectivity of each point in the scene. Connecting the reflection field to a shift of the incident field with a transmitter unknown position shift. Wherein the transmitter unknown position shift defines an error between the transmitter positions stored in the memory and actual positions of the transmitters. Solving the radar image recovery problem as a multilinear problem of joint estimation of the reflectivity of each point in the scene, the receiver shift, and the transmitter shift. Outputting via an output interface one or combination of the radar image of the reflectivity of each point in the scene, the receiver shift, or the transmitter shift.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A and FIG. 2B are schematics, when viewed together, illustrate distortion that affects the measured time domain signal of each antenna due to the error in the antenna position, when measuring the reflection of a single target, according to embodiments of the present disclosure;

While the above-identified drawings set forth presently disclosed embodiments, other embodiments are also contemplated, as noted in the discussion. This disclosure presents illustrative embodiments by way of representation and not limitation. Those skilled in the art can devise numerous other modifications and embodiments, which fall within the scope and spirit of the principles of the presently disclosed embodiments.

DETAILED DESCRIPTION

Embodiments of the present disclosure relate to radar systems and methods for radar imaging by fusing measurements of various antennas with synchronous or asynchronous clocks.

Figure 1A:
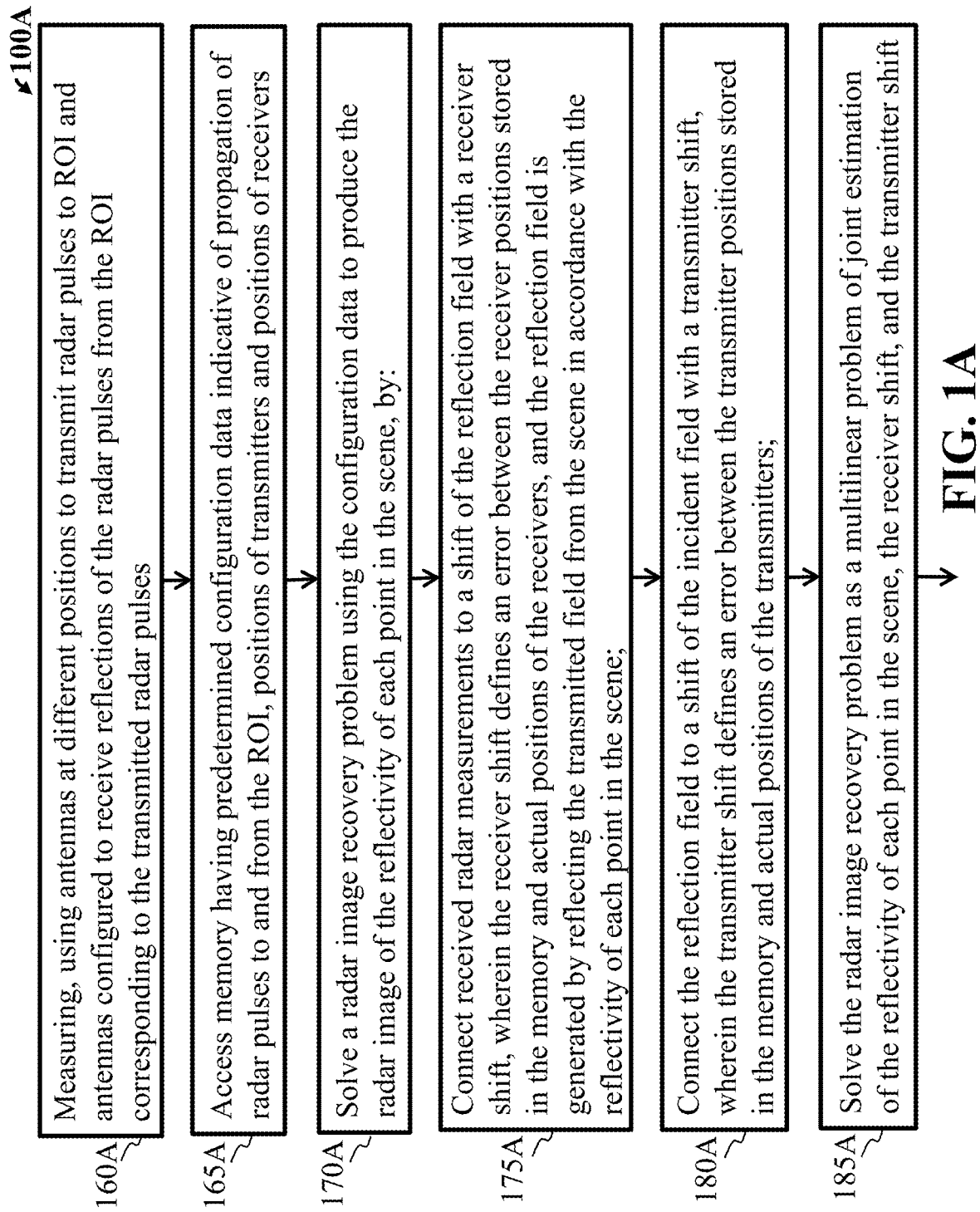
FIG. 1A is a block diagram illustrating steps of a method, according to embodiments of the present disclosure.

FIG. 1A is a block diagram illustrating some steps of a method, according to embodiments of the present disclosure. At least one system and method 100A, includes system and method for a radar system to produce a radar image of a region of interest (ROI).

Step 160A of FIG. 1A, includes measuring, using transmitting antennas at different positions to transmit radar pulses to the ROI and receiving antennas configured to receive reflections of the radar pulses from the ROI corresponding to the transmitted radar pulses. The receivers measure the reflections of the radar pulses to obtain radar measurements of reflectivity of each point in the scene. The measured reflections can be stored in a memory of a hardware processor for each receiver and communicated to a central controller for processing.

Step 165A of FIG. 1A can include a hardware processor in communication with the transmitters, receivers and a memory, that is configured to, access the memory having stored data. The stored data can include predetermined configuration data indicative of propagation of the radar pulses to and from the ROI, as well data indicative of the pulse parameters, such as the pulse shape in time or in frequency. Further, the configuration data can include positions of the transmitters and positions of the receivers, that may include errors such that the stored positions differ from the true positions. The configuration data can be used to define an incident field generated by the radar pulses transmitted by the transmitters from the transmitter positions. The configuration data can be further used to define a reflection field generated by reflections of the incident field from the scene and measured by the receivers at the receiver positions, wherein the reflection field is in accordance with the reflectivity of each point in the scene and the incident field.

The radar transmitters and receivers can be stationary or moving along a pre-designed trajectory. The collection of effective positions of each radar transmitter and receiver forms a virtual array. In some embodiments, the virtual array may be positioned at the same side of the area of interest, where targets are situated, such that the targets reflect the pulses transmitted by the transmitters back to the receivers.

For each effective position, each transmitter or receiver are at a specific true location in space. Furthermore, each transmitter or receiver has some limited knowledge of their current location, namely has knowledge of an assumed location. The assumed location may be inferred in a number of ways. For example, the location might be the position the array was intended to occupy as part of the system design, or the pre-defined trajectory. Alternatively, the assumed location may be inferred using geolocation measurements, such as GPS. In other cases, for example if the arrays are stationary, the assumed location may be acquired through a calibration process. Yet in other cases, the assumed location may be computed using an inertial measurement unit (IMU) operating along the path of the antenna. In many cases, including the ones mentioned, the assumed location might not be accurate and might be a coarse estimate of the true location.

The assumed location may deviate from the true location of the transmitter or the receiver. The deviation is determined by subtracting the assumed location of each antenna in the set of transmitter or receivers from their true location, for all the transmitter and receivers in the set of transmitting and receiving antennas forming the virtual array. The position deviation is caused, for example, by calibration error of stationary positions, errors in tracking the motion through an IMU, or inaccurate GPS. If the deviation, which can be as large as several radar central frequency wavelengths, is not well compensated, the generated radar image will be out of focus. If the deviation is well compensated, the subtraction of the antenna's true position from the antenna's virtual array position should be zero and the corresponding fused radar image is well focused. With proper distance compensation, the radar reflections are aligned in time such that they can add up spatially at the target position to form a focused image of the target in radar imaging process.

However, it may be difficult or expensive to know the location of each antenna with sufficient accuracy to produce a well-focused coherent image. The commonly accepted rule of thumb in the art is that the location of each antenna should be known within a small fraction of the wavelength of the transmitted wave. For example, for pulses centered at 1 GHz, the corresponding wavelength in free space is 30 cm. An acceptable position error in this case would be less than 1 cm, and preferably lower. In contrast, the accuracy of a GPS system currently is ~30 cm in the best use scenarios.

Step 170A of FIG. 1A includes solving a radar image recovery problem using the configuration data to produce the radar image of the reflectivity of each point in the scene, by:

Step 175A of FIG. 1A includes connecting the received radar measurements to a shift of the reflection field with a receiver unknown position shift. Wherein the receiver unknown position shift defines an error between the receiver positions stored in the memory and actual positions of the receivers, and the reflection field is generated by reflecting the transmitted field from the scene in accordance with the reflectivity of each point in the scene.

Step 180A of FIG. 1A includes connecting the reflection field to a shift of the incident field with a transmitter unknown position shift. Wherein the transmitter unknown position shift defines an error between the transmitter positions stored in the memory and actual positions of the transmitters.

Step 185A of FIG. 1A can include solving the radar image recovery problem as a multilinear problem of joint estimation of the reflectivity of each point in the scene, the receiver shift, and the transmitter shift.

Another step of FIG. 1A can include outputting via an output interface one or combination of the radar image of the reflectivity of each point in the scene, the receiver shift, or the transmitter shift.

Figure 1B:
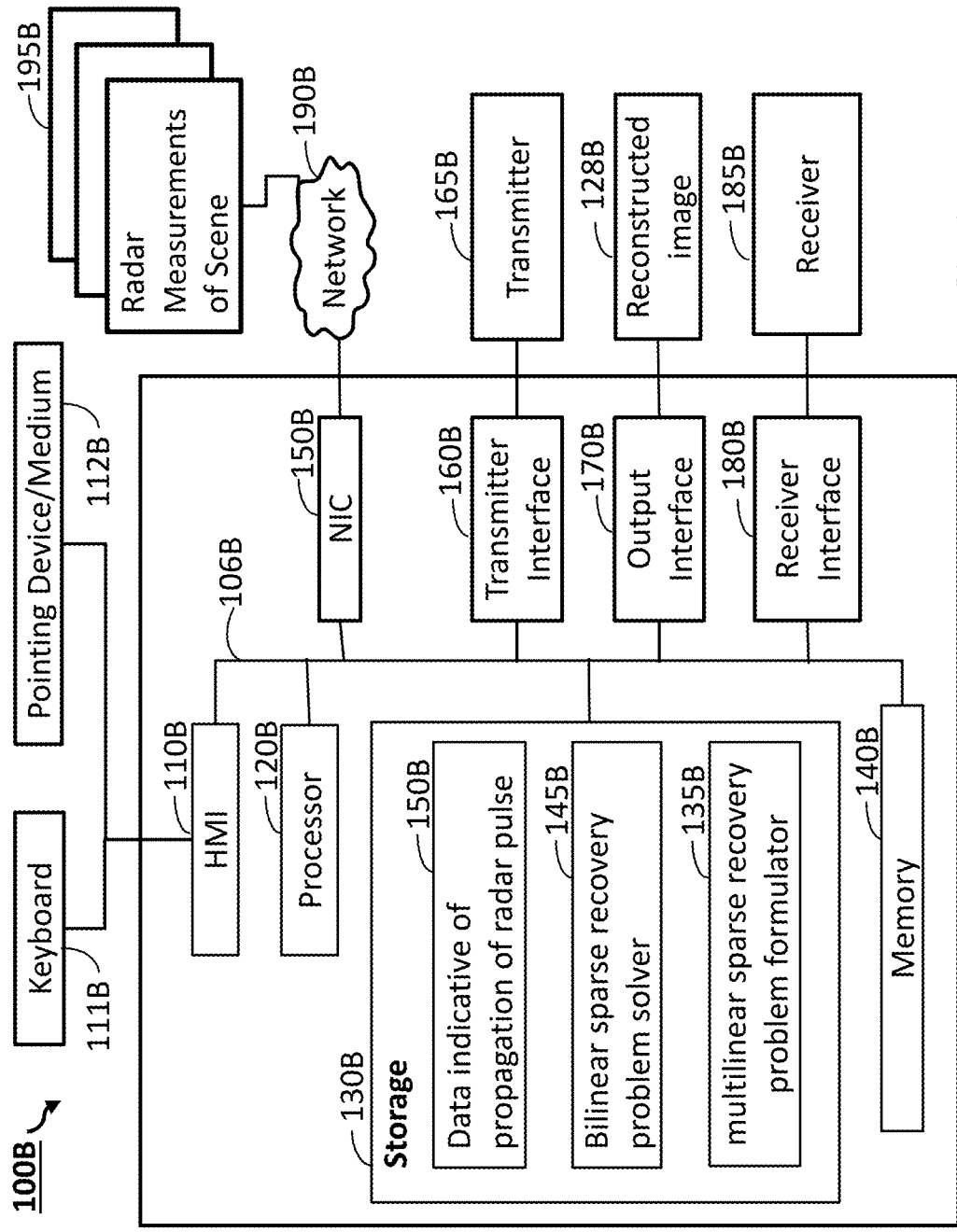
FIG. 1B and FIG. 1C are block diagrams illustrating some components of systems implementing the method of FIG. 1A, according to embodiments of the present disclosure.

FIG. 1B shows a block diagram of a radar system 100B in accordance with some embodiments. The radar system 100B can have a number of interfaces connecting the system 100B with other systems and devices. A network interface controller 150B is adapted to connect the system 100B through the bus 106B to a network 190B connecting the radar system 100B with sensing devices. For example, the radar system 100B includes a transmitter interface 160B configured to command to a transmitter 165B to emit a radar pulse. Using a receiver interface 180B connected to a receiver 185B, the system 100B can receive the reflections of the scene corresponding to the transmitted pulse. In some implementations, the radar system 100B receives the radar measurements 195B, which are the measurements of reflections of a radar pulse transmitted to the scene through the network 190B, The radar system 100B includes an output interface 170B configured to render the reconstructed radar image 128B. For example, the output interface 170B can display the reconstructed image 128B on a display device, store the image into storage medium and/or transmit the image over the network. For example, the system 100B can be linked through the bus 106B to a display interface adapted to connect the system 100B to a display device, such as a computer monitor, camera, television, projector, or mobile device, among others. The system 100B can also be connected to an application interface adapted to connect the system to equipment for performing various tasks.

In some implementations, the radar system 100B includes an input interface to receive the radar measurements of a scene collected from a set of antennas with clock ambiguities. Examples of the input interface include a network interface controller (NIC) 150B, the receiver interface 180B, and a human machine interface 110B. The human machine interface 110B within the system 100B connects the system to a keyboard 111B and pointing device 112B, wherein the pointing device 112B can include a mouse, trackball, touchpad, joy stick, pointing stick, stylus, or touchscreen, among others.

The system 100B includes a processor 120B configured to execute stored instructions 130B, as well as a memory 140B that stores instructions that are executable by the processor. The processor 120B can be a single core processor, a multi-core processor, a computing cluster, or any number of other configurations. The memory 140B can include random access memory (RAM), read only memory (ROM), flash memory, or any other suitable memory systems. The processor 120B can be connected through the bus 106B to one or more input and output devices.

The instructions 130B can implement a method for multilinear sparse recovery problem to produce a radar image 128B of the scene. To that end, the instruction includes a sparse recovery problem solver 145B configured to solve a multilinear sparse recovery problem to produce a radar image of the scene. As defined herein, the multilinear convex sparse recovery problem connects the received radar measurements to a shift of the reflection field with a receiver unknown position shift, wherein the receiver unknown position shift defines an error between the receiver positions stored in the memory and actual positions of the receivers, and the reflection field is generated by reflecting the transmitted field from the scene in accordance with the reflectivity of each point in the scene; connects the reflection field to a shift of the incident field with a transmitter unknown position shift, wherein the transmitter unknown position shift defines an error between the transmitter positions stored in the memory and actual positions of the transmitters. The sparse recovery problem solver solves the radar image recovery problem as a multilinear problem of joint estimation of the reflectivity of each point in the scene, the receiver shift, and the transmitter shift;

To solve the multilinear sparse recovery problem, the radar system 100B stores additional information and/or modules to formulate the problem in advantageous and/or solvable manner. For example, the instructions 130B is indicative of physics of hardware implementation of receivers and transmitters for determining radar measurements. The data 150B captures laws of propagation of emitted radar pulse in the environment, including the laws of how the propagated pulse interacts with the scene. In some embodiments, the data 150B includes storing an induced field B and the laws of how an induced field interacts with any scene to generate a reflected field, reflecting such a propagation. Different configuration of the radar system may have different values of an induced field B and reflection laws. In some embodiments the data 150B includes storing distance fields, which store the distance of each point in the scene from each of the transmitter and the receiver. This data can also be used to compute the induced field and determine the reflected field at the location of the receivers as a function of a scene. In some embodiments the data 150B includes storing the relative position of the transmitters and the receivers. Using this data, distance fields can be calculated for each transmitter and receiver.

Additionally, or alternatively, the instructions 130B can store a multilinear sparse recovery problem formulator 135B configured to formulate the sparse recovery problem using the radar data 150B and the radar measurements 195B. For example, the formulator 135B can transform the received radar measurements in a Fourrier domain, transform the convex sparse recovery problem in a matrix form to simplify the solution, and select and impose various constraints and regularizers on the solution to the multilinear sparse recovery problem.

Figure 1C:
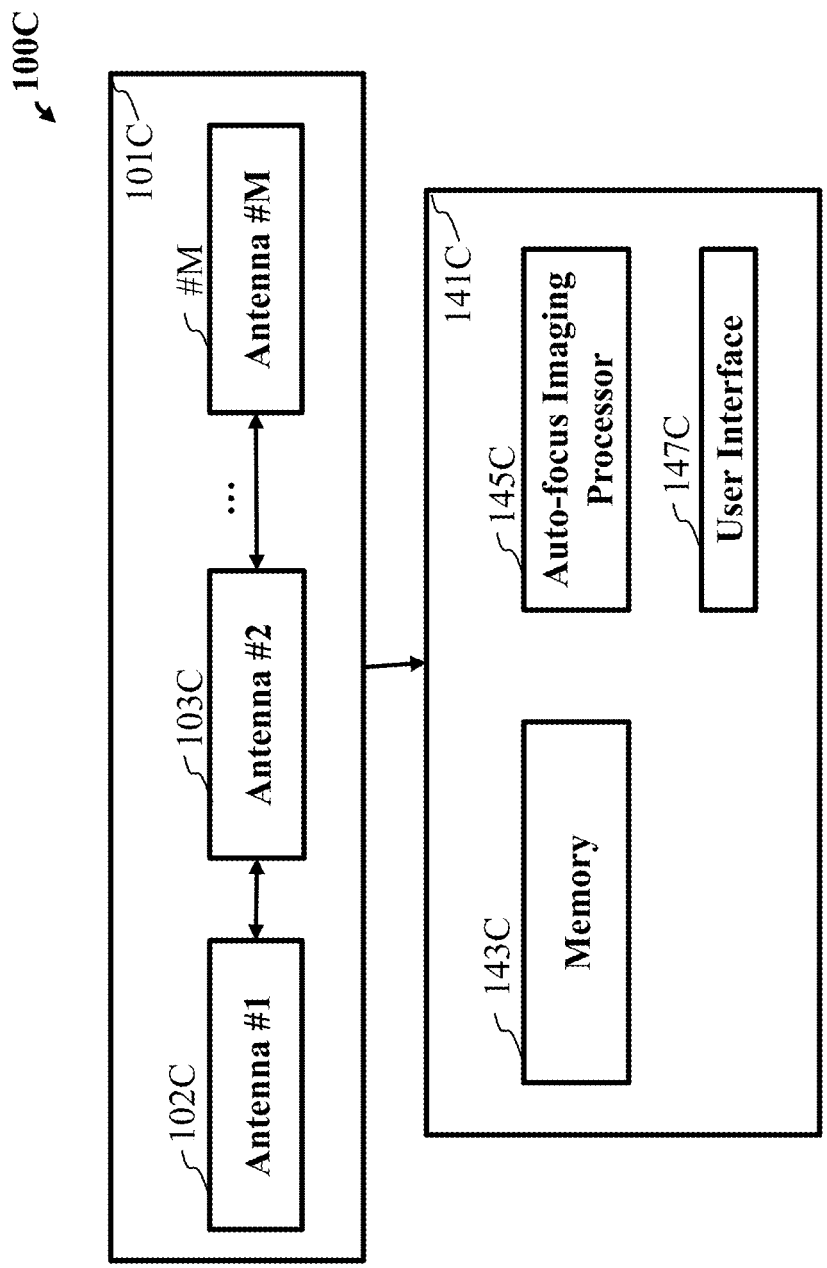

FIG. 1C is a block diagram of some of the radar systems and methods 100C that show a set of antennas 101C that can communicate to each other, and are in communication with a computer/processor 141C. The set of antennas 101C can be synchronized and can store collected data in a memory 143C that is processed by an auto-focus imaging processor 145C of the computer 141C. The auto-focus imaging processor 145C can perform the system and method to produce an auto-focused high resolution two-dimensional (2D) radar image. The imaging result can be shown in an user interface 147C of the computer 141C. Note the computer 141C, can be a processor or multiple computers or multiple processors, that are in communication with the other computer(s) or processor(s).

Figure 1D:
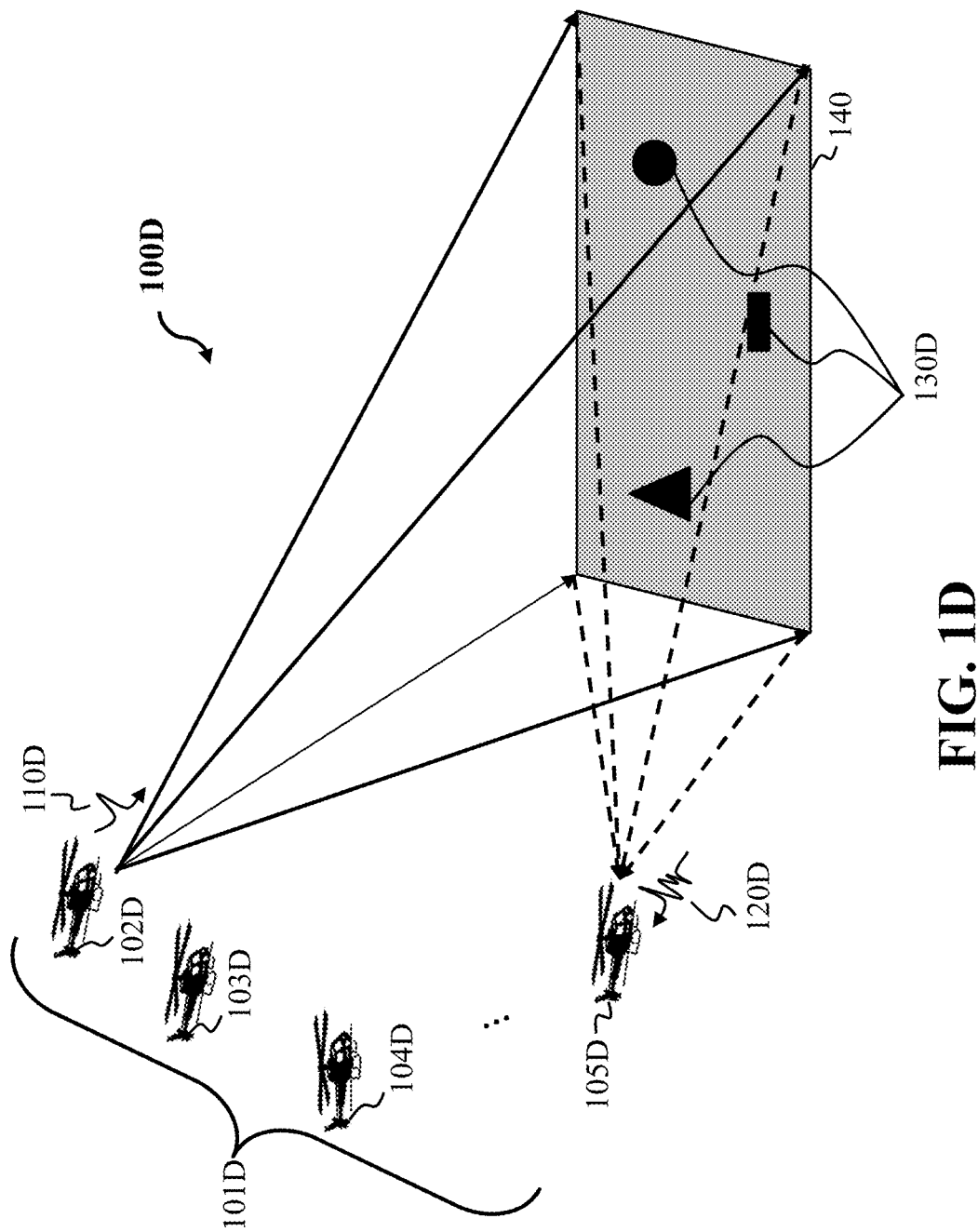
FIG. 1D and FIG. 1E are schematics illustrating a radar system having a set of antennas at different positions to measure a set of reflections from a Region of Interest (ROI) corresponding to transmitted radar pulses, according to embodiments of the present disclosure.

FIG. 1D shows an example embodiment of the present disclosure. The virtual array 101D comprises of transmitting and receiving radars mounted on platforms 102D, 103D, 104D, 105D, observing a scene 140D, with some reflectors 130D. A transmitter may transmit a pulse to the scene 110D, creating an incident field, which is reflected by the reflectors back to the array. The receivers measure the reflected field 120D at their location and record the measurements. The set of antennas 101D may be synchronized or unsynchronized and can store collected data in a memory 140B that is processed by a synchronization and imaging processor 120B of the radar system 100B. The processor 140B can perform the system and method to produce a high-resolution radar image. The imaging result 128B can be shown through output interface 170B.

The system in FIG. 1D also includes systems and methods that determine and store an estimate of the position of the transmitting and the receiving antennas. For example, GPS receiver might be mounted on the platforms, or the platforms might include an IMU that tracks their position as they move. Alternatively, the antennas might be stationary in known fixed locations or mounted on tracks with servo or other mechanisms that enable knowledge of the antenna position within the track. Therefore, the data that the system collects includes an estimate of the position of each antenna.

Figure 1E:
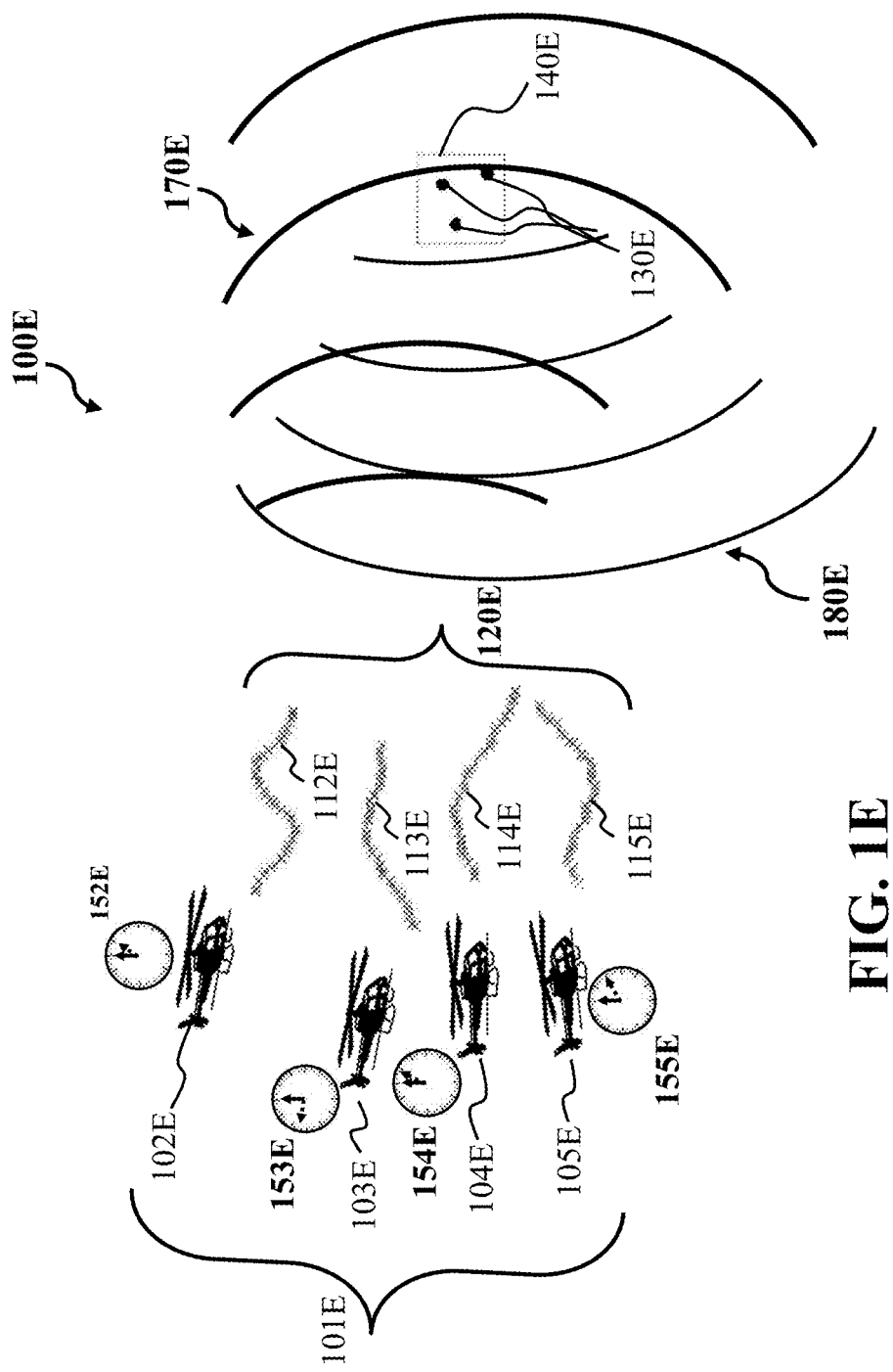

FIG. 1E is a schematic illustrating a distributed moving radar imaging system 100E imaging a ROI 140E with targets 130E, according to some embodiments. The transmitters and receivers are mounted on moving platforms 102E, 103E, 104E, 105E, that move, each on a different path 112E, 113E, 114E, 115E, and form the virtual array 120E. The transmitters transmit radar pulses, which generate an incident field 170E onto the scene. The incident field interacts with the reflectors 130E in the scene, generating a reflected field 180E from the scene, which the receivers on the moving platforms measure at their particular location. The distributed array of moving radar platforms 101E includes at least one radar platform having an antenna cell which is connected to a radar transmitter 102E that generates the radar pulses toward the scene. As noted above, the radar transmitter 102E may be combined with a receiver 102E. The radar receivers 102E, 103E, 104E, 105E acquire reflections reflected by targets 130E in the area of interest (ROI) of the scene 140E.

The incident field $B_t$, where t denotes the time relative to a global clock, is a function of time and space. In some embodiments, it may be represented as a matrix with elements $(B_t)_{n,m}$ where n and m are spatial coordinates. Furthermore, in some embodiments the region of interest, and the corresponding incident field, may be one- or three-dimensional, with corresponding coordinate dimensions, and be represented as a vector or a thee-tensor, instead. Furthermore, in some embodiments, in order to be able to store and process the field and the reflectivity of the ROI as a matrix or a tensor, the coordinates and time may be discretized, i.e. may take discrete values on a grid, such as the integer grid. For example, they may take values in m= 1, ..., M, n=1, ..., N and t=1, ..., T, where M×N is the size of the discretization grid in the ROI, and T is the total time of observation. The integer points on the space grid correspond to physical points on the ROI, according to a particular grid size in each dimension. Similarly, the integer time points correspond to actual time, according to a specific time interval. In some embodiments of the present disclosure, for computational convenience, the field may also be converted using the Fourier transform with respect to the time evolution of the signals, and represented in the frequency domain as $(B_f)_{n,m}$, where f denotes a frequency index and takes values in f=1, ..., F, with corresponding physical frequency denoted as $\omega_f$, indicating the frequency of the components comprising the time-domain signals.

In some embodiments it is possible to compute the incident field as a function of the pulse, by computing the distance of every point in the ROI from the transmitter and using this distance to compute a delay for the pulse to reach that point. In particular, if transmitter k transmits a pulse denoted $P_f^k$ in the frequency domain, then the incident field due to transmitter k is $$(B_f^k)_{m,n} = P_f^k a_{k,m,n} e^{-j\omega_f d_{k,m,n}/c},$$

where $d_{k \cdot m \cdot n}$ is the distance of gridpoint (m, n) from the transmitter k, and c is the speed of wave propagation in the medium. In some embodiments, there is a further attenuation term $a_{k \cdot m \cdot n}$ that may be taken into account in computing the field, capturing the attenuation of the pulse as it propagates to the ROI. In some embodiments, especially when the ROI is small compared to its distance from the antenna, the attenuation is effectively constant and may be ignored.

The scene 140E interacts multiplicatively with the incident field, to generate a reflected field 180E. The reflected field is measured at the location of the receivers to produce the received data in the frequency domain. Specifically, at the location of receiver 1, the received field, and the corresponding recorded signal, is equal to $$R_f^{k,l} = \sum_{m,n} (B_f^k \odot x)_{m,n} e^{-j\omega_f d_{l,m,n}/c}$$

in the frequency domain, where x is a matrix, also indexed by m,n, denoting the reflectivity of the scene at point n, m, element-wise product is denoted using $\odot$, and $d_{l,m,n}$ is the distance of gridpoint (m, n) from receiver 1.

In some embodiments, the radar receivers 102E, 103E, 104E, 105E each have a local clock 152E, 153E, 154E, 155E, which may be fast or slow relative to a global clock. The local clocks are used to timestamp the received reflections. For example, in some embodiments, the time stamping might be using an absolute time. In some other embodiments, the time stamping could be relative to one or more commonly agreed start times, usually referred to as zero. In some other embodiments, time stamping might be implicit, for example by the sequence of recorded samples of the signal, at regular intervals, relative to the starting time of the recording.

A fundamental challenge that arises in distributed array imaging comes from uncertainty in the clock and the position of the antennas. Advanced positioning and navigation systems, such as the global navigation satellite system (GPS/GNSS) and the inertial navigation system (INS) provide somewhat accurate position and timing information, and tracking, timing and synchronization algorithms can further improve the accuracy with reasonable cost. However, the remaining uncertainty in the true errors can be significant, considering the operating frequency of the transmitting and receiving antennas. As a result, the received signal contains a gain and phase ambiguity when the inexact position and clock timing is used as reference. Consequently, applying standard reconstruction techniques without accounting for the position and timing perturbation produces out-of-focus radar images.

FIG. 2A and FIG. 2B are schematics, when viewed together, illustrate distortion that affects the measured time domain signal of each antenna due to the error in the antenna position, when measuring the reflection of a single target, according to embodiments of the present disclosure. Further, FIGS. 2A and 2B are schematics of step 160A of FIG. 1A illustrating the effect of the position perturbation on the aligning in time of the set of radar reflections. Further, FIG. 2A are schematics of the ideal case that all radar positions are perfectly known.

The array 201A is observing a single reflector 230A by transmitting a pulse 210A using a transmitter mounted, say on platform 202F and receiving its reflection using receivers mounted on all platforms. Each platform records its position as 202A, 203A, 204A, 205A, with some errors, such that the actual position of the platform is 202x, 203x, 204x, 205x, respectively. The corresponding signals 212A, 213A, 214A, 215A demonstrate the reflection the platforms would receive if they were positioned at 202F, 203F, 204F, 205F, respectively, i.e., where they think they are. However, as show in FIG. 2B in dotted lines, the platforms receive signals 212B, 213B, 214B, 215B, instead. In general if the transmitter or a receiver is closer to a reflector, the reflections will arrive earlier. If they are father, the reflections will arrive later.

Typical approaches in the art model both the transmitter and receiver position errors as a common phase error in the frequency domain and correct it before reconstructing the radar image. Some experimental approaches model both the transmitter and receiver position errors as a common shift in the whole acquired scene, and correct the shift.

In contrast, various embodiments of this present disclosure model the transmitter position error as a corresponding unknown shift of the incident field. In turn, this shift is modeled as a convolution of the incident field with a shift kernel representing the compensation, i.e., a signal which is one-sparse, and has the same dimensionality as the field and the ROI. Similarly, various embodiments of this present disclosure model the receiver position error as a corresponding unknown reverse shift of the reflected field. In turn, this shift is modeled as a convolution of the reflected field with a shift kernel representing the compensation, i.e., a signal which is one-sparse, and has the same dimensionality as the field and the ROI. A sparse signal is such that most of its coefficients are zero and very few are non-zero. A one-sparse signal, in particular, is such that only one of its coefficients is non-zero and all the remaining ones are equal to zero. A shift kernel is a one-sparse signal with the non-zero coefficient located at the position of the shift that the kernel implements.

Figure 2C:
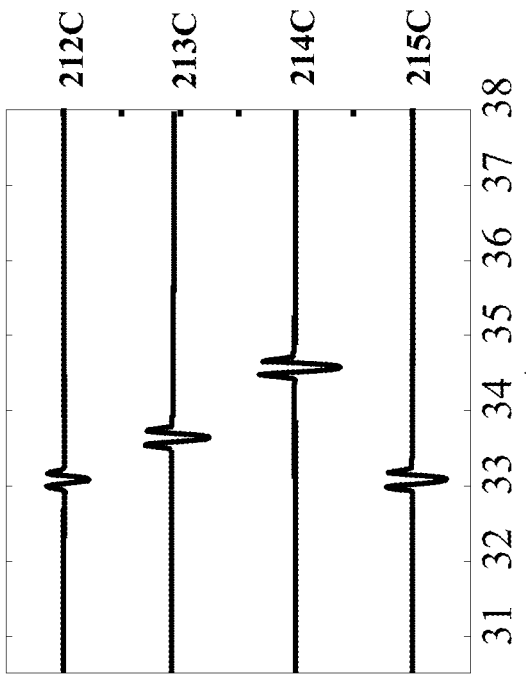
FIG. 2C and FIG. 2D are schematics, when viewed together, illustrate distortion that affects the measured time domain signal of each antenna due to the uncertainty in the antenna clocks, when measuring the reflection of a single target, according to embodiments of the present disclosure.
Figure 2D:
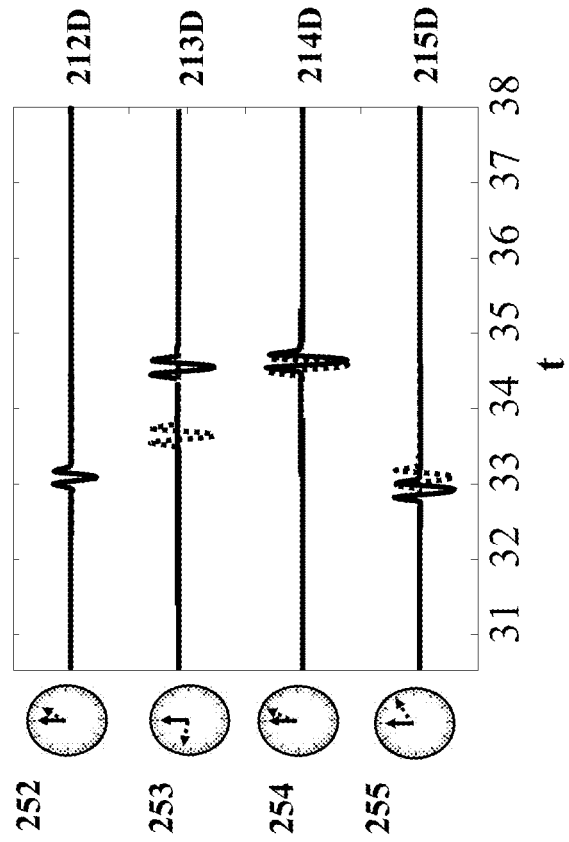

FIG. 2C and FIG. 2D are schematics, when viewed together, illustrate distortion that affects the measured time domain signal of each antenna due to the error in each radar clock, when measuring the reflection of a single target, according to some embodiments. Further, FIG. 2C are schematics of the ideal case that all radar clocks are perfectly synchronized. A distributed array 201C is shown comprised of a transmitter/receiver platform 202C and receiver-only platforms 203C, 204C, 205C. The transmitter antenna transmits a pulse 210C to the scene which contains a single reflective target 230C. The pulse is reflected by the reflective target and its reflection 220C is acquired by all the receiving antennas in all the receiving platforms 202C, 203C, 204C, 205C. The antennas 202C-205C form a distributed array of antennas 201C. If the clocks of all transmitters and receivers are perfectly synchronized, according to the global time $t_0$, the signals 212C, 213C, 214C, 215C received by each antenna 202C, 203C, 204C, 205C comprise of the pulse delayed and scaled according to the round-trip distance of the transmitter antenna to the single reflector and back to each receiver.

FIG. 2D is a schematic illustrating the mapping between a set of antennas exhibiting clock errors and measuring the reflection of a single target to a set of antennas having synchronized clocks and measuring shifted versions of the same target from FIG. 2C, according to embodiments of the present disclosure. Further, FIG. 2D is a schematic of the signal model that the measured reflections of a single target with erroneous clocks is equivalent to time-shifting measurements of the same target with clock synchronized to the global time.

FIG. 2D demonstrates the effect of clock errors in the acquired data, by showing how the signals are recorded and time stamped 212D, 213D, 214D, 215D, by the local time of each receiver. The local clocks of each system are 252, 253, 254, 255, where a solid line shows the local time, compared to the global time in a dashed line. In the example in the figure, some clocks might run slow, 252, 254, i.e., show time 0 when the global time is past zero, or fast 253, 255, i.e., show time 0 when global time has not reached zero yet. Depending on the time shift, the corresponding signals might be time shifted to appear earlier or later (solid lines) compared to how the signals would have been recorder if all the clocks have been synchronized (dotted lines).

In this example, the transmitter/receiver clock 252 runs slow. Thus, the transmitted pulse 210C is delayed by the clock error and its reflections arrive delayed to the receiver. The receiver antenna of the transmitter/receiver platform 202C exhibits the same clock error, which advances the signal in the local time t and, thus, cancels out the delay of the transmission for this recorder signal 212D. On the other hand, the clock 253 of receiver 203C runs fast in this example. Thus, the recorder signal 213D is delayed by the cumulative error of the two clocks, compared to the signal 213C that would have been recorded if all platforms where synchronized to the global clock. Similarly, the clock 254 of receiver 204C might run slow by an amount smaller that the error of the transmitter clock 252. Thus, the recorder signal 214D is delayed by the difference of the errors of the two clocks, compared to the signal 214C that would have been recorded if all platforms where synchronized to the global clock. Similarly, the clock 255 of receiver 205C might run fast by an amount larger that the error of the transmitter clock 252. Thus, the recorder signal 215D is advanced by the difference of error of the two clocks, compared to the signal 215C that would have been recorded if all platforms where synchronized to a global clock.

Contrary to modeling the timing error as a phase error in the frequency domain and correcting it before reconstructing the radar image, various embodiments model the timing error as a convolution with a shift kernel representing the compensation, i.e., a signal which is one-sparse. A sparse signal is such that most of its coefficients are zero and very few are non-zero. A one-sparse signal, in particular, is such that only one of its coefficients is non-zero and all the remaining ones are equal to zero. A shift kernel is a one-sparse signal with the non-zero coefficient located at the time instance of the time delay or the advance that the kernel implements.

Figure 3A:
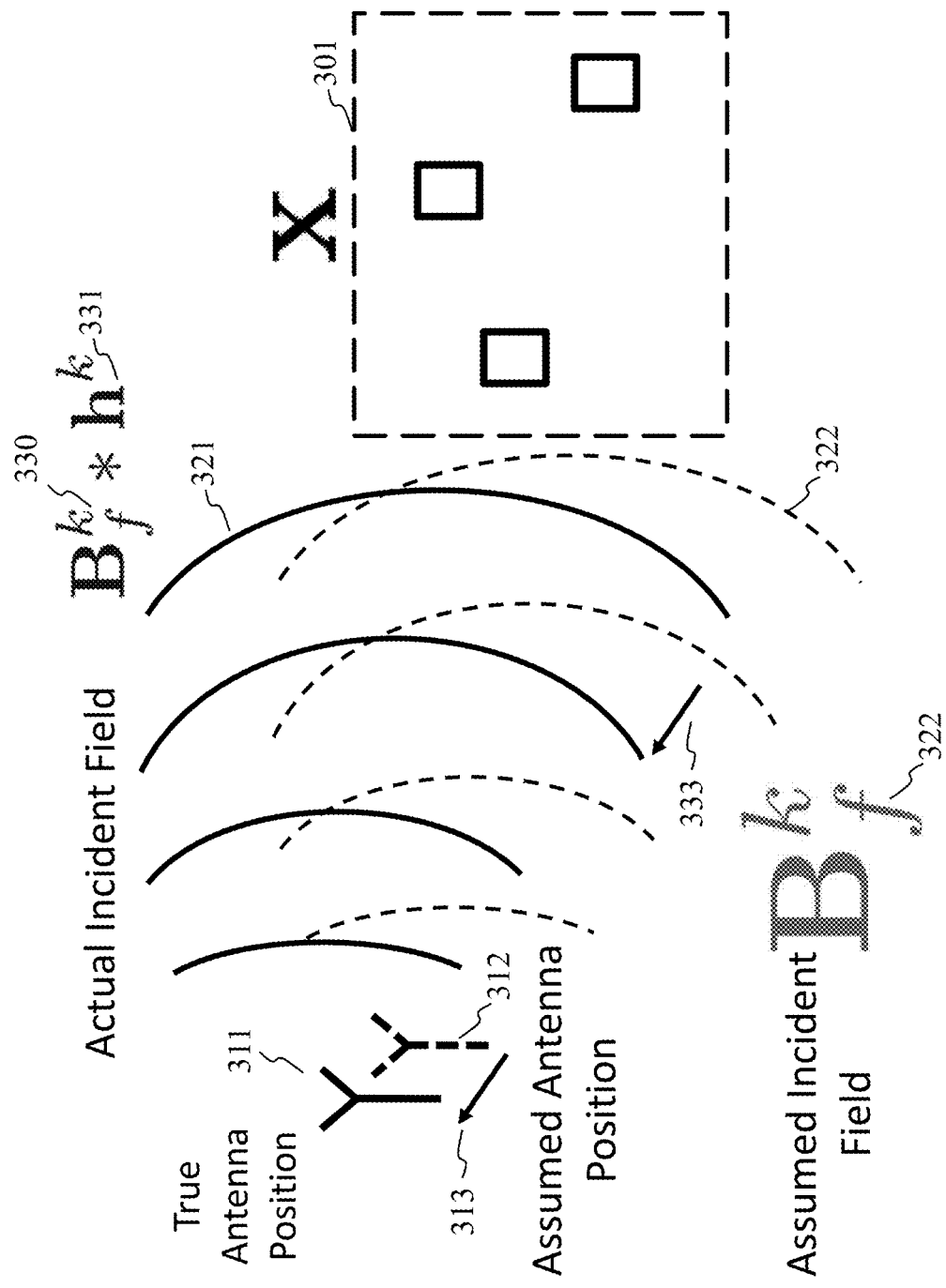
FIG. 3A is a schematic illustrating the effect of an error in a transmitting antenna position to the incident field, according to embodiments of the present disclosure.

FIG. 3A demonstrates how the incident field induced by a transmitting antenna is affected by an error in the antenna position. In particular, the true antenna position 311 exhibits a shift 313 compared to the assumed antenna position 312. The true incident field 321, induced by the antenna onto the scene 301, is a shift 323 of the assumed incident field 322, by the same amount as the shift 313 of the antenna position due to the error. This shift can be represented as a convolution 330 of the assumed incident field with a shift kernel 331. In particular, the incident field under perturbed position of the transmitter is equal to $$\tilde{B}_f^k = B_f^k * h^k$$

where $h^k$ is the unknown shift kernel modeling the position error.

Figure 3B:
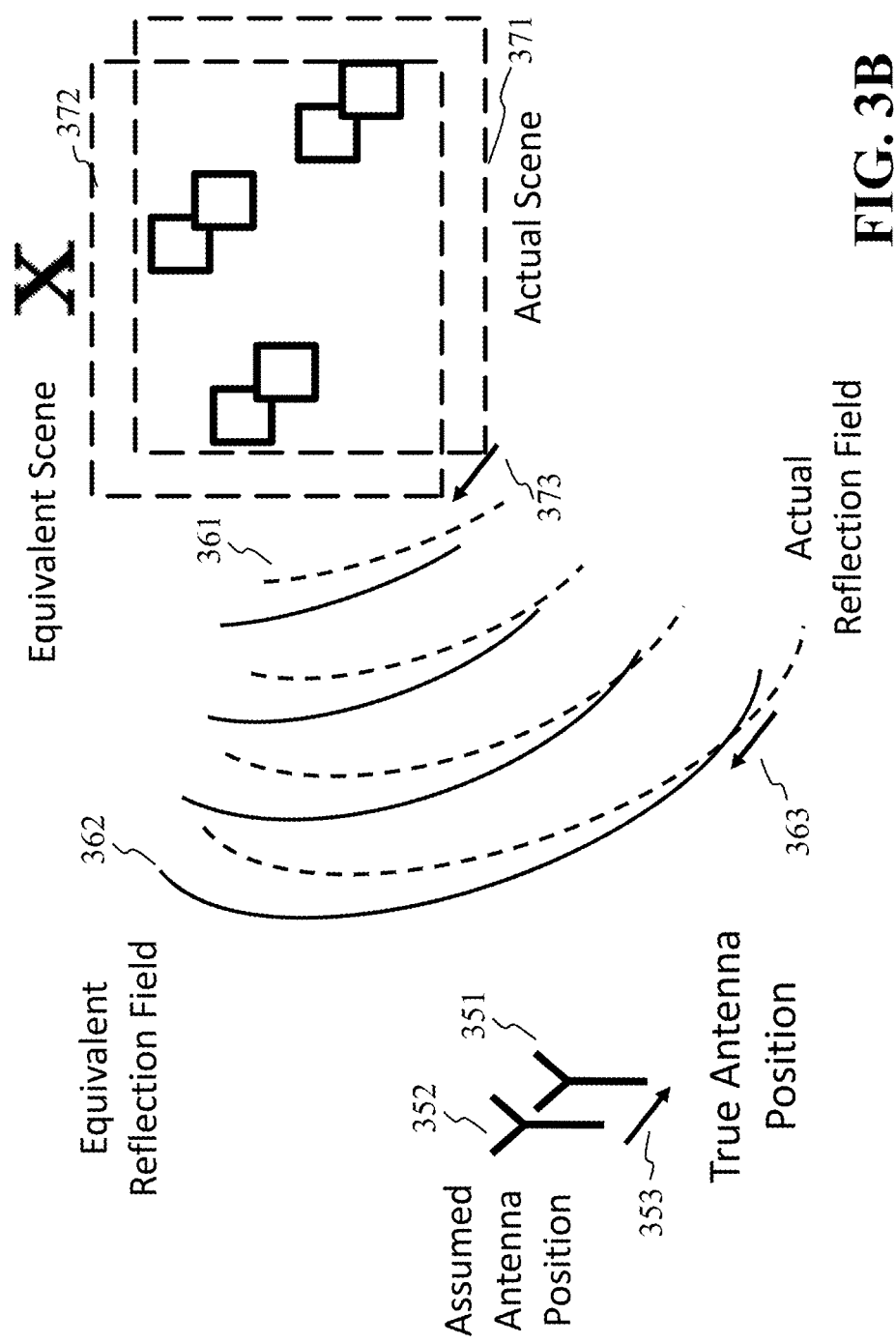
FIG. 3B is a schematic illustrating the effect of an error in a receiving antenna position to the measurements of the reflection field, according to embodiments of the present disclosure.

Similarly, FIG. 3B demonstrates how the reflection field measured by the receiving antenna is affected by an error in the antenna position. Specifically, the measurements acquired at the true antenna position 351 of the actual reflection field 361, reflected by the actual scene 371 are equivalent to measurements acquired at the assumed antenna position 352 from an equivalent reflection field 362, reflected from an equivalent scene 372, such that the antenna shift 353 is the same as the shift of the reflection field 363 and the scene 373. Thus, the resulting reflected field at the true position of receiver l due to the pulse transmitted by transmitter k is equal to $$\tilde{R}_f^{k,l} = \sum_{m,n} \left( (\tilde{B}_f^k \odot x)_{m,n} * \tilde{h}^l \right) e^{-j\omega_f d_{l,m,n}/c} = \sum_{m,n} \left( ((B_f^k * h^k) \odot x)_{m,n} * \tilde{h}^l \right) e^{-j\omega_f d_{l,m,n}/c}$$

where $\tilde{h}^l$ is the kernel modeling the reverse position shift of the reflected field due to the position error of receiver l. If multiple transmitters transmit at the same time, the measurements of the field recorded and stored by receiver l is the sum of the reflected fields due to all transmissions, i.e., over all k. Using $y_f^l$ to denote Therefore, the data recorded by receiver l in the frequency domain, is equal to $$y_f^l = \sum_{m,n} \left( \left( \left( \sum_k B_f^k * h^k \right) \odot x \right)_{m,n} * \tilde{h}^l \right) e^{-j\omega_f d_{l,m,n}/c}$$

Figure 3C:
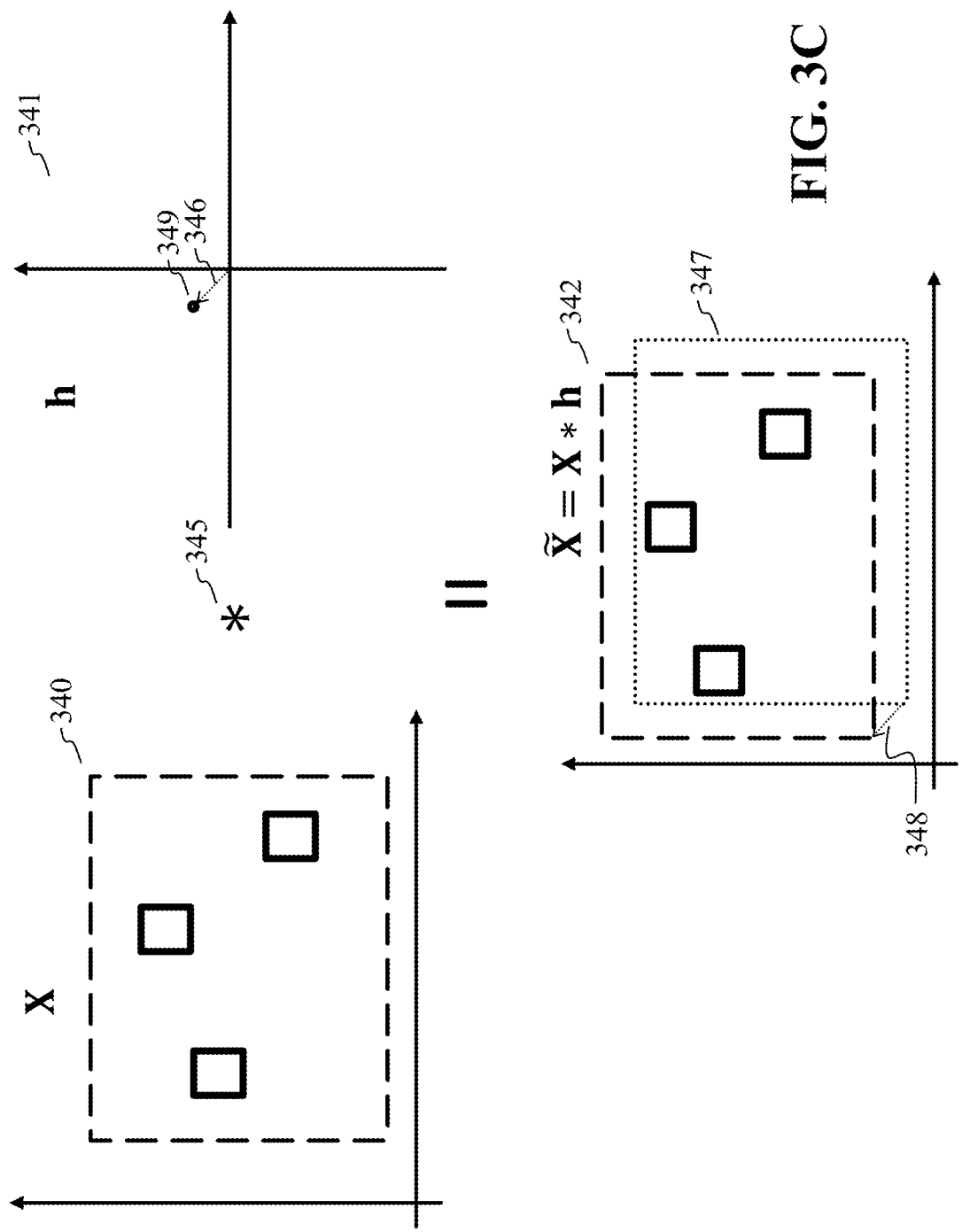
FIG. 3C is a schematic illustrating how a shift in an image or a field can be described using a convolution, according to embodiments of the present disclosure.

FIG. 3C demonstrates how convolution with a shift kernel can be used to model a spatial shift of a signal. In particular the signal 340 when convolved 345 with the shift kernel 341 is equal to a shifted signal 342, such that the shift 348 of the signal, with respect to its original position 347 is equal to the shift indicated by the shift kernel 346. Thus, determining a correct shift kernel 341, is equivalent to determining the shift itself. The shift kernel for a two-dimensional spatial shift is a two-dimensional signal in space containing only a single impulse 349 placed at the right offset 346. Similarly, the shift kernel for the three-dimensional spatial shift is a three-dimensional signal in space, containing only a single impulse placed at the right offset. In all cases, a shift kernel is 1-sparse and sums up to 1.

In order to recover the radar image and the shift kernels, the system should determine a radar reflectivity image x and all kernels $h^k$ and $\tilde{h}^l$, corresponding to the transmitter and the receiver shifts, respectively, such that the determined radar reflectivity image and kernels explain the data recorded by the receivers, i.e., $$\text{determine } x, h^k, \tilde{h}^l, \text{ s.t., } y_f^l \approx \sum_{m,n} \left( \left( \left( \sum_k B_f^k * h^k \right) \odot x \right)_{m,n} * \tilde{h}^l \right) e^{-j\omega_f d_{l,m,n}/c}$$

and such that the radar reflectivity image x is sparse in an appropriate domain, and all kernels and $h^k$ and $\tilde{h}^l$, are 1-sparse and sum to 1.

Multilinear Optimization

This is a multilinear problem, since it is linear in each of the x, $h^k$ and $\tilde{h}^l$, but they all interact multiplicatively with each other. The solution to the problem comprises of the three sets of unknowns to be determined, namely x, $h^k$ and $h^k$, for all k and l. In some embodiments, the solution is determined using a sparse multilinear optimization problem such that a penalty function is minimized at the correct solution. The penalty function may include a component that increases the penalty if the solution does not explain the data recorded by the receivers. In some embodiments the cost function may include a term that penalizes the solution if one or more of its components are not sparse. In some embodiments the cost function may include terms that penalize the solution if the sum of any of the shift kernels is different than 1. Other embodiments might impose a hard constraint on the solution that ensures that the sum of each of the shift kernels is equal to 1. Some embodiments may further impose that each of the shift kernels has positive components. Other embodiments might explicitly enforce the constraint that the shift kernels are exactly 1-sparse.

For example, an embodiment might solve the following optimization problem $$\min_{x,h^k,\tilde{h}^l} \sum_{l,f} \left\| y_f^l - \sum_{m,n} \left(\left(\left(\sum_k B_f^k * h^k\right) \odot x\right)_{m,n} * \tilde{h}^l\right) e^{-j\omega_f d_{l,m,n}/c} \right\|_2^2 +$$

$$\sum_k \lambda_k \|h^k\|_1 + \sum_l \mu_l \|\tilde{h}^l\|_1 + \rho \|x\|_1,$$

where the quadratic, $\ell_2$, terms of the form $\|\cdot\|_2^2$ penalize solutions that do not explain the data, and the $\ell_1$ terms of the form $\|\cdot\|_1$ penalize solutions that are not sparse.

Some embodiments of this present disclosure might further penalize some solutions using a total variation (TV) norm, in addition or instead the $\ell_1$ norm. The TV norm often improves performance if the region of interest contains extended targets, because it is better able to model their extent than the $\ell_1$ norm.

Figure 7A:
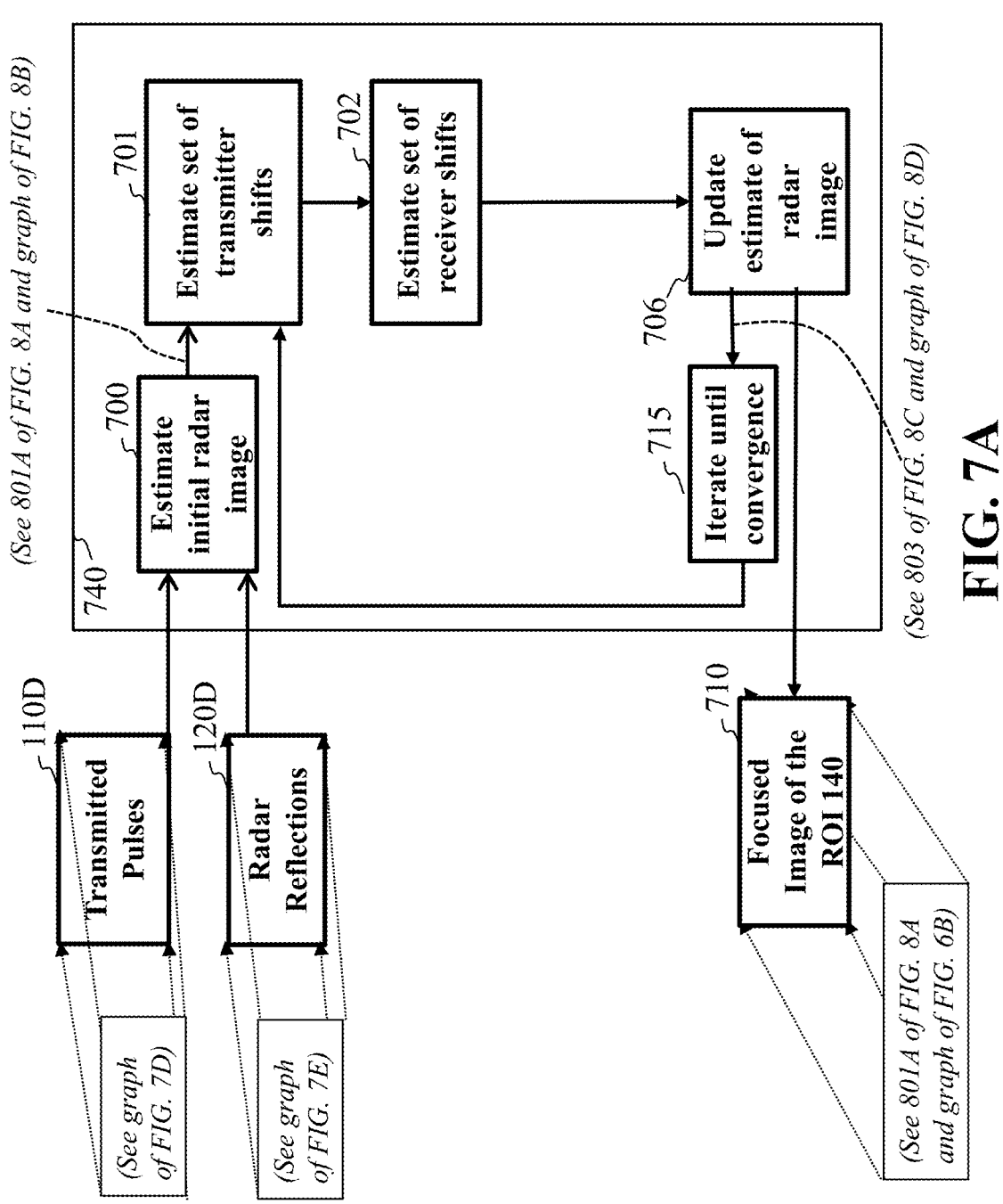
FIGS. 7A, 7B, and 7C are block diagrams of the method for estimating the radar image and the set of transmitter and receiver shifts and delays, according to some embodiments of the present disclosure.

To solve this multilinear optimization problem, some embodiments use alternating minimization. This allows to separate the problem to multiple linear, and therefore convex and easier to solve, problems, which are solved in an alternating fashion. In particular, the problem is linear in each of the three sets of unknown variables, x, $h^k$ and $\tilde{h}^l$, assuming one is considered unknown and the other two are considered known at each subproblem. Thus, an alternating optimization approach would alternate between improving the estimates of each of x, $h^k$ and $\tilde{h}^l$, one at a time, considering the other estimates known and fixed. Typically the order of the optimization does not matter and may be randomized at each iteration. The alternating optimization continues cycling though each of the sets of unknowns until some convergence criterion is met. FIG. 7A illustrates the process in an example embodiment.

There are several approaches to solving each of the linear subproblems. For example, a fast iterative shrinkage thresholding algorithm (FISTA) or a variant of it, may be used to efficiently impose sparsity of the constraints. Other embodiments might employ greedy algorithms, such as an iterative hard thresholding (IHT) or a matching pursuit (MP).

Since at each update step of the alternating minimization it is only necessary to update the estimate, some embodiments might not solve each linear subproblem to completion but only compute a few steps toward improving each of the estimates. The overall stopping criterion for the alternating minimization is used to ensure that the final estimates converge, even if the estimates computed when solving the linear subproblems do not. Other embodiments might solve each of the subproblems to completion.

While multilinear optimization problems are easier to solve than generic non-convex problems, and are very well studied, they are still harder than linear problems. While the latter are convex, and, therefore, have guaranteed solutions, multilinear problems are not. Furthermore, the more the multiplicative coupled sets in the proble, the more difficult it becomes. For example, a typical bilinear problem, which has only two sets of multiplicatively coupled variables, is easier to solve than a typical trilinear one, which has three sets of multiplicatively coupled variables. Therefore, it is desirable to keep the number of coupled sets of variables as small as possible.

In some embodiments, the only part of the solution that is of interest is the unknown radar image x. In other embodiments, the shift kernels $h^k$ and $\tilde{h}^l$ may be used to extract information about the true position of the transmitting and receiving antennas, respectively, and assist the platforms on which the antennas are mounted in correcting the estimate of their own position.

Clock and Synchronization Ambiguities

In some embodiments of the present disclosure, in addition to position ambiguities, the antennas may also not be accurately synchronized. This introduces additional phase ambiguities in the signal. However, one of the key realizations in this present disclosure is that these ambiguities can also be explicitly and accurately modeled and taken into account in reconstructing the radar image.

Figure 4A:
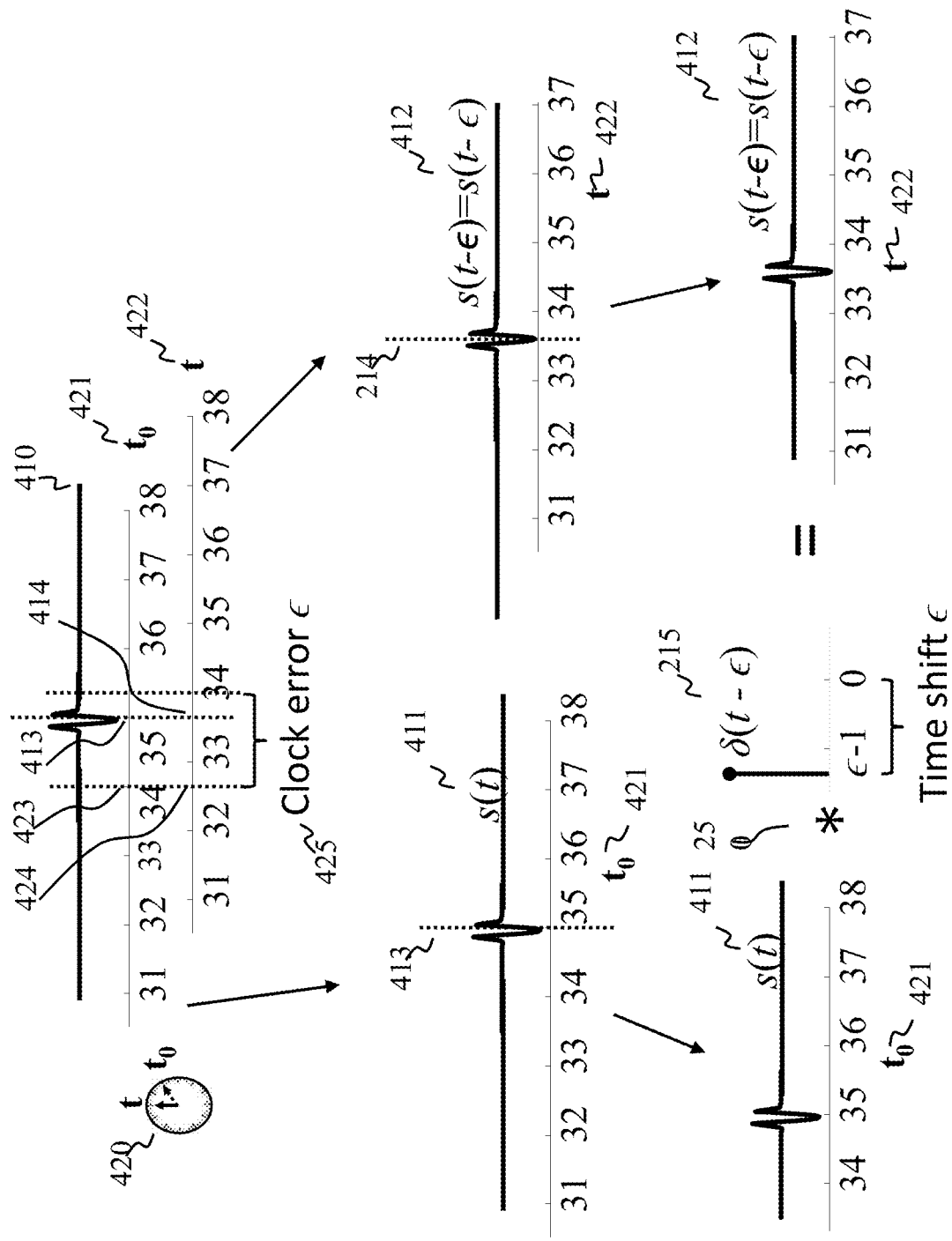
FIG. 4A is a schematic demonstrating an example of the effect of clock error to the time stamps of the recorded signal, according to another embodiment.

FIG. 4A is a schematic demonstrating an example of the effect of clock error to the time stamps of the recorded signal used by some embodiments. In particular, a receiver has a local clock 420, which keeps a local time 422. The local clock exhibits an error ϵ 425 relative to the global time 421. In this example, the local clock is running slow, i.e., at any time instance, the local time is lower than the global time. In other words, when the global clock reaches a certain time mark 423, e.g., at 34 time units, the local clock has not reached it yet, e.g., has reached the time mark at 32.5 time units 424 and ϵ is a 1.5 time units advance. A typical convention in the art is that delays are represented as positive time shifts and advances as negative time shift, i.e., in this example ϵ=−1.5 time units.

Still referring to FIG. 4A, a signal 410 recorded and time stamped using the time marks of the local clock 412 will appear to have timestamps that are smaller compared to the same signal recorder and time stamped using the global clock 411. For example, the global time instance of the middle negative peak of the pulse in the FIG. 413, is 35, while the recording using the local clock time stamps the same negative peak at 33.5, 414. If the local clock is slow, then for the same point in the signal, the recorded time stamp is advanced by ϵ compared to the time stamp of the global clock. If the local clock is fast, then the recorder time stamp is delayed by ϵ compared to the time stamp of the global clock.

FIG. 4A further demonstrates by way of example that time shifts are equivalent to convolutions with a shift kernel and that a shift-kernel is a one-sparse signal. In particular, the ideal signal timestamped with the global clock 411 is advanced by time ϵ to produce the signal actually recorded and time stamped with the local clock 412. The time shift, as well-known in the art, can be represented using a convolution 450 with an impulse δ(t−ϵ) 415, i.e., an impulse function centered at the time instance ϵ. Since this impulse only has one non-zero coefficient, at time ϵ, it is a one-sparse signal.

Some embodiments are based on recognition that representing a delay using a one-sparse signal expands the dimensionality of the representation. For example, using a discrete-time representation of the one-sparse signal with sampling interval Δ time units, to represent a maximum time shift of T time units requires a shift kernel of size 2T/Δ+1 instead of a single time parameter ϵ. If an application requires estimation of a time delay, representing the time delay as a single value ϵ requires the estimation of a single parameter. Instead, representing the time delay using a shift kernel requires the estimation of 2T/Δ+1 parameters, i.e., requires a significantly larger problem. Furthermore, if the maximum uncertainty in the time shift increases, the size of the shift kernel-based representation increases proportionately in size, i.e., in number of parameters to be estimated, and requires more data to have sufficient information. For comparison, if the delay is represented as a single parameter, the problem size is constant, irrespective of the maximum uncertainty in the time shift. The constraint that the shift kernel is one-sparse may help in reducing the data requirements of the estimation problem, despite the higher dimensionality, but it does not eliminate the dependency on the maximum length, and does not reduce the computational or memory complexity of the estimation.

Figure 4B:
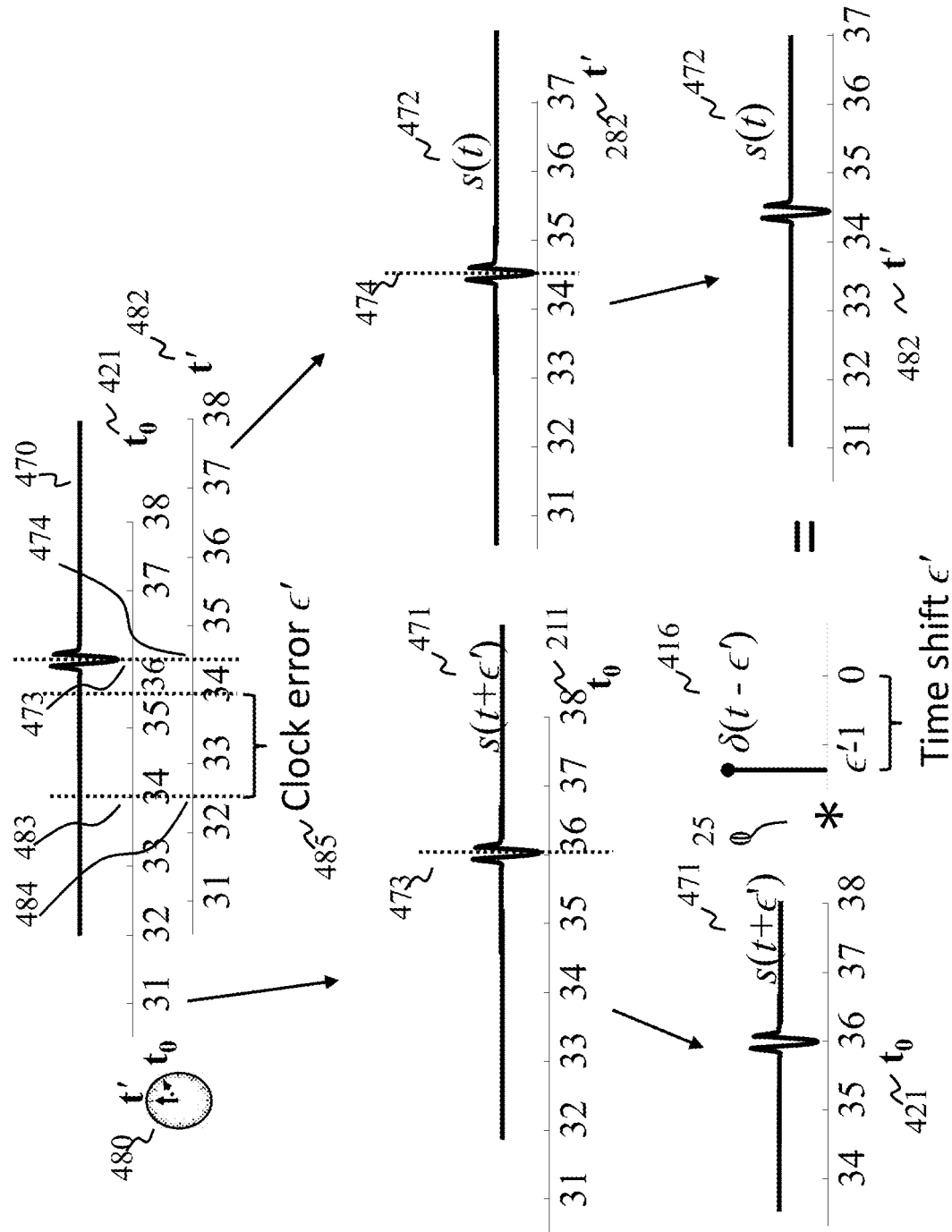
FIG. 4B is a schematic demonstrating another example of the effect of clock error to the time stamps of the transmitted signal, according to another embodiment.

FIG. 4B is a schematic demonstrating another example of the effect of clock error to the time stamps of the transmitted signal according to another embodiment. In particular, a transmitter has a local clock 480, which keeps a local time 482. The local clock exhibits an error $\epsilon'$ 485 relative to the global time 421. In this example, the local clock is running slow, i.e., at any time instance, the local time is lower than the global time. In other words, when the global clock reaches a certain time mark 483, e.g., at 34 time units, the local clock has not reached it yet, e.g., has reached the time mark at 32.5 time units 484 and $\epsilon'$ is a 1.5 time units advance, i.e., similarly to the example above, in this example $\epsilon'=-1.5$ time units.

Still referring to FIG. 4B, a signal, such as a pulse, 470 transmitted with timing managed by the local clock 482 will appear to have been transmitted later, i.e., to have been delayed, with respect to the global clock. For example, the transmitter may time the transmission of a signal such that the middle negative peak of a pulse occurs at time 34.5 in the local clock 474. In this case, because of the local clock error, the signal transmitted will have the middle negative peak of a pulse occur at time 36 in the global clock 473. Thus, the transmitted signal with respect to the global clock 471 is time advanced by $\epsilon'$ compared to the transmitted signal with respect to the local clock 472. Since in this example E' is negative, a time advance by $\epsilon'$ is in fact a delay by $-\epsilon'=1.5$ time units. As already described, this time shift can be represented as a convolution 450 with a shift kernel 416. Since the transmitted signal with respect to the global clock 471 is time advanced by $\epsilon'$ compared to the transmitted signal with respect to the local clock 472, the shift kernel corresponds to a delay by $\epsilon'$.

If the local clock, instead, is running fast, then the signal transmitted would be advanced with respect to the global clock compared to the signal with respect to the transmitter's local clock.

Figure 4C:
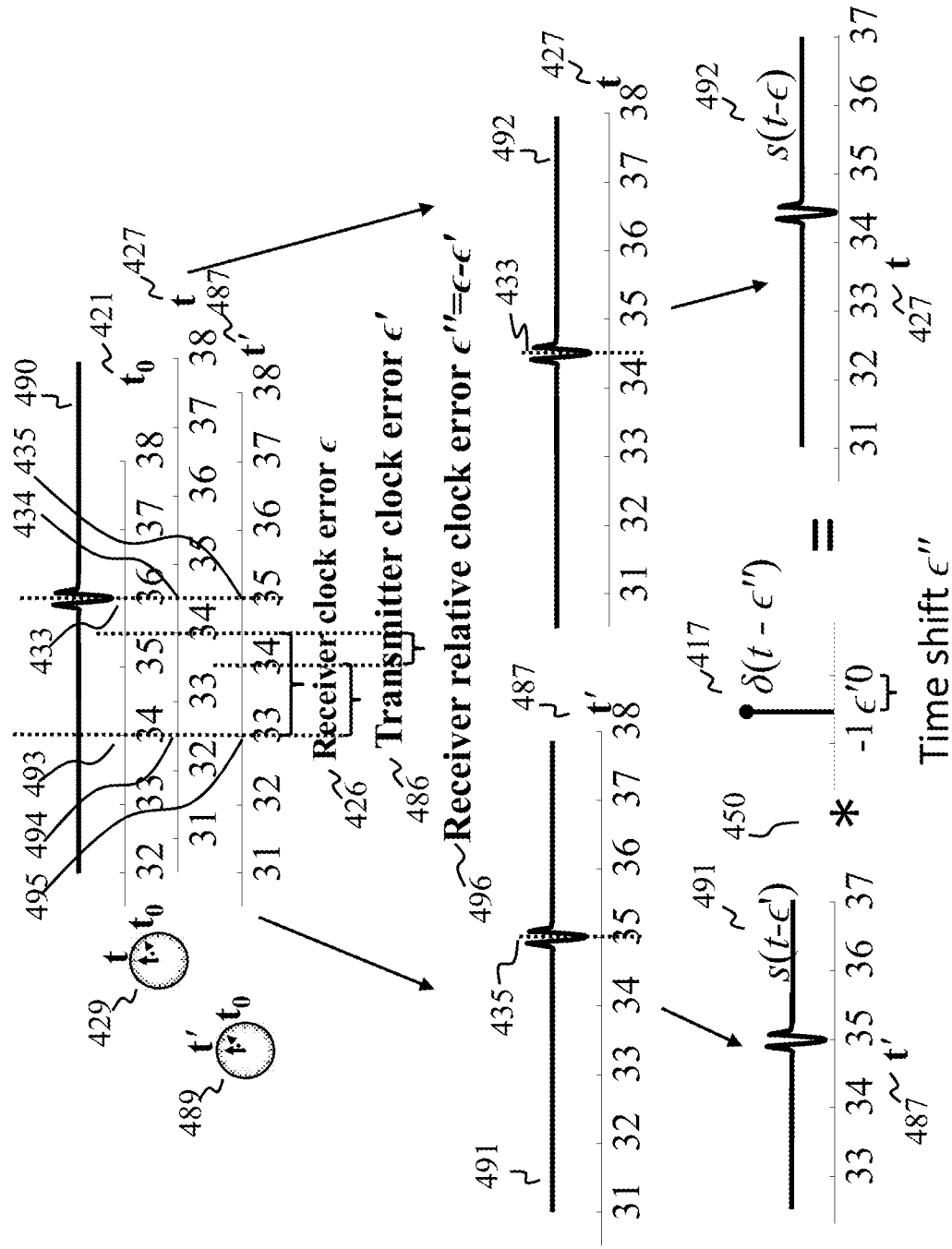
FIG. 4C is a schematic demonstrating an example of the effect of clock errors at both a transmitter and a receiver local clock, according to some embodiments.

FIG. 4C is a schematic demonstrating an example of the effect of clock errors at both a transmitter and a receiver local clock according to some embodiments with respect to the signal measured by a receiver and timestamped according to the receivers' local clock, when the signal is a reflection by the scene of a transmitted signal which is transmitted by a transmitter according to its local clock. In particular, a transmitter has a local clock 489, which keeps a local time 487. The local transmitter clock exhibits an error $\epsilon'$ 486 relative to the global time 421. A receiver has a local clock 429, which keeps a local time 427. The local receiver clock exhibits an error $\epsilon$ 426 relative to the global time 421.

In this example both the transmitter local clock and the receiver local clock are slow with respect to the global clock 495, albeit with different errors. For example, the receiver time 427 might be slow by 1.5 time units relative to the global time 411, while the transmitter time 487 might be slow by 1 time unit. In other words, the receiver clock 425 is slow relative to the transmitter clock 485 by 0.5 units, i.e., has a relative clock error 496 equal to $\epsilon''=\epsilon-\epsilon'=-0.5$ time units.

Still referring to the example in FIG. 4C, a signal, such as a pulse, 490 transmitted by the transmitter with timing managed by the transmitter's local clock 489 will appear to have been transmitted later, i.e., to have been delayed, with respect to the receiver's local clock 429. For example, the transmitter may time the transmission of a signal such that the middle negative peak of a pulse occurs at time 35 in the transmitter's local clock 435. In this case, because of the relative clock error, the signal transmitted will have the middle negative peak of a pulse occur at time 34.5 in the receiver's local clock 433. Thus, the transmitted signal with respect to the receiver's local clock 492 is time delayed by $\epsilon''$ compared to the transmitted signal with respect to the transmitter's local clock 491. Since in this example $\epsilon''$ is negative, a time delay by $\epsilon''$ is in fact an advance by $-\epsilon=0.5$ time units. As already described, this time shift can be represented as a convolution 450 with a shift kernel 417. Since the transmitted signal with respect to the transmitter's local clock 471 is time advanced by $\epsilon''$ compared to the transmitted signal with respect to the receiver's local clock 472, the shift kernel corresponds to a delay by $\epsilon'$.

Still referring to FIG. 4C, for this particular transmitter-receiver pair in the example, the receiver receives reflections from the scene of the signal transmitted by the transmitter according to the transmitter's local clock. Since these reflections are triggered by the transmitter transmitting a signal, they are time shifted compared to the receiver's local clock by the same time shift that the transmitted signal exhibits compared to the receiver's local clock, i.e., $\epsilon''$. Therefore, given the relative time error $\epsilon''$ of the transmitter and receiver clocks for a given transmitter-receiver pair, the receiver will receive a received signal time stamped by the receivers local clock that is time delayed by $\epsilon''$ compared to an ideal signal that the receiver would have receive and time stamped if transmitter and receiver were perfectly synchronized.

Some embodiments of this present disclosure use a single time delay to model the relative time shift between each pair of transmitters and receivers. This model is accurate if a single transmitter transmits at a time. The advantage of this model is that there is a single unknown time delay estimation for each transmitter-receiver pair. Furthermore, it is possible to make one of the subproblems of the multilinear problem be the joint estimation of the radar image and the time delay making this subproblem convex and thus reducing the subproblems to the same number as if the transmitters were perfectly synchronized. The disadvantage of this model is that it introduces one unknown time delay for each transmitter receiver pair, i.e., given K transmitters and L receivers, this model has KL unknown delays. Furthermore, the model might fail to produce a consistent solution. On the other hand, this lack of consistency may be beneficial when there is clock drift between transmissions.

Other embodiments of this present disclosure model the time shift of each of the transmitters and the receivers separately, relative to a reference global clock, often assuming that one of the transmitters' or receivers' clocks is this reference. The advantage of this approach is that the model enforces a global consistency of the clocks and their relative delays. Furthermore, given K transmitters and L receivers, this model has only K+L−1 unknown delays: one for each transmitter and each receiver, except for the transmitter or receiver considered as the global time reference. The disadvantage of this approach is that the unknown transmitter time shift kernels couple multiplicatively with the unknown receiver time shift kernels, increasing the number of multilinear sets of unknowns in the multilinear problem, making it more difficult to solve. Furthermore, if there is clock drift between transmissions, the strong global consistency enforcement might be too strong to capture the clock drift.

Shift Kernels in Frequency

Figure 5A:
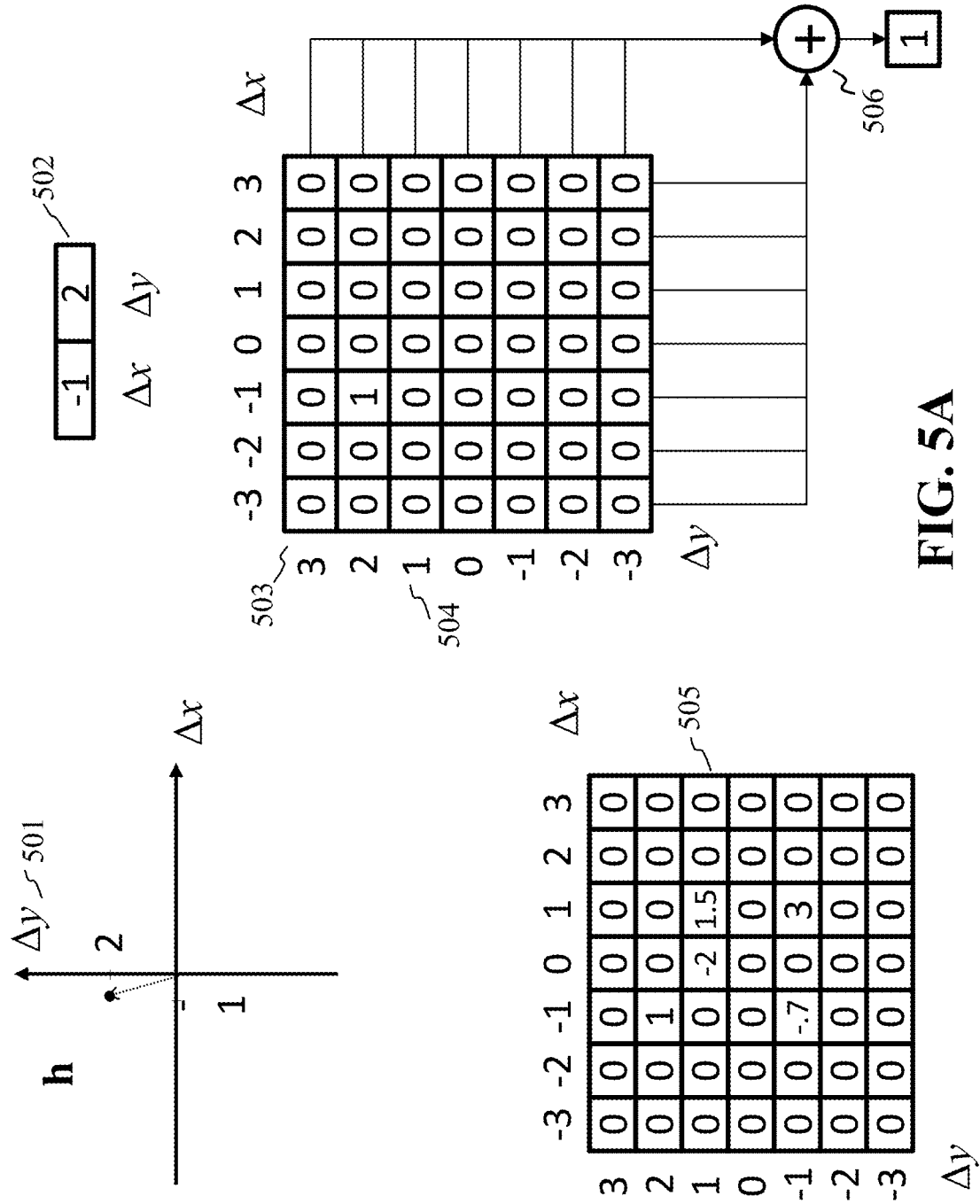
FIG. 5A is a schematic illustrating how a spatial shift may be represented in a computer as a set of coefficients or equivalently as a shift kernel, according to another embodiment.

FIG. 5A is a schematic illustrating how a two dimensional shift may be represented in a computer as a pair of coefficients 502 or equivalently as a shift kernel 501 in accordance with some embodiments. Representing the delay as a single coefficient uses two memory cells. On the other hand, representing the delay as a shift kernel requires a two-dimensional array of coefficients, for example stored in a bank of memory cells 503, indexed by two position indices 504 for each coefficient, representing the shift in each of the dimensions, which might be explicit or implicit, relative to a zero shift, where the indices may correspond to time units of certain shift amount. Each coefficient in the representation is the value of the shift kernel at the corresponding spatial position. For example, in the figure, the kernel is equal to zero for all position indices except the index (−1,2), where the kernel is equal to 1. This kernel is equivalent to a shift of (−1,2) spatial units. Accordingly, for three dimensional shifts, the shift kernel may be represented as three coefficients, or a three-dimensional array.

A two-dimensional array of coefficients used to represent a shift kernel may also be used to represent other signals, i.e., general convolution kernels, e.g., 505. However, these convolution kernels may not be shifts if they are not one-sparse. A one-sparse convolution kernel is one whose representation comprises of coefficients that are all zero except for a single coefficient which has non-zero value. A one-sparse convolution kernel represents a shift with a possible scaling according to the value of the non-zero coefficient. If the value is equal to one, then the convolution kernel is a simple shift with no scaling. A one-sparse convolution kernel with coefficient values that have sum 506 equal to 1 will necessarily have a single coefficient with value equal to 1, i.e., it will be a shift kernel.

Figure 5B:
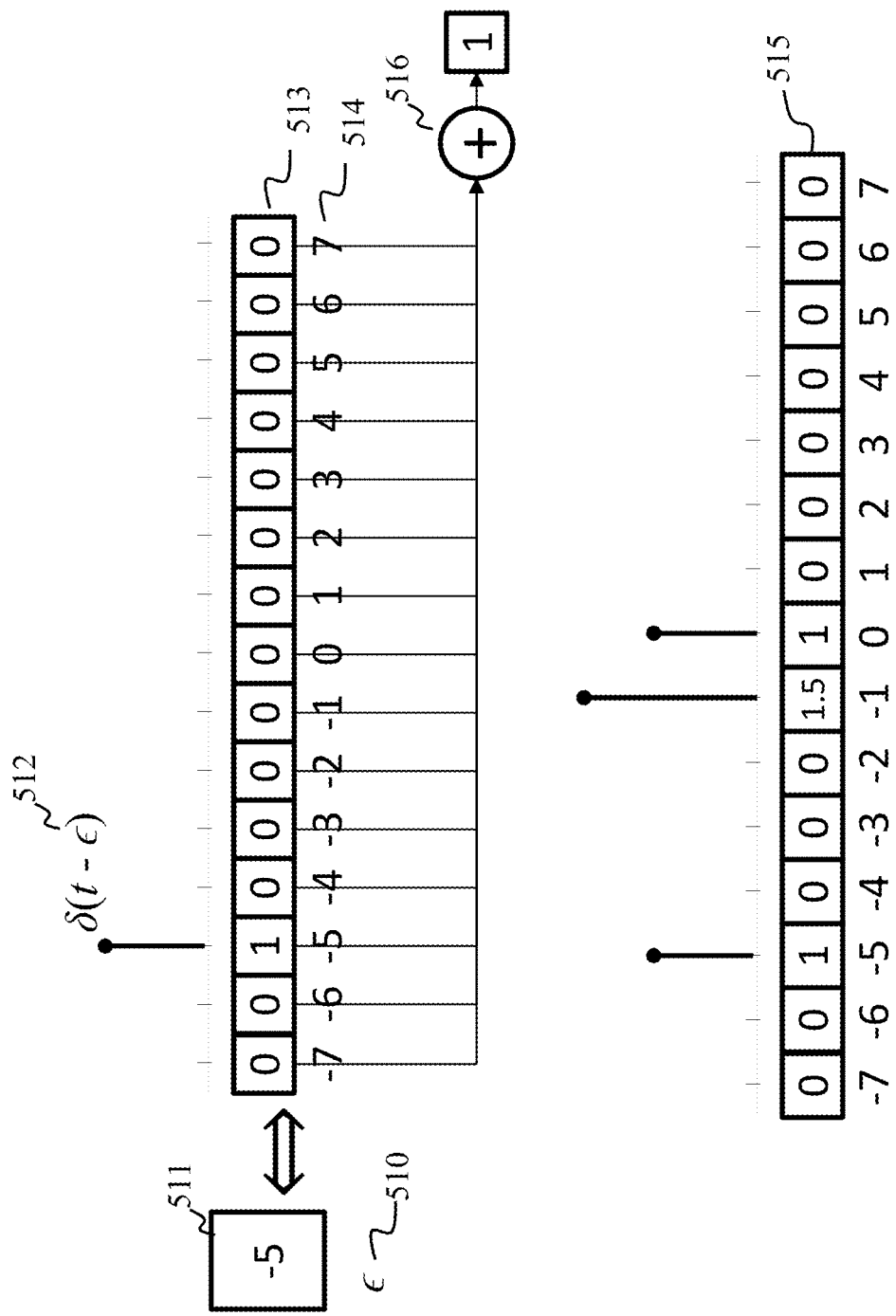
FIG. 5B is a schematic illustrating how a delay may be represented in a computer as a single coefficient or equivalently as a shift kernel, according to another embodiment.

FIG. 5B is a schematic illustrating how a time delay may be represented in a computer as a single coefficient 510 or equivalently as a shift kernel 512 in accordance with some embodiments. Representing the delay as a single coefficient uses a single memory cell 511. On the other hand, representing the delay as a shift kernel requires a sequence of coefficients, for example stored in a bank of memory cells 513, indexed by a time stamp 514 of each coefficient, which might be explicit or implicit, relative to a zero time, where the indices may correspond to time units of certain duration. Each coefficient in the representation is the value of the shift kernel at the corresponding time index. For example, in the figure, the kernel is equal to zero for all time indices except the index −5, where the kernel is equal to 1. This kernel is equivalent to a delay of −5 time units.

A sequence of coefficients used to represent a shift kernel may also be used to represent other signals, i.e., general convolution kernels, e.g., 515. However, these convolution kernels may not be delays if they are not one-sparse. A one-sparse convolution kernel is one whose representation comprises of coefficients that are all zero except for a single coefficient which has non-zero value. A one-sparse convolution kernel represents a delay with a possible scaling according to the value of the non-zero coefficient. If the value is equal to one, then the convolution kernel is a simple delay with no scaling. A one-sparse convolution kernel with coefficient values that have sum 516 equal to 1 will necessarily have a single coefficient with value equal to 1, i.e., it will be a shift kernel.

Figure 6:
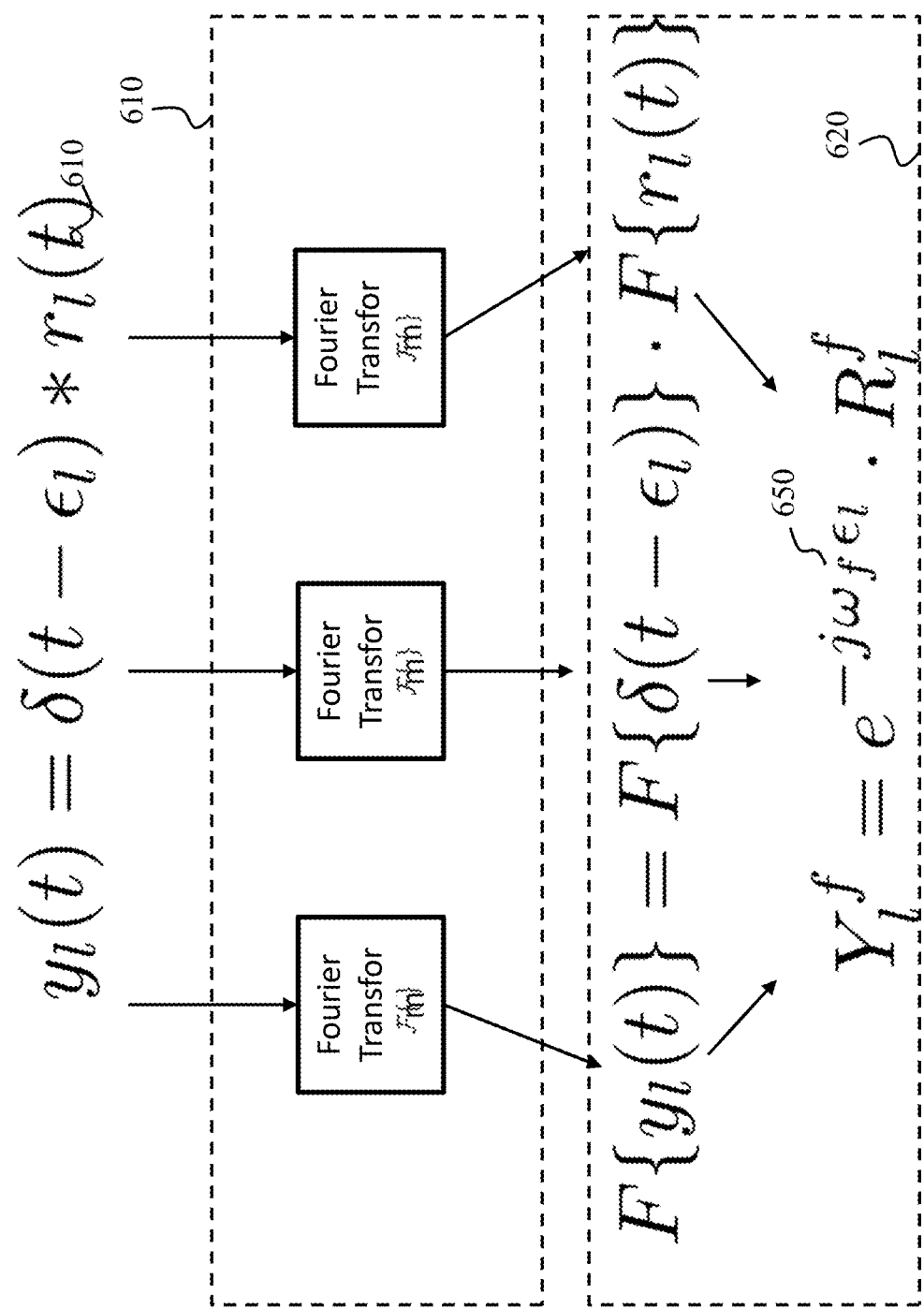
FIG. 6 is an illustration of the equivalence of convolution of two signals and multiplication of their Fourier transform, according to another embodiment.

FIG. 6 shows an example schematic of a transformation of components of FIGS. 3 and 4 into a resulting frequency domain model according to some embodiments. For example, a time domain model of relationship 610 can be expressed in a frequency domain by taking a Fourier transform $F\{\cdot\}$ 610. Using a Fourier transform, convolutions with a time delay or advance in a time domain model are converted to multiplications 650 with a complex exponential in a frequency-domain model, which reduce the complexity of computation. The same relationship holds for two- and three-dimensional signals, such as the incident and the reflected field, using a two- or the three-dimensional Fourier transform. Therefore, when computing the convolutions of the fields with the corresponding transmitter or receiver spatial shifts, some embodiments use a Fourier transform to convert the field and the shift kernels to a spatial frequency domain, in which the convolution is transformed to a multiplication. This transformation makes computation of the cost simpler.

Thus, when considering the relative delay between transmitter and receiver clocks, the resulting frequency domain model is $$y_f^{lk} = e^{-j\omega_f \epsilon_{lk}} \left( \sum_{m,n} \left( ((B_f^k * h^k) \odot x)_{m,n} \right) * \tilde{h}^l \right) e^{-j\omega_f d_{l,m,n}/c}$$

where $y_f^{lk}$ is the data recorded by receiver l during the transmission of transmitter k and $\epsilon_{lk}$ is the relative clock error between transmitter k and receiver l. Using $z_t^{lk}$ to denote the shift kernel corresponding to the time shift due to this error, and $F\{z_t^{lk}\}$ to denote its Fourier transform, the model becomes $$y_f^{lk} = \mathcal{F}\{z_t^{lk}\} \left( \sum_{m,n} \left( ((B_f^k * h^k) \odot x)_{m,n} \right) * \tilde{h}^l \right) e^{-j\omega_f d_{l,m,n}/c}$$

under this model, the multilinear optimization problem becomes $$\min_{x, z_t^{lk}, h^k, \tilde{h}^l} \sum_{l,f} \left\| y_f^l - \mathcal{F}\{z_t^{lk}\} \sum_{m,n} \left( ((B_f^k * h^k) \odot x)_{m,n} * \tilde{h}^l \right) e^{-j\omega_f d_{l,m,n}/c} \right\|_2^2 +$$

$$\sum_k \lambda_k \|h^k\|_1 + \sum_l \mu_l \|\tilde{h}^l\|_1 + \sum_{k,l} \eta_{k,l} \|z_t^{lk}\|_1 + \rho \|x\|_1.$$

Some embodiments might further move the unknown relative time delay to the data side, so that the problem is transformed to $$\min_{x, z_t^{lk}, h^k, \tilde{h}^l} \sum_{l,f} \left\| \overline{\mathcal{F}\{z_t^{lk}\}} \cdot y_f^l - \sum_{m,n} \left( ((B_f^k * h^k) \odot x)_{m,n} * \tilde{h}^l \right) e^{-j\omega_f d_{l,m,n}/c} \right\|_2^2 +$$

$$\sum_k \lambda_k \|h^k\|_1 + \sum_l \mu_l \|\tilde{h}^l\|_1 + \sum_{k,l} \eta_{k,l} \|z_t^{lk}\|_1 + \rho \|x\|_1,$$

where $\overline{F\{z_t^{lk}\}}$ denotes the complex conjugate of $F\{z_t^{lk}\}$.

This formulation decouples the unknown set of delay shift kernels $z_t^{lk}$ from the other unknown variables, thus allowing them to be estimated simultaneously with one of the other sets of variables, for example the image x, reducing the number of multilinear components to three.

Alternatively, some embodiments consider both the transmitter and the receiver clock errors separately, with the following resulting frequency domain model:

$$y_f^l = e^{-j\omega_f \epsilon_l} \left( \sum_{m,n} \left( \left( \left( \sum_k B_f^k * h^k \right) \odot x \right)_{m,n} e^{j\omega_f \epsilon_k} \right) * \tilde{h}^l \right) e^{-j\omega_f d_{l,m,n}/c} \right)$$

where $\epsilon_l$ is the clock error introduced by the $l^{th}$ receiver and $\epsilon_k$ is the clock error introduced by the $k^{th}$ transmitter. Using $z_t^l$ and $z_t^k$ to denote the shift kernels corresponding to the time shifts due to these errors, respectively, and $F\{z_t^l\}$ and $F\{z_t^k\}$ to denote their corresponding Fourier transforms, the model becomes $$y_f^l = \mathcal{F}\{z_t^l\} \cdot \left( \sum_{m,n} \left( \left( \left( \sum_k B_f^k * h^k \right) \odot x \right)_{m,n} \cdot \mathcal{F}\{z_t^k\} \right) * \tilde{h}^l \right) e^{-j\omega_f d_{l,m,n}/c} \right),$$

under this model, the multilinear optimization problem becomes $$\min_{x, z_t^l, z_t^k, h^k, \tilde{h}^l} \sum_{l,f} \left\| y_f^l - \mathcal{F}\{z_t^l\} \cdot \left( \sum_{m,n} \left( \left( \left( \sum_k B_f^k * h^k \right) \odot x \right)_{m,n} \cdot \right.\right.\right.$$
$$\left.\left.\left. \mathcal{F}\{z_t^k\} \right) * \tilde{h}^l \right) e^{-j\omega_f d_{l,m,n}/c} \right\|_2^2 + \sum_k \lambda_k \|h^k\|_1 +$$
$$\sum_l \mu_l \|\tilde{h}^l\|_1 + \sum_k \eta_k \|z_t^k\|_1 + \sum_l \eta_l \|z_t^l\|_1 + \rho\|x\|_1,$$

Some embodiments might further move the unknown time delay due to the receiver clock error to the data side, so that the problem is transformed to $$\min_{x, z_t^l, z_t^k, h^k, \tilde{h}^l} \sum_{l,f} \left\| \overline{\mathcal{F}\{z_t^l\}} \cdot y_f^l - \left( \sum_{m,n} \left( \left( \left( \sum_k B_f^k * h^k \right) \odot x \right)_{m,n} \cdot \right.\right.\right.$$
$$\left.\left.\left. \mathcal{F}\{z_t^k\} \right) * \tilde{h}^l \right) e^{-j\omega_f d_{l,m,n}/c} \right\|_2^2 + \sum_k \lambda_k \|h^k\|_1 +$$
$$\sum_l \mu_l \|\tilde{h}^l\|_1 + \sum_k \eta_k \|z_t^k\|_1 + \sum_l \eta_l \|z_t^l\|_1 + \rho\|x\|_1.$$

This formulation decouples the unknown set of receiver clock errors $z_t^l$ from the other unknown variables, thus allowing them to be estimated simultaneously with one of the other sets of variables, for example the receiver clock errors $z_t^k$, reducing the number of multilinear components to four.

Of course, as described in FIG. 6, all the spatial convolutions may also be computed in the spatial frequency domain for more efficient computation. In this case, some embodiments of this present disclosure may precompute a Fourier transform of the incident field $B_f^k$, and store it in memory, to avoid repeating the computation while recovering the image.

Alternating Optimization

In order to solve all these minimization problems, some embodiments of this present disclosure use alternating optimization, in which the estimation of each of the unknown sets of variables in the multilinear problem occurs sequentially by solving a set of smaller convex linear problems.

FIG. 7A is a block diagram of an alternating optimization method for estimating the radar image and the set of transmitter and receiver shifts according to the embodiments of the present disclosure. In particular, step 740 illustrates the iterative procedure for obtaining estimates for the radar image and estimate for the set of image shifts and relates to steps 165A, 170A, 175A, 180A and 185A of FIG. 1A. FIG. 7A illustrates some embodiments in which estimation of transmitter and receiver clock errors is not necessary, for example because the clocks are adequately synchronized.

Figure 7B:
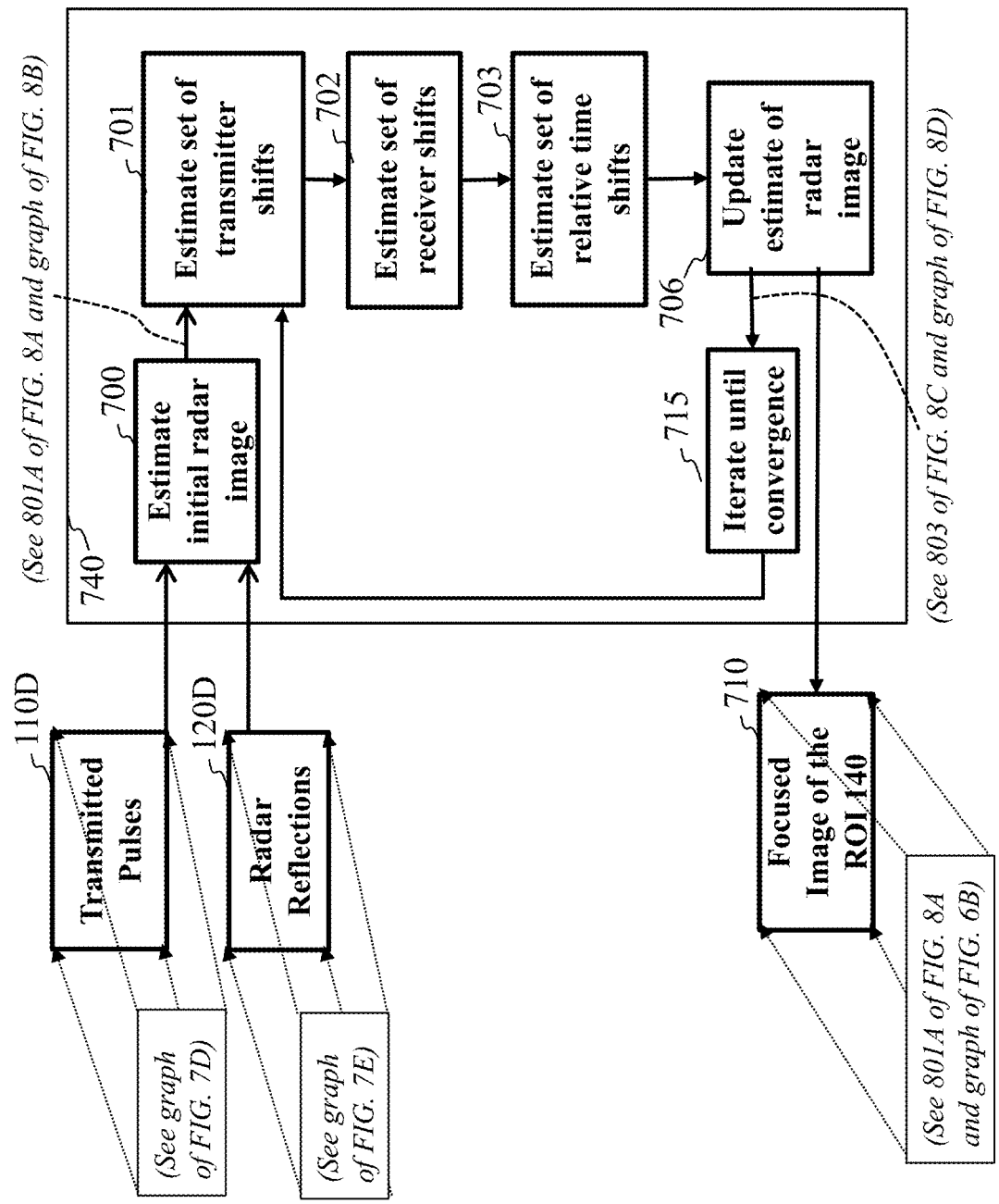
Figure 7C:
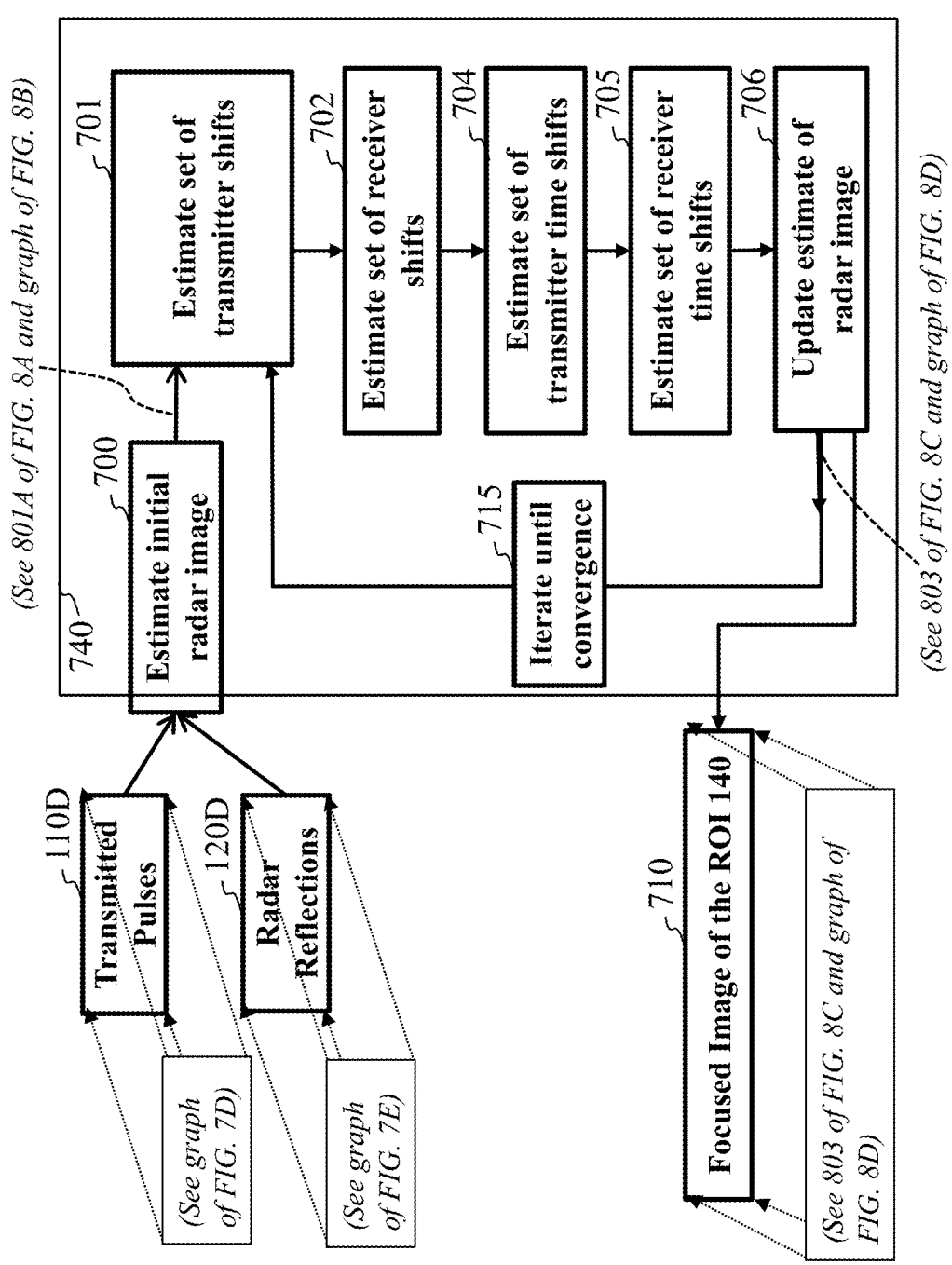
Figure 7D:
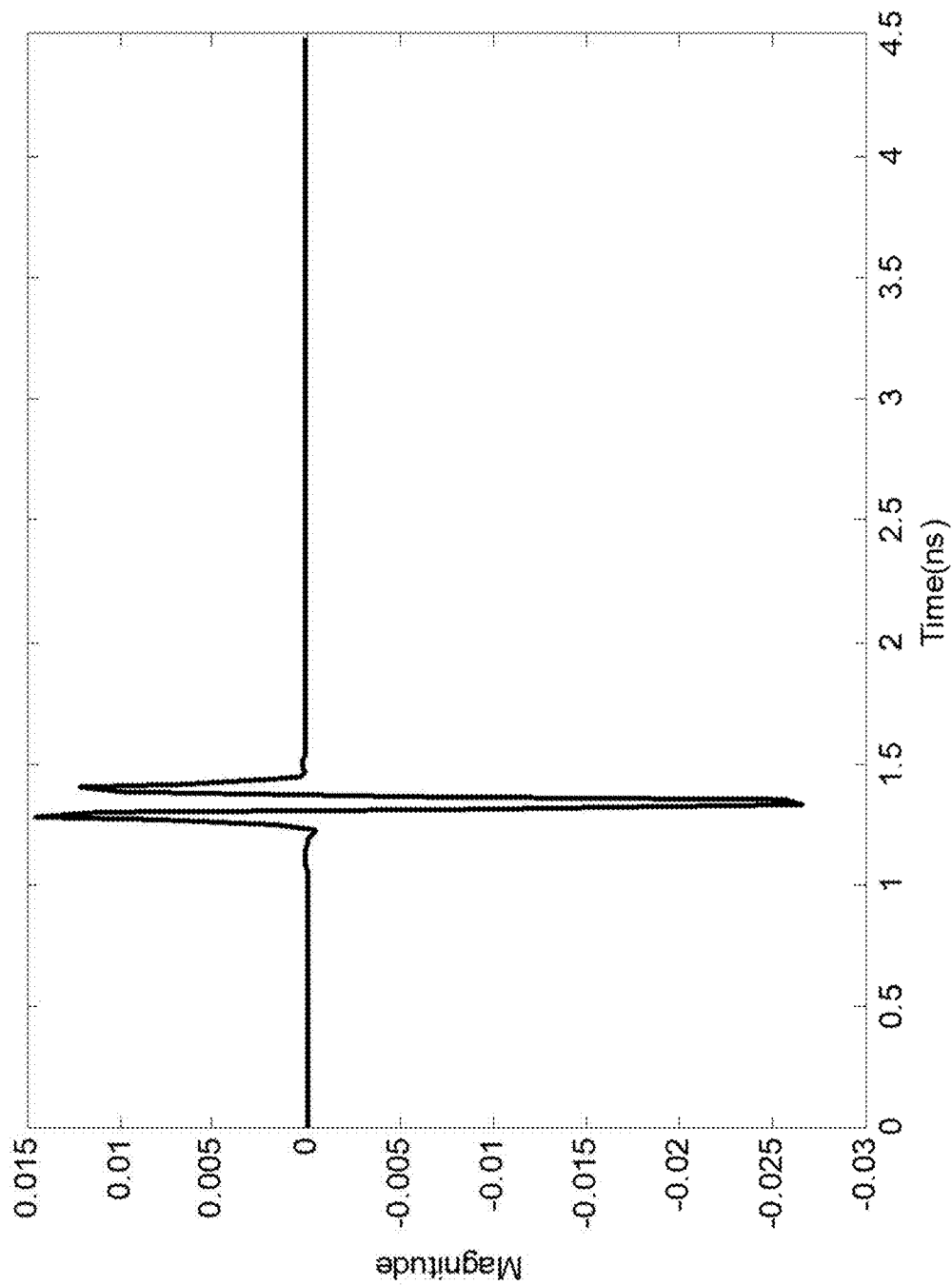
FIG. 7D a graph illustrating transmitted pulses in FIG. 7A, according to some embodiments of the present disclosure.

Step 110D of FIG. 7A illustrates the transmitted pulses, wherein a graph representing the transmitted pulses is provided in FIG. 7D.

Figure 7E:
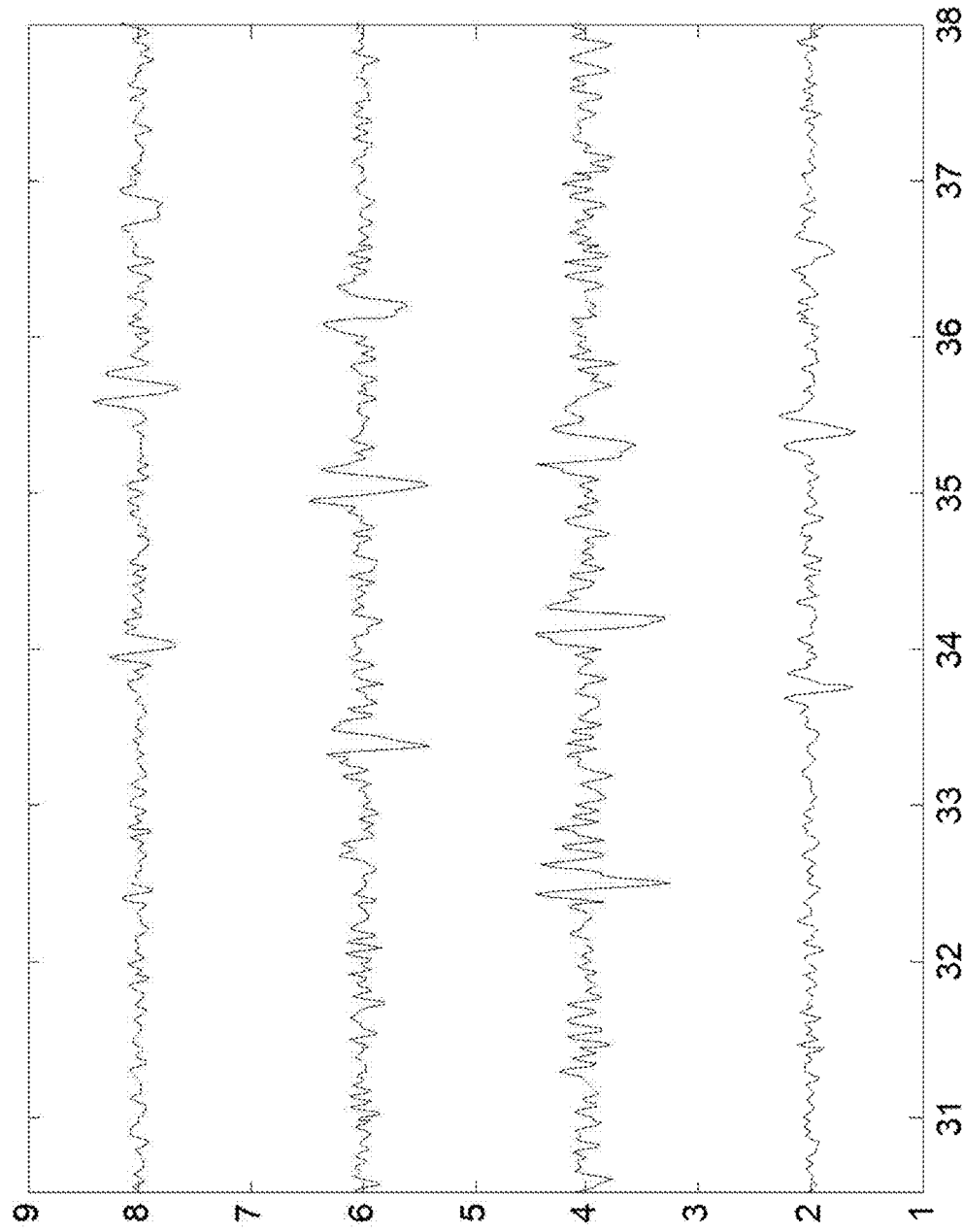
FIG. 7E a graph illustrating radar reflections in FIG. 7A, according to some embodiments of the present disclosure.

Step 120D of FIG. 7A illustrates the radar reflections, wherein a graph representing the radar reflections is provided in FIG. 7E.

Figure 8A:
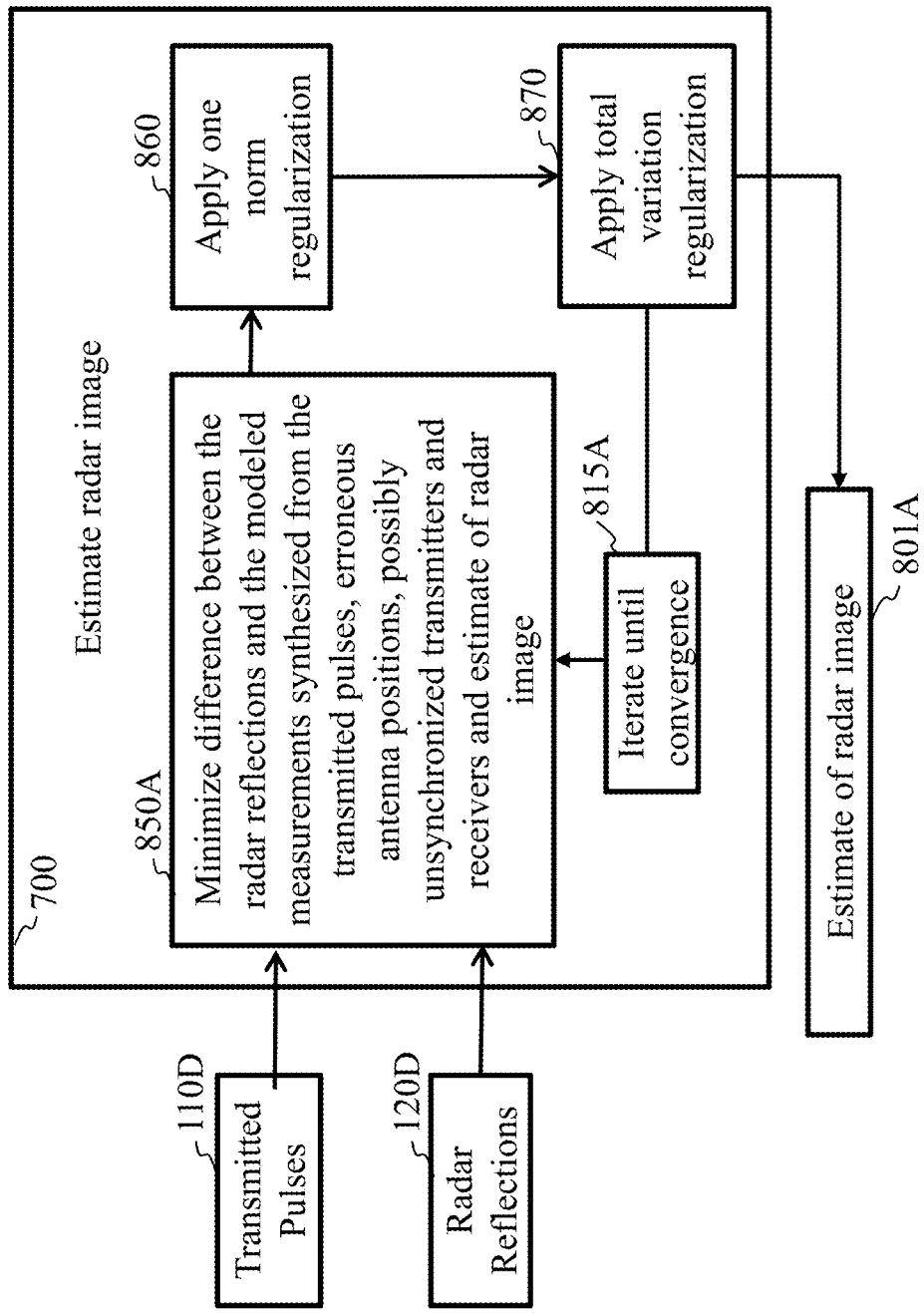
FIG. 8A is a block diagram of the method used for estimating an initial radar image from the measured radar reflections, transmitted pulse, and the wrong antenna positions and delays, according to some embodiments of the present disclosure.

Step 700 of FIG. 7A represents the process of estimating of the initial image (see 801A of FIG. 8A and graph FIG. 8B) which is obtained by minimizing a difference between the radar reflections 120D and the modeled measurements produced by combining the transmitted pulses 110D and the erroneous antenna positions as illustrated in FIG. 8A

Figure 9A:
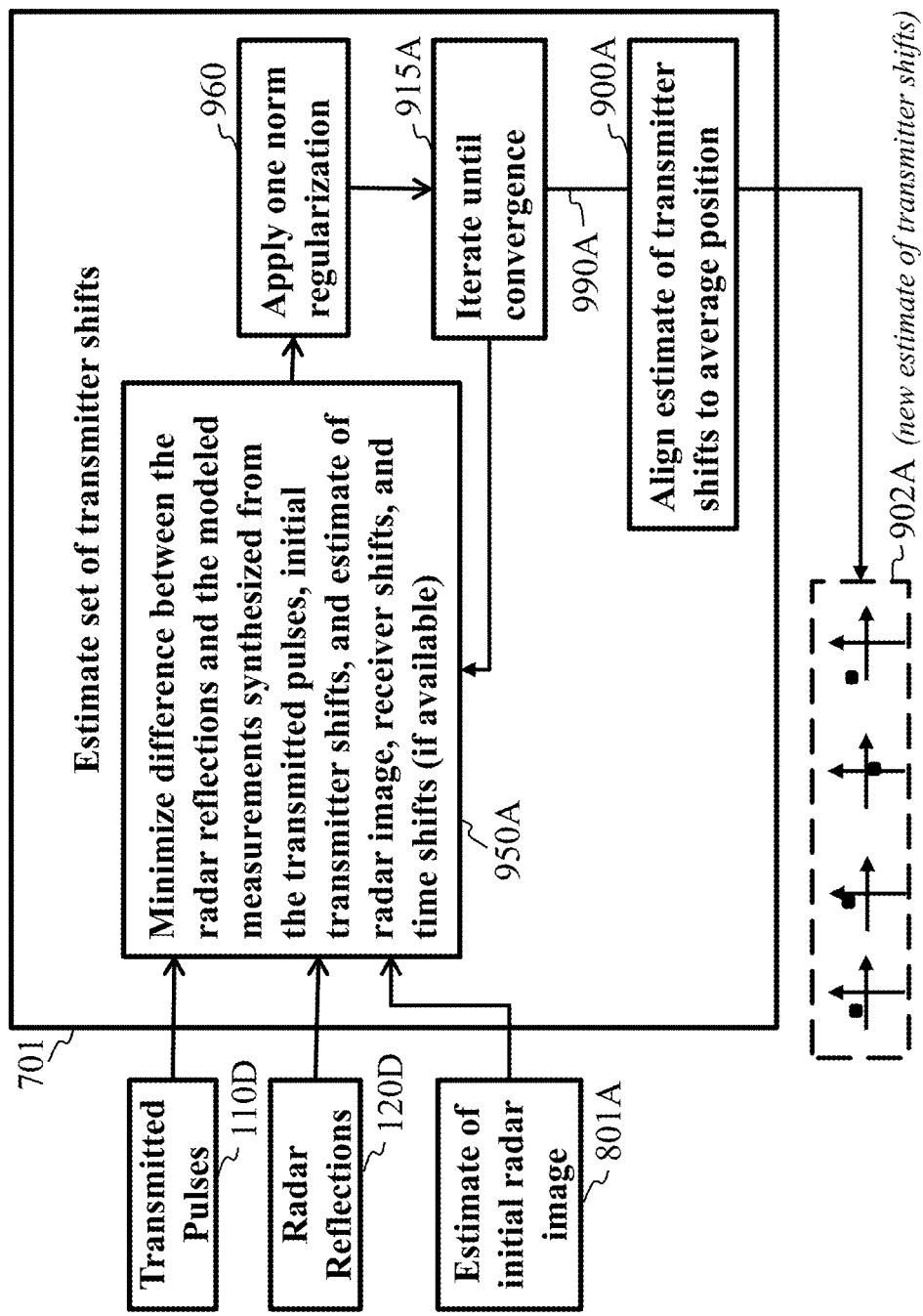
FIG. 9A is a block diagram of the method used to estimate the transmitter shifts using the measured radar reflections the estimated receiver shifts, the estimated time delays, and the estimate of the radar image, according to some embodiments of the present disclosure.

Step 701 of FIG. 7A represents the process of estimating a set of transmitter shifts by minimizing a difference between the radar reflections and the modeled measurements synthesized from the transmitted pulses, initial transmitter and receiver shifts, and estimate of radar image according to the procedure illustrated in FIG. 9A.

Figure 9B:
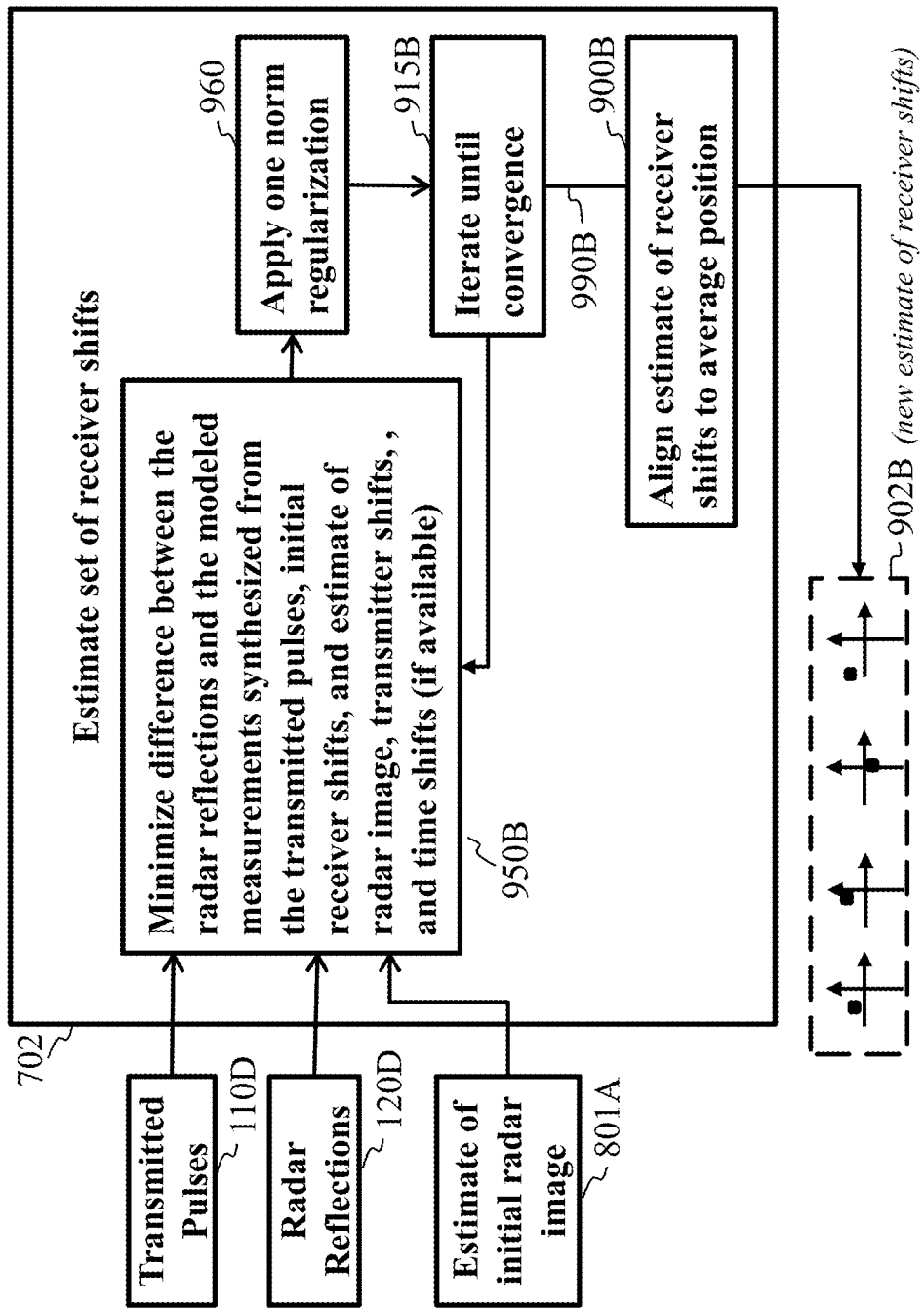
FIG. 9B is a block diagram of the method used to estimate the receiver shifts using the measured radar reflections the estimated transmitter shifts, the estimated time delays, and the estimate of the radar image, according to some embodiments of the present disclosure.

Step 702 of FIG. 7A represents the process of estimating a set of receiver shifts by minimizing a difference between the radar reflections and the modeled measurements synthesized from the transmitted pulses, initial transmitter and receiver shifts, and estimate of radar image according to procedure illustrated in FIG. 9B.

Figure 8B:
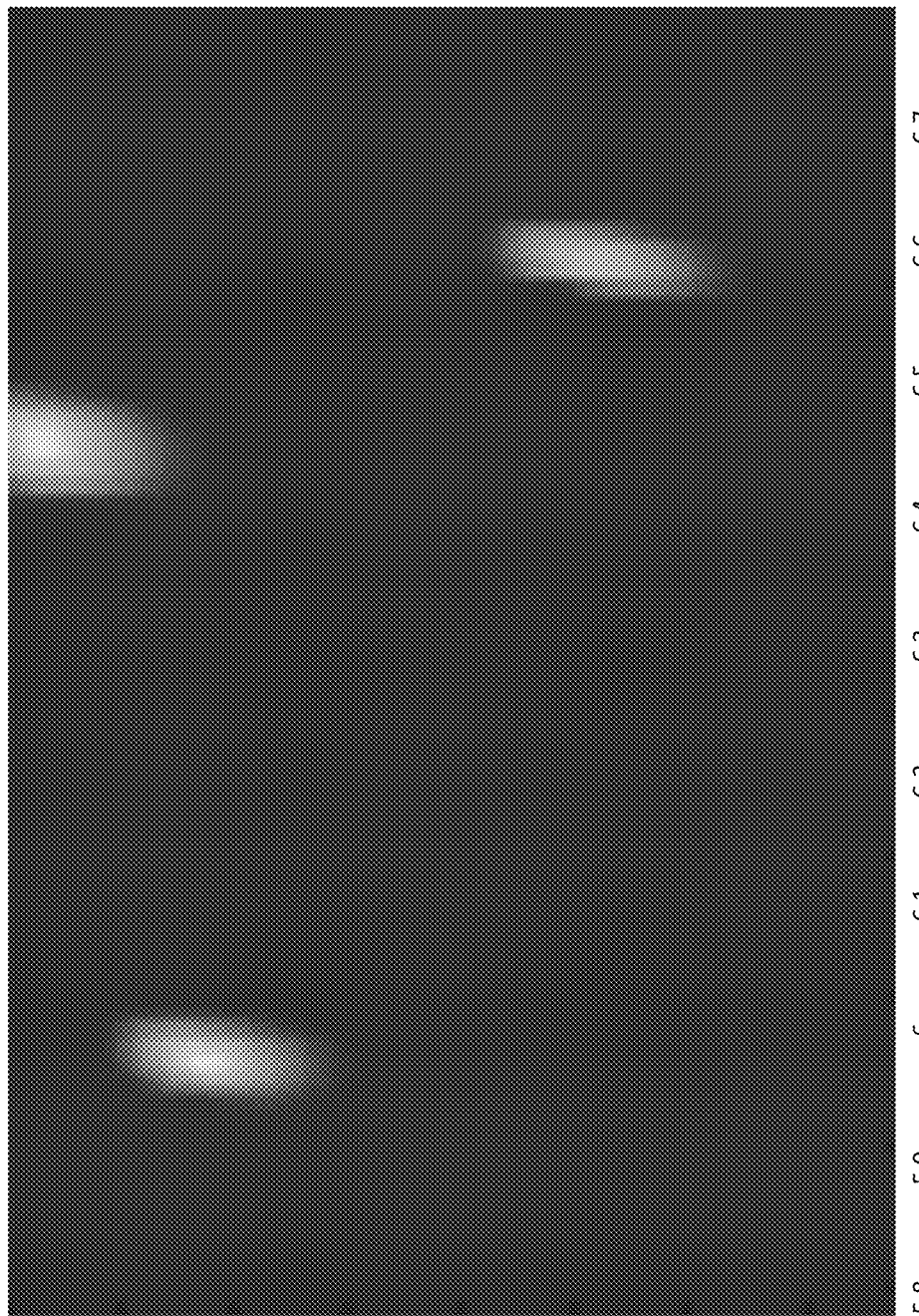
FIG. 8B a graph illustrating an initial radar image in FIG. 8A, according to some embodiments of the present disclosure.
Figure 8C:
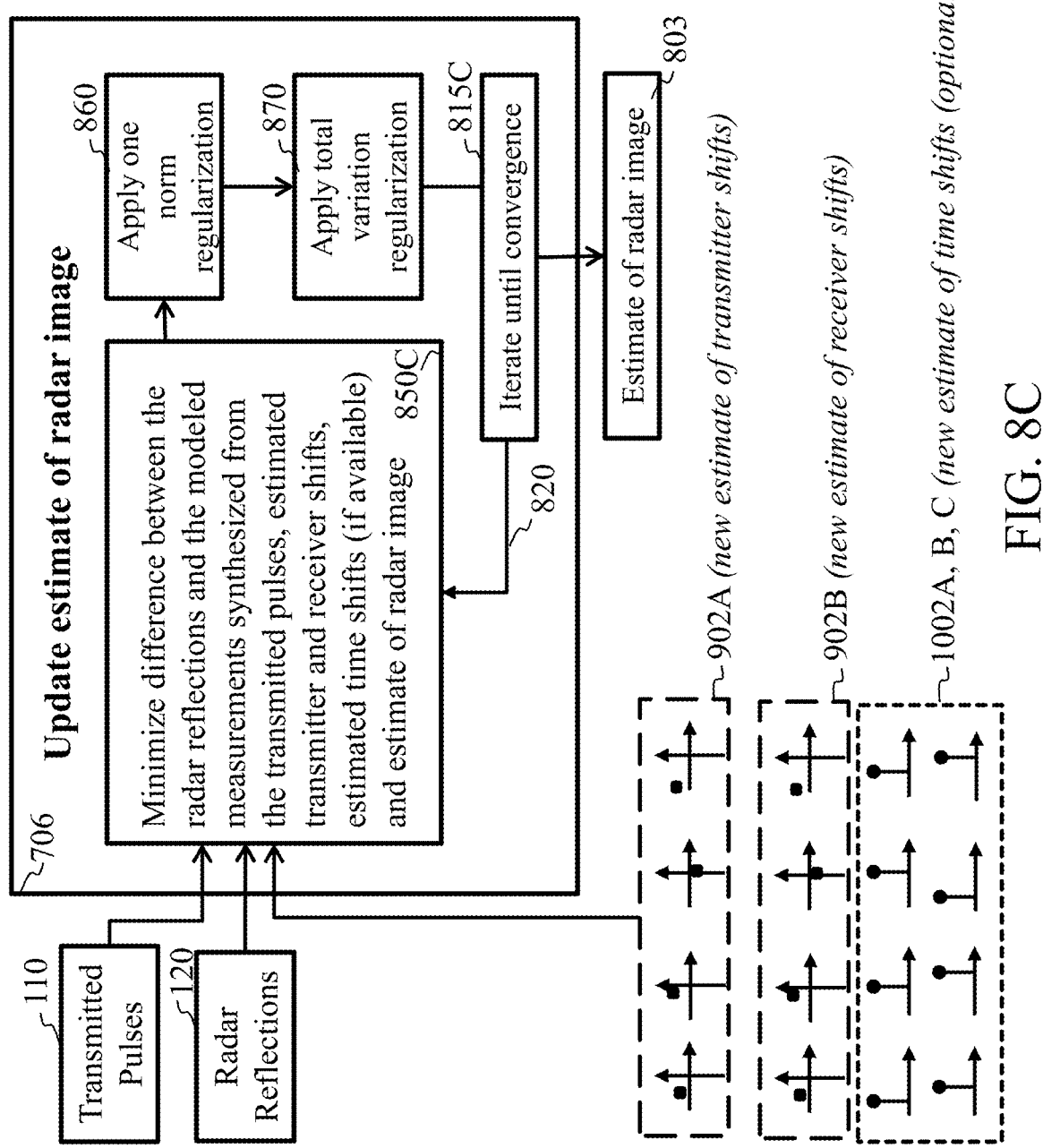
FIG. 8C is a block diagram of the method used to update the radar image using the measured radar reflections and the estimated antenna positions and delays with the application of one-norm regularization and total variation regularization, according to some embodiments of the present disclosure.

Step 706 of FIG. 7A represents the process of updating the estimate of the radar image by minimizing the difference between the radar reflections and the modeled measurements synthesized from the transmitted pulses, estimated image shifts, and estimate of radar image, according to the procedure illustrated in FIG. 8C.

Step 715 of FIG. 7A is indicates that the steps of estimating a set of transmitter shifts followed by updating a set of receiver shifts followed by updating the estimate of the radar image are repeated iteratively until the convergence criterion where the estimate of the radar image does not change is reached. The sequence of execution of steps 701, 702, 706 may be different in some embodiments, as it is not important in determining the outcome. In some embodiments, the sequence of execution might even be randomized.

Step 710 of FIG. 7A represents the process of outputting the converged radar image of the ROI.

FIG. 7B is a block diagram of an alternating optimization method for estimating the radar image and the set of transmitter and receiver shifts according to other embodiments of the present disclosure. FIG. 7B includes step 703 which estimates relative delays between transmitter and receiver pairs, by minimizing a difference between the radar reflections and the modeled measurements synthesized from the transmitted pulses, transmitter and receiver spatial shifts, initial relative delays between transmitter and receiver pairs, and estimate of radar image according to the procedure illustrated in FIG. 9C. The remaining steps are identical to the steps of FIG. 7A, with the additional use of relative delays between transmitter and receiver pairs in steps 701, 702, 706, 710. As with FIG. 7A, the sequence of execution of steps 701, 702, 703, 706 may be different in some embodiments, as it is not important in determining the outcome. In some embodiments, the sequence of execution might even be randomized.

FIG. 7C is a block diagram of an alternating optimization method for estimating the radar image and the set of transmitter and receiver shifts according to other embodiments of the present disclosure. FIG. 7B includes step 704 which estimates transmitter time shifts, by minimizing a difference between the radar reflections and the modeled measurements synthesized from the transmitted pulses, transmitter and receiver spatial shifts, receiver time shifts, initial transmitter time shifts, and estimate of radar image according to the procedure illustrated in FIG. 9D. FIG. 7B also includes step 705 which estimates receiver time shifts, by minimizing a difference between the radar reflections and the modeled measurements synthesized from the transmitted pulses, transmitter and receiver spatial shifts, transmitter time shifts, initial receiver time shifts, and estimate of radar image according to the procedure illustrated in FIG. 9D. The remaining steps are identical to the steps of FIG. 7A, with the additional use of transmitter and receiver time shifts in steps 701, 702, 706, 710. As with FIG. 7A, the sequence of execution of steps 701, 702, 704, 705, 706 may be different in some embodiments, as it is not important in determining the outcome. In some embodiments, the sequence of execution might even be randomized.

FIG. 8A is a block diagram of the method used for estimating an initial radar image from the measured radar reflections, transmitted pulse, possibly unsynchronized transmitters and receivers, and the wrong antenna positions, according to embodiments of the present disclosure. FIG. 8A relates to step 700 of FIG. 7A, 7B, 7C, regarding estimating the initial radar image.

FIG. 8B is a graph illustrating an initial radar image relating to step 801A in FIG. 8A, according to embodiments of the present disclosure.

For example, the initial radar image in FIG. 8A, is then computed using the initial antenna positions and by computing an update of the image that minimizes the difference 850A between the measured data and the modeled data synthesized using the current estimates. The image is then filtered by applying, for example, the one-norm regularizer 860 and the total variation regularizer 870 and the process is repeated until convergence 815A. Some embodiments may only apply one or none of the two regularizers, or use an alternative regularizer.

FIG. 8C is a block diagram of the method used to update the radar image using the measured radar reflections, the estimated antenna positions, and the estimated timing errors, with the possible application of one-norm regularization and total variation regularization, according to embodiments of the present disclosure. The radar image 803 of FIG. 8C, is then updated using a method similar to FIG. 8A where a difference between the radar reflections and the modeled measurements is again minimized 850C to produce a new estimate of the radar image. The new estimate is also filtered by applying a one-norm regularization 860 and a total variation norm regularization 870 until convergence 815C where the output image 803 of FIG. 8C is produced.

After each iteration the difference in 850C is reduced until convergence. The procedure 706 is a component of a larger interative process 740, as shown in FIGS. 7A, 7B, 7C, alternating between updating the image, the transmitter and receiver shifts and the corresponding time delays. Because of this, the procedure 706 will be executed several times within the iterative process 740. Some embodiments, to reduce computational cost might reduce the number of iterations in 706 and terminate early, since an approximate estimate 803 is often sufficient within the steps of 740. The convergence condition in 715 will ensure the convergence of the main process 740, and therefore, the accuracy of the solution.

Figure 8D:
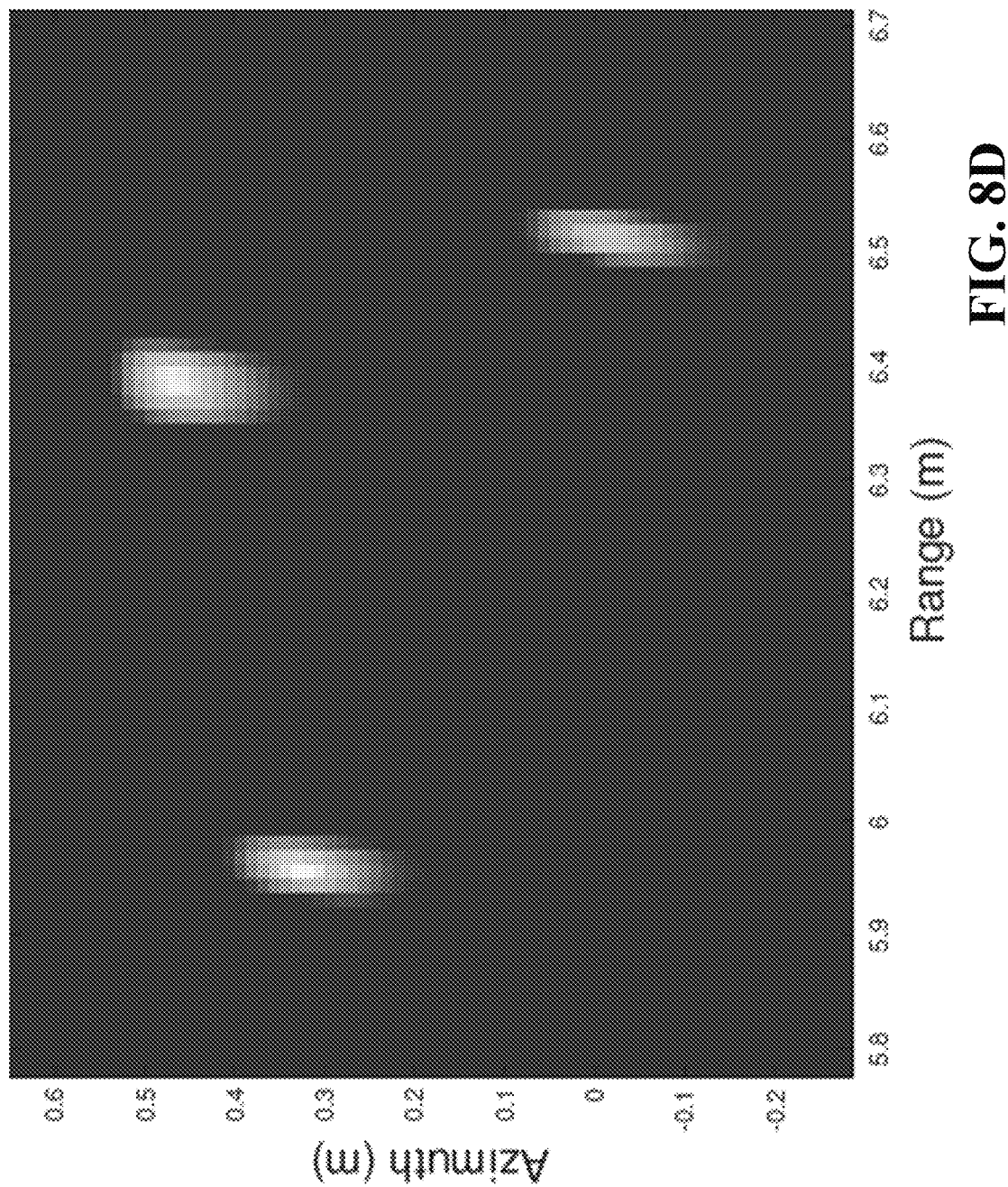
FIG. 8D a graph illustrating an intermediate update of the radar image before the procedures illustrated in FIGS. 7A, 7B and 7C have converged, according to embodiments of the present disclosure.

FIG. 8D a graph illustrating step 710 of FIGS. 7A, 7B, 7C and step 803 in FIG. 8C after the procedure in FIG. 8C has converged, according to embodiments of the present disclosure.

FIG. 9A is a block diagram of the method used to estimate the transmitter shifts using the measured radar reflections and the estimate of the radar image, the receiver shifts, and the estimates of time shifts, if available, according to embodiments of the present disclosure. In particular, FIG. 9A relates to step 701 of FIGS. 7A, 7B, 7B, and step 180A of FIG. 1A.

Referring to FIG. 9A, after the initial image 801A of FIGS. 7A, 7B, 7C is computed, the shift kernels corresponding to the transmitter position shifts are updated by minimizing the difference between the radar reflections and the synthesized or modeled measurements 950A using the methods shown in FIG. 9A. The shift kernels are filtered by applying, for example, the one-norm regularizer 960 to make them sparser, and the process is repeated until convergence 915A. Alternatively a hard threshold might replace the one-norm regularizer, to further promote the sparsity of the estimates. The computed transmitter shifts 990A may then be realigned 900A according to the average assumed antenna position using the method illustrated in FIG. 9C to produce the new estimate of shifts 902A.

FIG. 9B is a block diagram of the method used to estimate the receiver shifts using the measured radar reflections and the estimate of the radar image, the transmitter shifts, and the estimates of time shifts, if available, according to embodiments of the present disclosure. In particular, FIG. 9B relates to step 702 of FIGS. 7A, 7B, 7B, and step 175A of FIG. 1A.

Referring to FIG. 9B, after the initial image 801A of FIGS. 7A, 7B, 7C is computed, the shift kernels corresponding to the receiver position shifts are updated by minimizing the difference between the radar reflections and the synthesized or modeled measurements 950B using the methods shown in FIG. 9B. The shift kernels are filtered by applying, for example, the one-norm regularizer 960 to make them sparser, and the process is repeated until convergence 915B. Alternatively a hard threshold might replace the one-norm regularizer, to further promote the sparsity of the estimates. The computed receiver shifts 990B may then be realigned 900B according to the average assumed antenna position using the method illustrated in FIG. 9C to produce the new estimate of shifts 902B.

Figure 9C:
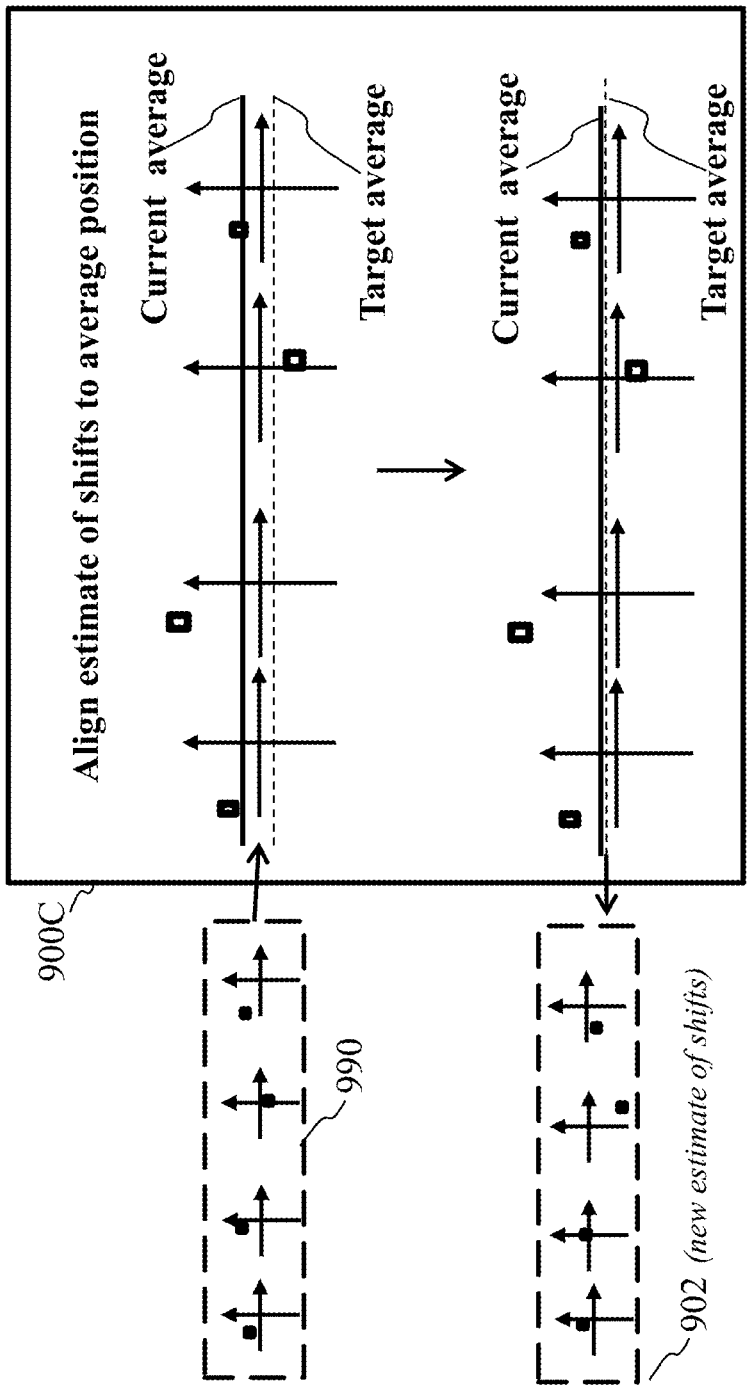
FIG. 9C is a schematic illustrating the step of aligning the estimated transmitter or receiver shifts according to the average assumed position of the antennas, according to some embodiments of the present disclosure.

FIG. 9C is a schematic illustrating the step of aligning the estimating image shifts according to the average assumed position of the antennas 900C, according to embodiments of the present disclosure. The input shifts 990 are used to compute an average of the shifts in each dimension and compare it to the target average. The shifts are then repositioned such that the average shift is equal to the target average such that their relative position to each other is the same, to produce new estimates of shifts 902, with the target average shift.

Figure 10A:
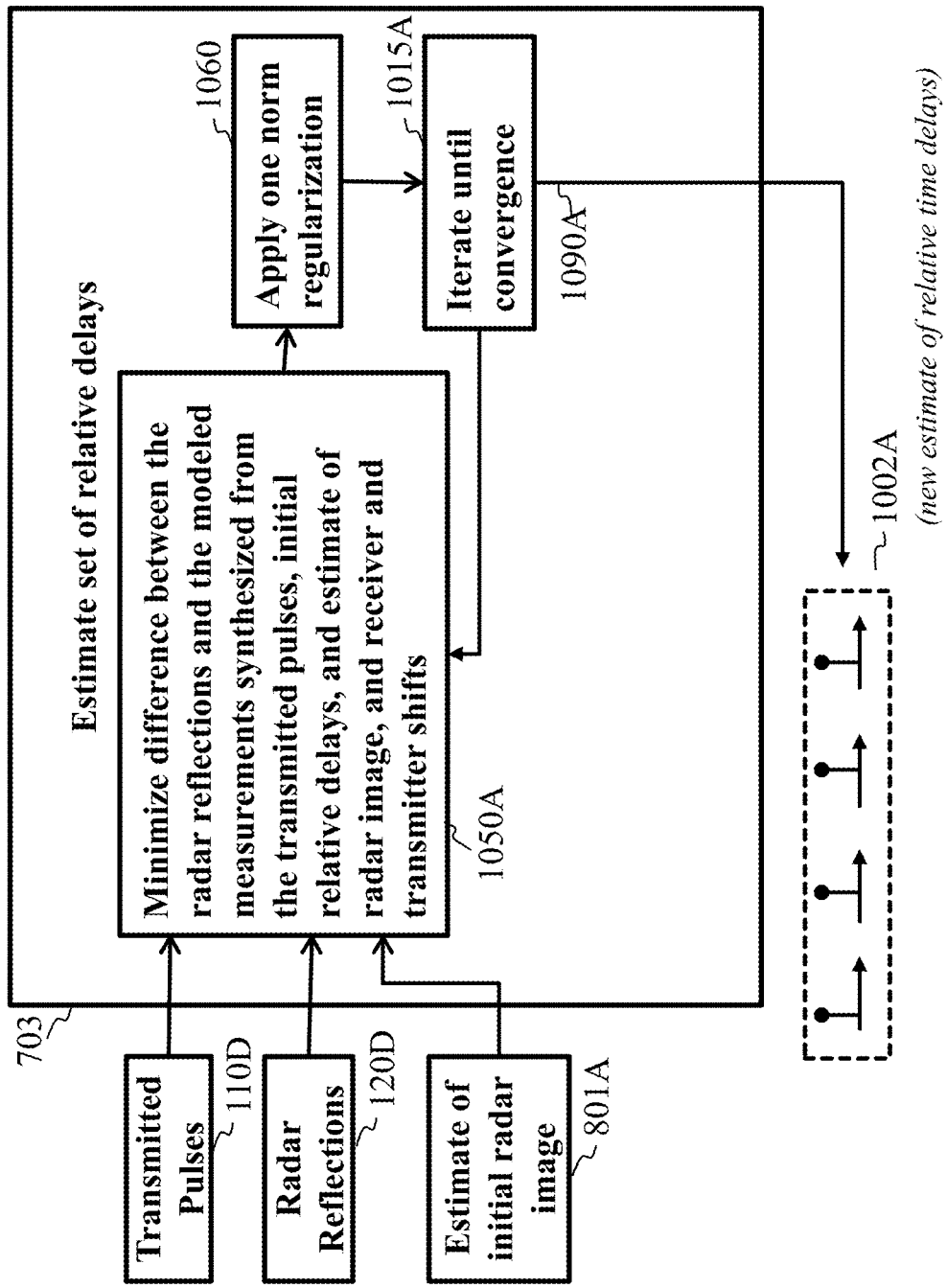
FIG. 10A is a block diagram of the method used to estimate the relative transmitter/receiver clock errors using the measured radar reflections the estimated transmitter and receiver position shifts, and the estimate of the radar image, according to some embodiments of the present disclosure.

FIG. 10A is a block diagram of the method used to estimate the relative time delays using the measured radar reflections and the estimate of the radar image and the transmitter and receiver spatial shifts, according to embodiments of the present disclosure. In particular, FIG. 10A relates to step 703 of FIG. 7B.

Referring to FIG. 10A, after the initial image 801A of FIG. 7B is computed, the time shift kernels corresponding to the relative transmitter/receiver delays are updated by minimizing the difference between the radar reflections and the synthesized or modeled measurements 1050A using the methods shown in FIG. 10A. The time shift kernels are filtered by applying, for example, the one-norm regularizer 1060 to make them sparser, and the process is repeated until convergence 1015A to produce the new estimate of time shifts 1002A. Alternatively a hard threshold might replace the one-norm regularizer, to further promote the sparsity of the estimates.

Figure 10B:
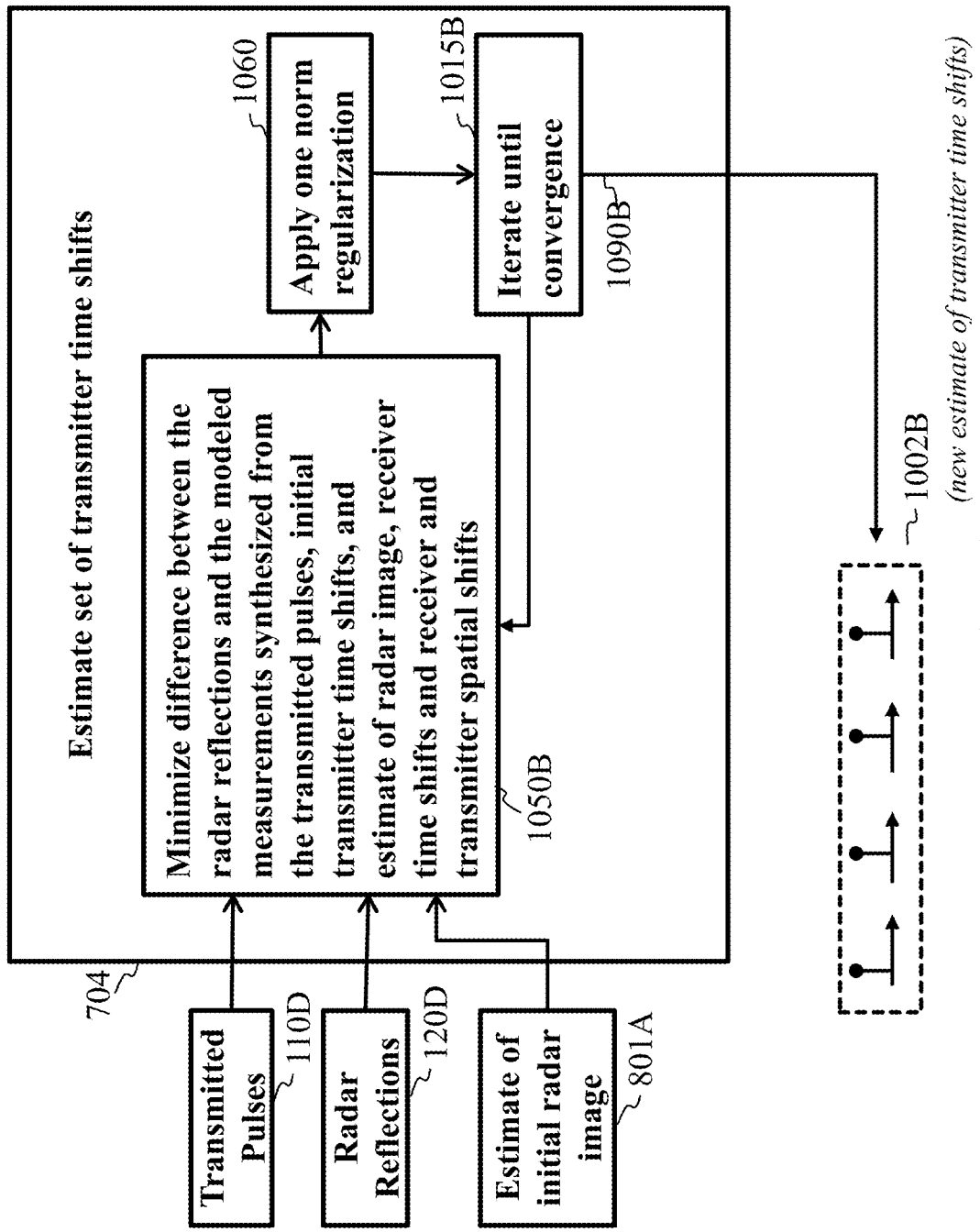
FIG. 10B is a block diagram of the method used to estimate the transmitter clock shifts relative to a global clock using the measured radar reflections the estimated transmitter and receiver position shifts, the estimate of the receiver clock shifts, and the estimate of the radar image, according to some embodiments of the present disclosure.

FIG. 10B is a block diagram of the method used to estimate the transmitter time shifts using the measured radar reflections and the estimate of the radar image, the receiver time shifts, and the transmitter and receiver spatial shifts, according to embodiments of the present disclosure. In particular, FIG. 10B relates to step 704 of FIG. 7C.

Referring to FIG. 10B, after the initial image 801A of FIG. 7C is computed, the time shift kernels corresponding to the transmitter time shifts are updated by minimizing the difference between the radar reflections and the synthesized or modeled measurements 1050B using the methods shown in FIG. 10B. The time shift kernels are filtered by applying, for example, the one-norm regularizer 1060 to make them sparser, and the process is repeated until convergence 1015B to produce the new estimate of transmitter time shifts 1002B. Alternatively a hard threshold might replace the one-norm regularizer, to further promote the sparsity of the estimates.

Figure 10C:
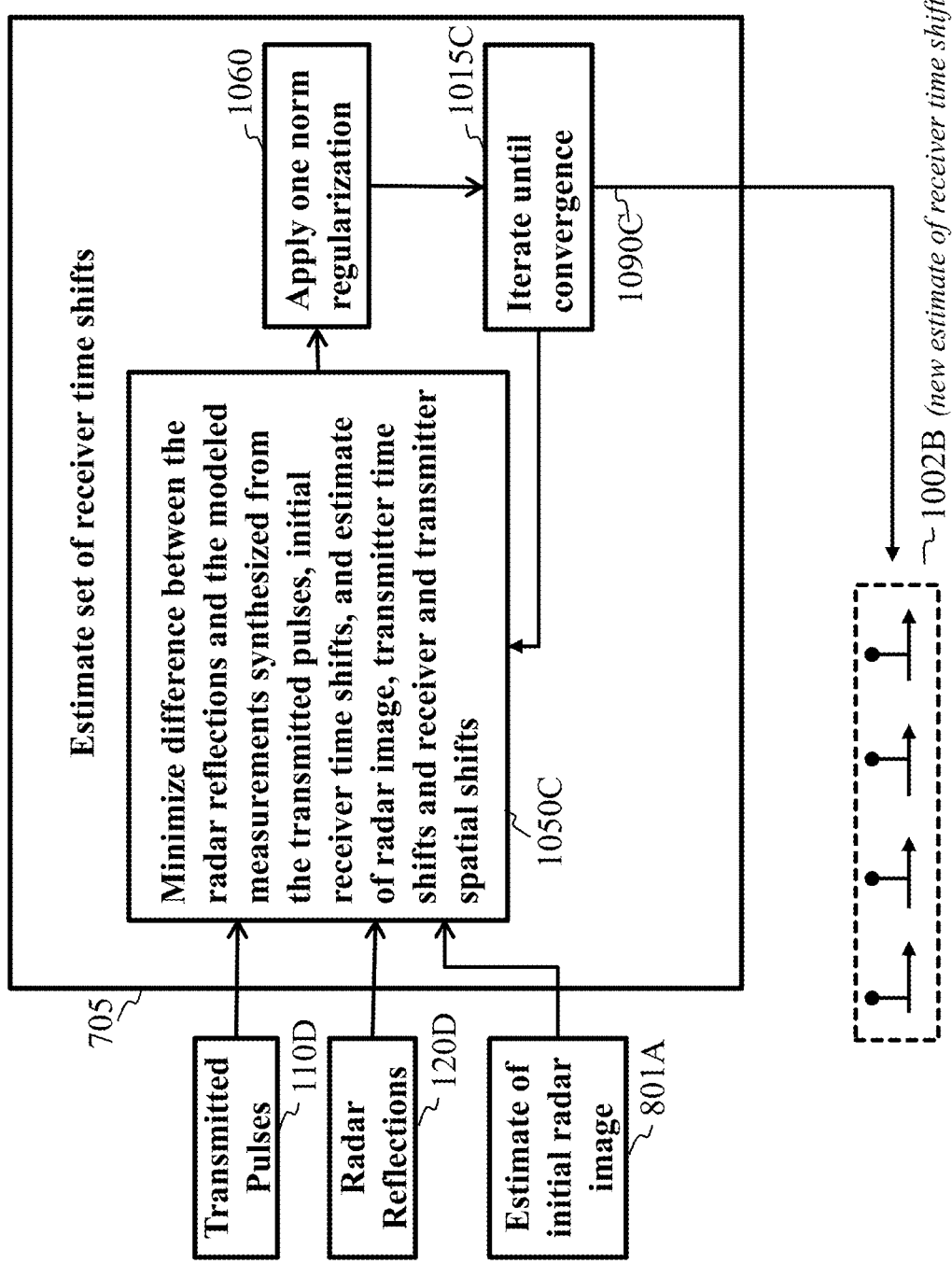
FIG. 10C is a block diagram of the method used to estimate the receiver clock shifts relative to a global clock using the measured radar reflections the estimated transmitter and receiver position shifts, the estimate of the transmitter clock shifts, and the estimate of the radar image, according to some embodiments of the present disclosure.

FIG. 10C is a block diagram of the method used to estimate the receiver time shifts using the measured radar reflections and the estimate of the radar image, the transmitter time shifts, and the transmitter and receiver spatial shifts, according to embodiments of the present disclosure. In particular, FIG. 10C relates to step 705 of FIG. 7C.

Referring to FIG. 10C, after the initial image 801A of FIG. 7C is computed, the time shift kernels corresponding to the receiver time shifts are updated by minimizing the difference between the radar reflections and the synthesized or modeled measurements 1050C using the methods shown in FIG. 10C. The time shift kernels are filtered by applying, for example, the one-norm regularizer 1060 to make them sparser, and the process is repeated until convergence 1015C to produce the new estimate of receiver time shifts 1002C. Alternatively a hard threshold might replace the one-norm regularizer, to further promote the sparsity of the estimates.

Features

Aspects of the present disclosure can include the hardware processor configured to solve a radar image recovery problem using the configuration data to produce the radar image of the reflectivity of each point in the scene, includes connecting the received data to a relative transmitter/receiver unknown clock delay, wherein the relative transmitter/receiver unknown clock delay defines an error between the transmitter and the receiver clocks.

Another aspect is the hardware processor configured to solve a radar image recover problem using the configuration data to produce the radar image of the reflectivity of each point in the scene, and includes connecting the received data to a transmitter unknown clock delay, wherein the transmitter unknown clock delay defines an error between a transmitter clock and a global clock. Along with connecting the received data to a receiver unknown clock delay, wherein the receiver unknown clock delay defines an error between a receiver clock and a global clock. Another aspect is an aspect can include determining the relative transmitter/receiver clock delay is performed by determining an unknown delay kernel, whose time-domain convolution with the received data delays the data according to the relative transmitter/receiver clock delay. Another aspect is another aspect can include determining the transmitter clock delay and the receiver clock delay is performed by determining unknown delay kernel, whose time-domain convolution with the transmitted pulse and received data, respectively, delays the transmitted pulse and received data, according to the transmitter clock delay and the receiver clock delay.

Another aspect is the error between the receiver positions stored in the memory and actual positions of the receivers is determined jointly and independently from the error between the transmitter positions stored in the memory and actual positions of the transmitters. Wherein an aspect can be that an effect of the transmitting antenna position error is the shift in the incident field that this transmitting antenna induces to the scene by a same amount as the transmitting antenna position error, such that the scene interacts with the incident field, creating the reflected field. Wherein the receiving antenna measures the reflected field at a position of the transmitting antenna, resulting in an effect of the receiving antenna position error that is equivalent to the reflection field measured at a different point, which, in turn, is equivalent to the reflection field, shifted by a same amount to an opposite direction, measured by an receiving antenna without position error.

Another aspect can be that the connecting of the received radar measurements to the shift of the reflection field with the receiver unknown position shift includes a convolution of the reflection field at the assumed position of the receiver with a convolution kernel corresponding to the unknown receiver position shift. Another aspect can be that the connecting of the reflection field to the shift of the incident field with the transmitter unknown position shift includes a convolution of the incident field due to the transmitter assumed position with a convolution kernel corresponding to the unknown transmitter position shift.

Another aspect is that the solving the radar image recovery problem as the multilinear problem of joint estimation of the reflectivity of each point in the scene, includes a regularization on the reflectivity of the scene. Wherein the regularization promotes the sparsity of the scene. Wherein the regularization promotes a recovered scene with low total variation.

Another aspect is the position errors in the transmitting antennas result to a shifting of the incident field induced onto the scene by a same amount, and the position errors of the receiving antennas result to data received as if the reflected field was shifted by a same amount in an opposite direction, and based on such a configuration the multilinear problem or a multilinear optimization problem is configured to simultaneously recover all the antenna position errors, as well as a sparse scene being imaged.

Another aspect is the radar image recovery problem connects the received radar measurements with the reflectivity of each point in the scene through the received radar measurements to the shift of the reflection field with the receiver unknown position shift, and the shift of the incident field with the transmitter unknown position shift, wherein the shift of the reflection field is independent from the transmitter unknown position shift. Wherein determining the shifting of the incident field is performed by determining an unknown shift kernel whose convolution with the incident field shifts the incident field by the unknown shift, and determining the shifting of the reflected field is performed by determining an unknown shift kernel whose convolution with the reflected field shifts the reflected field by the unknown shift. Wherein the unknown shift kernels are sparse.

Figure 11:
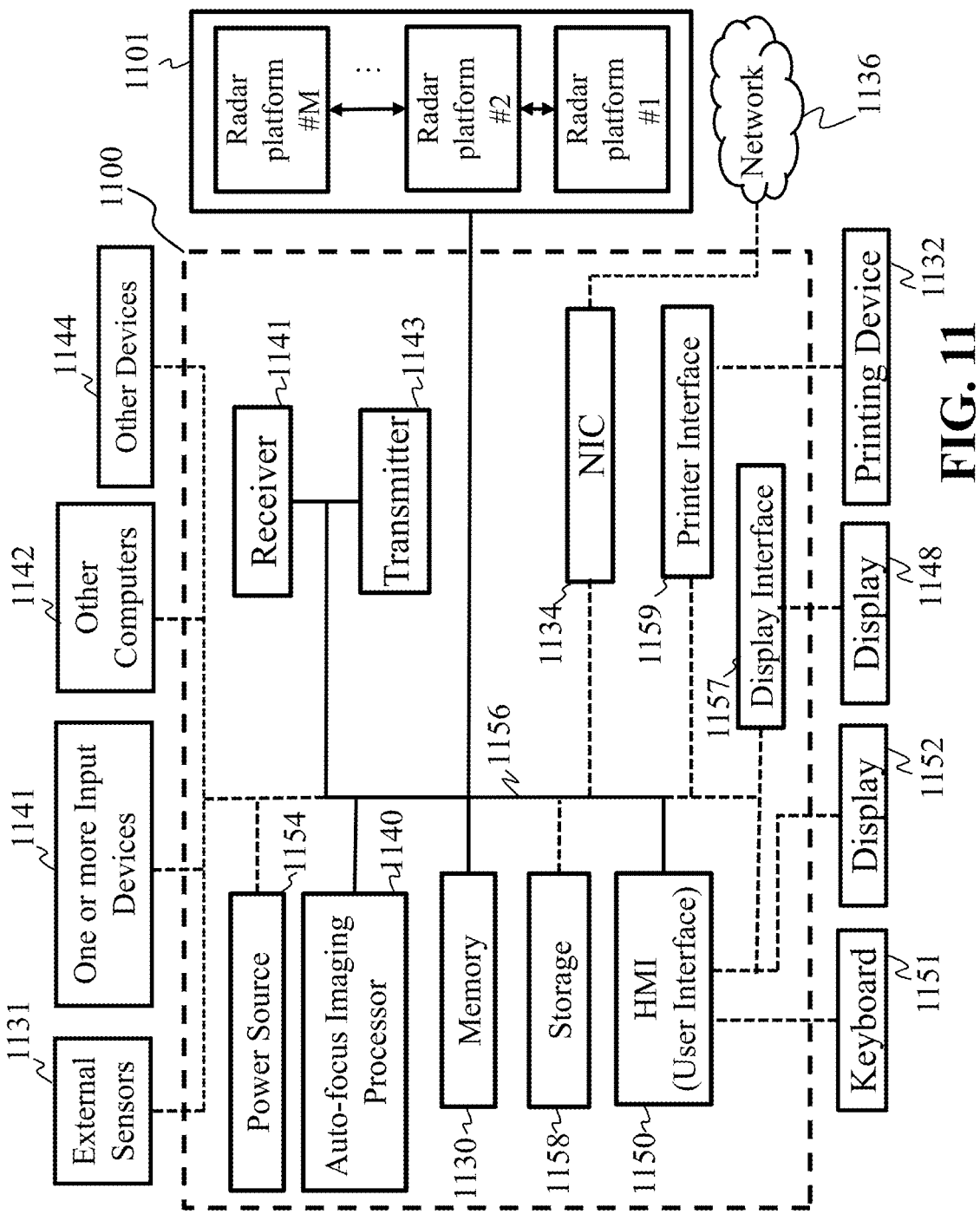
FIG. 11 is a block diagram of a computer system of the radar system contemplated by the present disclosure, in accordance with some embodiments of the present disclosure.

FIG. 11 is a block diagram of a computer system of the radar system contemplated by the present disclosure, in accordance with some embodiments of the present disclosure. The computer system 1100 is in communication with the set of antennas 101, 102, 103, 104, 105 of FIG. 1C and can store collected data in the memory 1130 that is processed by the processor 1140 of the computer 1100. The computer system 1100 can include a human machine interface or user interface 1150 that can connect the computer system to a keyboard 1151 and display device 1152. The computer system 1100 can be linked through the bus 1156 to a display interface 1157 adapted to connect the system 1100 to a display device 1148, wherein the display device 1148 can include a computer monitor, camera, television, projector, or mobile device, among others.

The computer system 1100 can include a power source 1154, depending upon the application, the power source may be optionally located outside of the computer system. The auto-focus imaging processor 1140 may be one or more processors that can be configured to execute stored instructions, as well as be in communication with the memory 1130 that stores instructions that are executable by the auto-focus imaging processor 1140. The auto-focus imaging processor 1140 can be a single core processor, a multi-core processor, a computing cluster, or any number of other configurations. The auto-focus imaging processor 1140 is connected through a bus 1156 to one or more input and output devices. The memory 1130 can include random access memory (RAM), read only memory (ROM), flash memory, or any other suitable memory systems.

Still referring to FIG. 11, the computer system 1100 can also include a storage device 1158 adapted to store supplementary data and/or software modules used by the auto-focus imaging processor 1140. For example, the storage device 1158 can store historical data relating to predesigned radar platform trajectories, radar operating frequency bandwidth, transmitted waveform, estimated signal-to-noise ratio, image data relating to target recognition, imaging results using simulated noisy data with different methods dealing with position errors, among other things. The storage device 1158 can include a hard drive, an optical drive, a thumb-drive, an array of drives, or any combinations thereof.

Still referring to FIG. 11, a printer interface 1159 can also be connected to the computer system 1100 through the bus 1156 and adapted to connect the computer system 1100 to a printing device 1132, wherein the printing device 1132 can include a liquid inkjet printer, solid ink printer, large-scale commercial printer, thermal printer, UV printer, or dye-sublimation printer, among others. A network interface controller (NIC) 1134 is adapted to connect the computer system 1100 through the bus 1156 to a network 1136. The image data or related image data, among other things, can be rendered on a display device, imaging device, and/or printing device via the network 1136.

Still referring to FIG. 11, the image data or related image data, among other things, can be transmitted over a communication channel of the network 1136, and/or stored within the computer's storage system 1158 for storage and/or further processing. Further, the image data or related image data may be received wirelessly or wire from a receiver 1141 or transmitted via a transmitter 1143 wirelessly or wire, the receiver 1141 and transmitter 1143 are both connected to the computer system 1100 through the bus 1156.

The computer system 1100 may be connected to external sensors 1131, one or more input devices 1141, other computers 1142 and other devices 1144. The external sensors 1131 may include motion sensors, inertial sensors, a type of measuring sensor, etc. The external sensors 1131 may include sensors for, speed, direction, airflow, distance to an object or location, weather conditions, etc. The input devices 1141 can include, for example, a keyboard, a scanner, a microphone, a stylus, a touch sensitive pad or display.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, with machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

The embodiments of our present disclosure include coherent distributed radar imaging by allowing location ambiguities and on autofocusing for a single sensor array by distributed sensing with multiple sensors. In particular, a multi-static radar imaging approach where one transmitting/receiving radar platform and multiple receiving radar platforms are moving towards a region of interest (ROI) with position perturbations. The embodiments of our present disclosure detect targets inside the ROI. Due to inaccurate positioning and motion errors, the actual array positions are perturbed up to several times a central radar wavelength. Although the image resolution of each sensor array may be low due to its small aperture size, a high-resolution image can be formed by jointly processing the outputs of all distributed arrays with well-compensated position errors. The embodiments of our present disclosure assume a sparse scene, and is realized iteratively by solving series of optimization problems for compensating position-induced phase errors, exploiting target signatures, and estimating antenna positions.

The embodiments of our present disclosure also provide for auto-focus radar imaging for generating a radar image of targets situated in an area of interest using a single moving transmit radar platform or combination transmitter/receiver along with multiple spatially distributed moving radar receiver platforms or receivers. The moving radar receivers are perturbed with unknown position errors up to several radar wavelengths.

Also, the various methods or processes outlined herein may be coded as software that is executable on one or more processors that employ any one of a variety of operating systems or platforms. Additionally, such software may be written using any of a number of suitable programming languages and/or programming or scripting tools, and may be compiled as executable machine language code or intermediate code that is executed on a framework or virtual machine. Typically, the functionality of the program modules may be combined or distributed as desired in various embodiments.

In addition, the embodiments of the present disclosure may be embodied as a method, of which an example has been provided. The acts performed as part of the method may be ordered in any suitable way. Accordingly, embodiments may be constructed in which acts are performed in an order different from illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed:

1. A radar system for generating a radar image of a scene, wherein, during an operation, the radar system is connected to a set of transmitters configured to transmit radar pulses to the scene and a set of receivers configured to receive reflections of the radar pulses from the scene, comprising:

a memory configured to store predetermined configuration data indicative of propagation of the radar pulses to and from the scene, the configuration data includes positions of the transmitters and positions of the receivers, such that a position of at least one receiver is different from the transmitter positions of all transmitters, wherein the configuration data defines an incident field generated by the radar pulses transmitted by the transmitters from the transmitter positions, and wherein the configuration data defines a structure of a reflection field generated by reflections of the incident field from the scene and measured by the receivers at the receiver positions;

an input interface configured to receive radar measurements of reflectivity of each point in the scene measured by the set of receivers;

a hardware processor configured to solve a radar image recovery problem using the configuration data to produce the radar image of the reflectivity of each point in the scene, by:

connect the received radar measurements to a shift of the reflection field with a receiver unknown position shift, wherein the receiver unknown position shift defines an error between the receiver positions stored in the memory and actual positions of the receivers, and the reflection field is generated by reflecting the transmitted field from the scene in accordance with the reflectivity of each point in the scene;

connect the reflection field to a shift of the incident field with a transmitter unknown position shift, wherein the transmitter unknown position shift defines an error between the transmitter positions stored in the memory and actual positions of the transmitters;

solve the radar image recovery problem as a multilinear problem of joint estimation of the reflectivity of each point in the scene, the receiver shift, and the transmitter shift; and an output interface configured to render one or combination of the radar image of the reflectivity of each point in the scene, the receiver shift, or the transmitter shift.

2. The radar system of claim 1, wherein the hardware processor configured to solve a radar image recovery problem using the configuration data to produce the radar image of the reflectivity of each point in the scene, includes connecting the received data to a relative transmitter/receiver unknown clock delay, wherein the relative transmitter/receiver unknown clock delay defines an error between the transmitter and the receiver clocks.

3. The radar system of claim 1, wherein the hardware processor configured to solve a radar image recovery problem using the configuration data to produce the radar image of the reflectivity of each point in the scene, includes connect the received data to a transmitter unknown clock delay, wherein the transmitter unknown clock delay defines an error between a transmitter clock and a global clock; and connect the received data to a receiver unknown clock delay, wherein the receiver unknown clock delay defines an error between a receiver clock and a global clock.

4. The radar system of claim 3, wherein determining the relative transmitter/receiver clock delay is performed by determining an unknown delay kernel, whose time-domain convolution with the received data delays the data according to the relative transmitter/receiver clock delay.

5. The radar system of claim 3, wherein determining the transmitter clock delay and the receiver clock delay is performed by determining unknown delay kernel, whose time-domain convolution with the transmitted pulse and received data, respectively, delays the transmitted pulse and received data, according to the transmitter clock delay and the receiver clock delay.

6. The radar system of claim 1, wherein the error between the receiver positions stored in the memory and actual positions of the receivers is determined jointly and independently from the error between the transmitter positions stored in the memory and actual positions of the transmitters.

7. The radar system of claim 6, wherein an effect of the transmitting antenna position error is the shift in the incident field that this transmitting antenna induces to the scene by a same amount as the transmitting antenna position error, such that the scene interacts with the incident field, creating the reflected field,
wherein the receiving antenna measures the reflected field at a position of the transmitting antenna, resulting in an effect of the receiving antenna position error that is equivalent to the reflection field measured at a different point, which, in turn, is equivalent to the reflection field, shifted by a same amount to an opposite direction, measured by an receiving antenna without position error.

8. The radar system of claim 1, wherein the connecting of the received radar measurements to the shift of the reflection field with the receiver unknown position shift includes a convolution of the reflection field at the assumed position of the receiver with a convolution kernel corresponding to the unknown receiver position shift.

9. The radar system of claim 1, wherein the connecting of the reflection field to the shift of the incident field with the transmitter unknown position shift includes a convolution of the incident field due to the transmitter assumed position with a convolution kernel corresponding to the unknown transmitter position shift.

10. The radar system of claim 1, wherein the solving the radar image recovery problem as the multilinear problem of joint estimation of the reflectivity of each point in the scene, includes a regularization on the reflectivity of the scene.

11. The radar system of claim 10, wherein the regularization promotes the sparsity of the scene.

12. The radar system of claim 10, wherein the regularization promotes a recovered scene with low total variation.

13. The radar system of claim 1, wherein the position errors in the transmitting antennas result to a shifting of the incident field induced onto the scene by a same amount, and the position errors of the receiving antennas result to data received as if the reflected field was shifted by a same amount in an opposite direction, and based on such a configuration the multilinear problem or a multilinear optimization problem is configured to simultaneously recover all the antenna position errors, as well as a sparse scene being imaged.

14. The radar system of claim 1, wherein the radar image recovery problem connects the received radar measurements with the reflectivity of each point in the scene through the received radar measurements to the shift of the reflection field with the receiver unknown position shift, and the shift of the incident field with the transmitter unknown position shift, wherein the shift of the reflection field is independent from the transmitter unknown position shift.

15. The radar system of claim 14, wherein determining the shifting of the incident field is performed by determining an unknown shift kernel whose convolution with the incident field shifts the incident field by the unknown shift, and determining the shifting of the reflected field is performed by determining an unknown shift kernel whose convolution with the reflected field shifts the reflected field by the unknown shift.

16. The radar system of claim 15 wherein the unknown shift kernels are sparse.

17. A method for a radar system to produce a radar image of a region of interest (ROI), comprising:
measuring, using transmitting antennas at different positions to transmit radar pulses to the ROI and receiving antennas configured to receive reflections of the radar pulses from the ROI corresponding to the transmitted radar pulses, such that the receivers measure the reflections of the radar pulses to obtain radar measurements of reflectivity of each point in the scene;
using a hardware processor in communication with the transmitters, receivers and a memory, that is configured to
access the memory having stored data including predetermined configuration data indicative of propagation of the radar pulses to and from the ROI, the configuration data includes positions of the transmitters and positions of the receivers, such that a position of at least one receiver is different from the transmitter positions of all transmitters, wherein the configuration data defines an incident field generated by the radar pulses transmitted by the transmitters from the transmitter positions, and wherein the configuration data defines a structure of a reflection field generated by reflections of the incident field from the scene and measured by the receivers at the receiver positions;
solving a radar image recovery problem using the configuration data to produce the radar image of the reflectivity of each point in the scene, by:
connecting the received radar measurements to a shift of the reflection field with a receiver unknown position shift, wherein the receiver unknown position shift defines an error between the receiver positions stored in the memory and actual positions of the receivers, and the reflection field is generated by reflecting the transmitted field from the scene in accordance with the reflectivity of each point in the scene;
connecting the reflection field to a shift of the incident field with a transmitter unknown position shift, wherein the transmitter unknown position shift defines an error between the transmitter positions stored in the memory and actual positions of the transmitters;
solving the radar image recovery problem as a multilinear problem of joint estimation of the reflectivity of each point in the scene, the receiver shift, and the transmitter shift; and
outputting via an output interface one or combination of the radar image of the reflectivity of each point in the scene, the receiver shift, or the transmitter shift.

18. The method of claim 17, wherein the connecting of the received radar measurements to the shift of the reflection field with the receiver unknown position shift includes the connecting of the received radar measurements to the shift of the reflection field with the receiver unknown position shift includes a convolution of the reflection field at the assumed position of the receiver with a convolution kernel corresponding to the unknown receiver position shift, and
wherein the connecting of the reflection field to the shift of the incident field with the transmitter unknown position shift includes the connecting of the reflection field to the shift of the incident field with the transmitter unknown position shift includes a convolution of the incident field due to the transmitter assumed position with a convolution kernel corresponding to the unknown transmitter position shift.

19. The method of claim 17, wherein the solving the radar image recovery problem as the multilinear problem of joint estimation of the reflectivity of each point in the scene, includes the solving the radar image recovery problem as the multilinear problem of joint estimation of the reflectivity of each point in the scene, includes a regularization on the reflectivity of the scene.

20. The method of claim 17, wherein the position errors in the transmitting antennas result to a shifting of the incident field induced onto the scene by a same amount, and the position errors of the receiving antennas result to data received as if the reflected field was shifted by a same amount in an opposite direction, and based on such a configuration the multilinear problem or a multilinear optimization problem is configured to simultaneously recover all the antenna position errors, as well as a sparse scene being imaged.

21. A non-transitory computer readable storage medium embodied thereon a program executable by a processor for performing a method, the method for a radar system to produce a radar image of a region of interest (ROI), comprising:
  measuring, using transmitting antennas at different positions to transmit radar pulses to the ROI and receiving antennas configured to receive reflections of the radar pulses from the ROI corresponding to the transmitted radar pulses, such that the receivers measure the reflections of the radar pulses to obtain radar measurements of reflectivity of each point in the scene;
  using a hardware processor in communication with the transmitters, receivers and a memory, that is configured to
  access the memory having stored data including predetermined configuration data indicative of propagation of the radar pulses to and from the ROI, the configuration data includes positions of the transmitters and positions of the receivers, such that a position of at least one receiver is different from the transmitter positions of all transmitters, wherein the configuration data defines an incident field generated by the radar pulses transmitted by the transmitters from the transmitter positions, and wherein the configuration data defines a structure of a reflection field generated by reflections of the incident field from the scene and measured by the receivers at the receiver positions;
  solving a radar image recovery problem using the configuration data to produce the radar image of the reflectivity of each point in the scene, by:
    connecting the received radar measurements to a shift of the reflection field with a receiver unknown position shift, wherein the receiver unknown position shift defines an error between the receiver positions stored in the memory and actual positions of the receivers, and the reflection field is generated by reflecting the transmitted field from the scene in accordance with the reflectivity of each point in the scene;
    connecting the reflection field to a shift of the incident field with a transmitter unknown position shift, wherein the transmitter unknown position shift defines an error between the transmitter positions stored in the memory and actual positions of the transmitters;
    solving the radar image recovery problem as a multilinear problem of joint estimation of the reflectivity of each point in the scene, the receiver shift, and the transmitter shift; and
  outputting via an output interface one or combination of the radar image of the reflectivity of each point in the scene, the receiver shift, or the transmitter shift.

* * * * *